(12) United States Patent
Hibi et al.

(10) Patent No.: US 8,045,320 B2
(45) Date of Patent: Oct. 25, 2011

(54) CAPACITOR HAVING COLLECTORS WITH SEPARATE REGIONS BETWEEN INNERMOST AND OUTERMOST CIRCUMFERENCES OF A WOUND ELEMENT

(75) Inventors: Toshitaka Hibi, Kyoto (JP); Toshiyuki Kitagawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 615 days.

(21) Appl. No.: 12/088,755

(22) PCT Filed: Oct. 2, 2007

(86) PCT No.: PCT/JP2007/069226
§ 371 (c)(1),
(2), (4) Date: Mar. 31, 2008

(87) PCT Pub. No.: WO2008/044532
PCT Pub. Date: Apr. 17, 2008

(65) Prior Publication Data
US 2009/0279231 A1    Nov. 12, 2009

(30) Foreign Application Priority Data
Oct. 10, 2006 (JP) ................................. 2006-276225

(51) Int. Cl.
| H01G 9/00 | (2006.01) |
| H01G 4/228 | (2006.01) |
| H01G 9/10 | (2006.01) |
| H01G 4/32 | (2006.01) |
| H01G 9/04 | (2006.01) |
| H05K 5/03 | (2006.01) |

(52) U.S. Cl. .................. 361/502; 361/520; 361/511

(58) Field of Classification Search ............... 361/301.5, 361/502, 520, 530, 511
See application file for complete search history.

(56) References Cited

U.S. PATENT DOCUMENTS

| 3,490,949 A * | 1/1970 | Deschamps ..................... 429/94 |
| 5,849,431 A * | 12/1998 | Kita et al. ..................... 429/164 |
| 6,071,638 A * | 6/2000 | Fradin ............................. 429/94 |
| 6,310,756 B1 * | 10/2001 | Miura et al. ............... 361/301.3 |
| 6,733,925 B2 * | 5/2004 | Hironaka et al. ........ 429/231.95 |
| 7,618,742 B2 * | 11/2009 | Kaplin et al. ................. 429/130 |
| 2002/0106553 A1 * | 8/2002 | Nemoto et al. ................. 429/52 |
| 2003/0118912 A1 * | 6/2003 | Watanabe et al. ............. 429/326 |

FOREIGN PATENT DOCUMENTS

| JP | 09-092335 | 4/1997 |
| JP | 10-055936 | 2/1998 |
| JP | 10-294102 | 11/1998 |

(Continued)

*Primary Examiner* — Eric Thomas
*Assistant Examiner* — David M Sinclair
(74) *Attorney, Agent, or Firm* — Steptoe & Johnson LLP

(57) ABSTRACT

A capacitor includes a wound element, and externally take-out electrode members corresponding respectively to a first pole and a second pole and connected to each one of end faces of the wound element. This capacitor features that the wound element is positively fixed to the externally take-out electrode members, and has advantageously a small internal resistance. Collectors in inner circumference region of the wound element are bent in an opposite direction to a core of a winding shaft, and collectors in an outer circumference region are bent toward the core of the winding shaft. End faces of these collectors are connected to a lid, thereby forming a first pole of the capacitor, and end faces of those collectors are connected to a housing, thereby forming a second pole of the capacitor.

15 Claims, 29 Drawing Sheets

FOREIGN PATENT DOCUMENTS

| | | | |
|---|---|---|---|
| JP | 2000260417 A | * | 9/2000 |
| JP | 2000-315632 | | 11/2000 |
| JP | 2002-056886 | | 2/2002 |
| JP | 2002042769 A | * | 2/2002 |
| JP | 2005216825 A | * | 8/2005 |

* cited by examiner

FIG. 3C
FIG. 3D
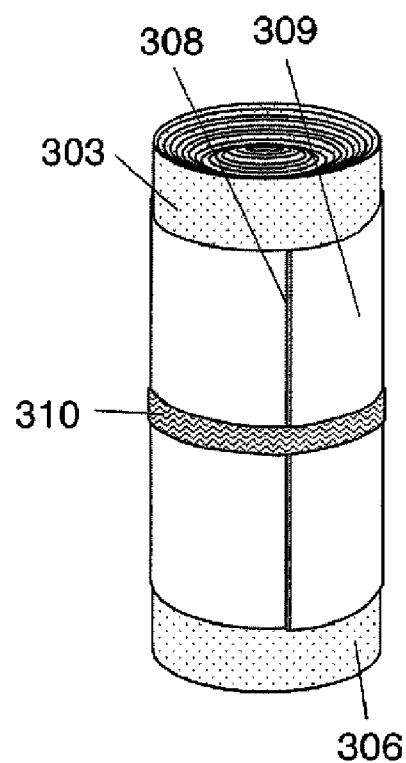
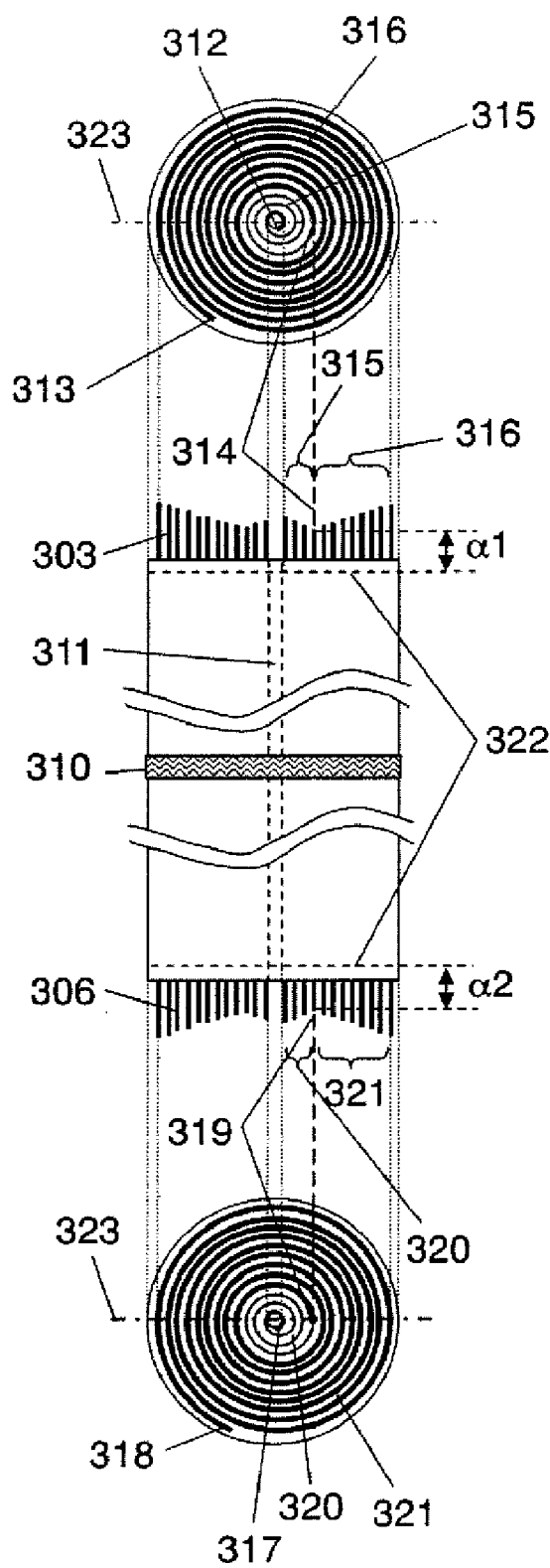

FIG. 8A
FIG. 8B
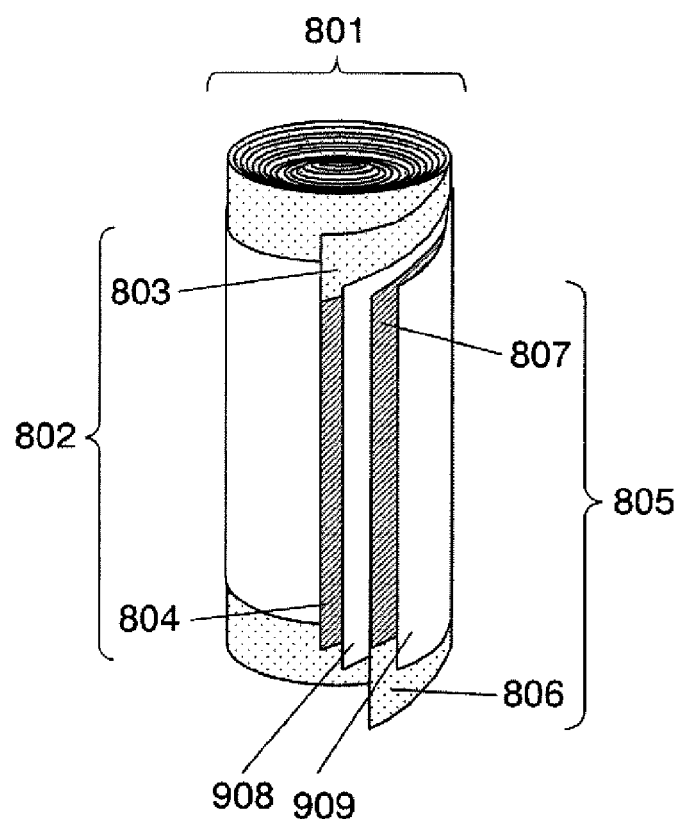
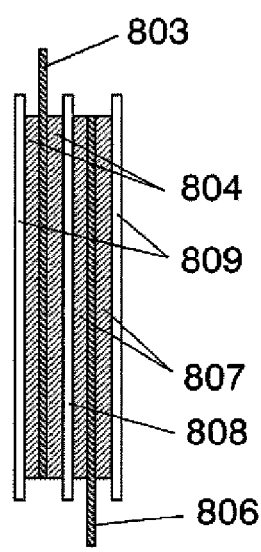

FIG. 8C
FIG. 8D
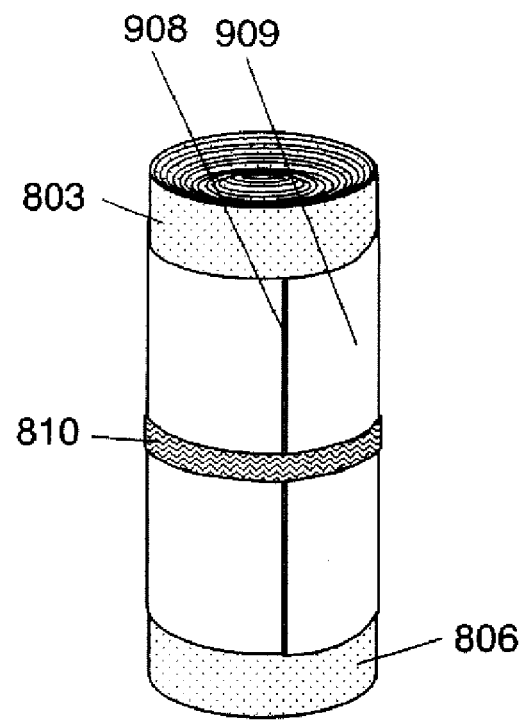
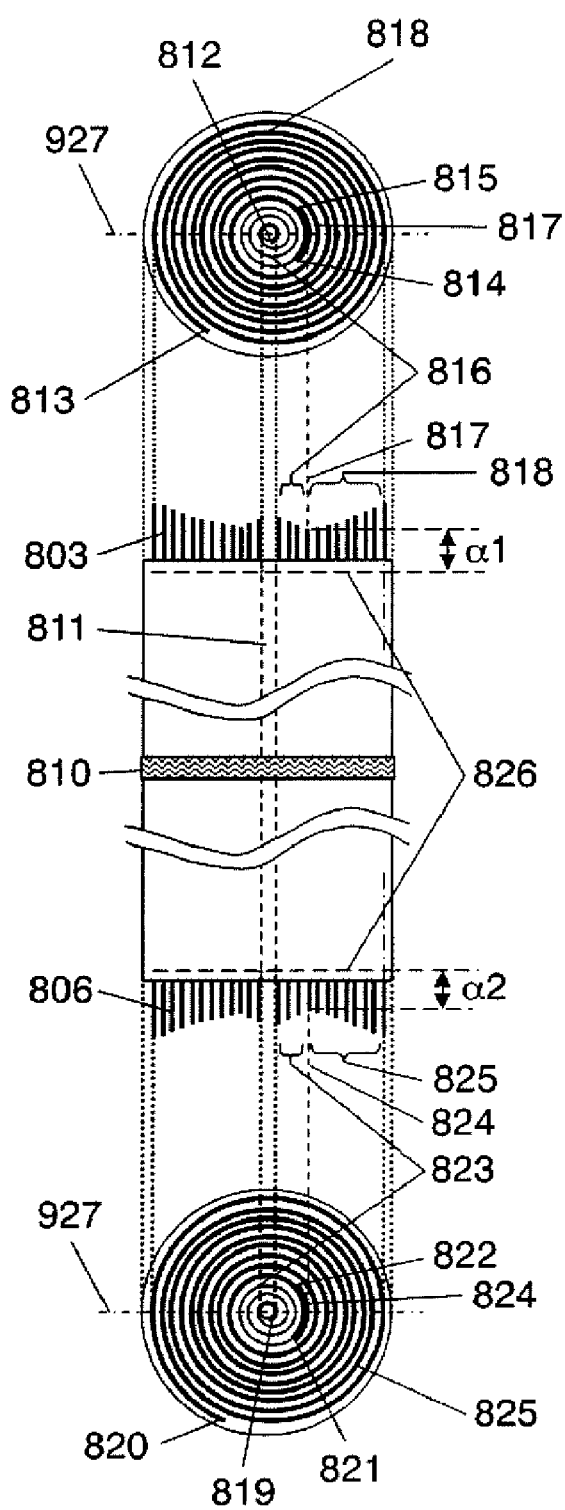

FIG. 12C
FIG. 12D
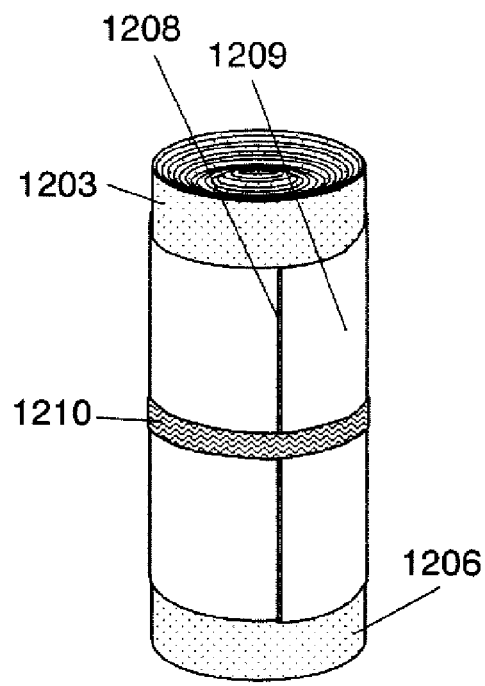
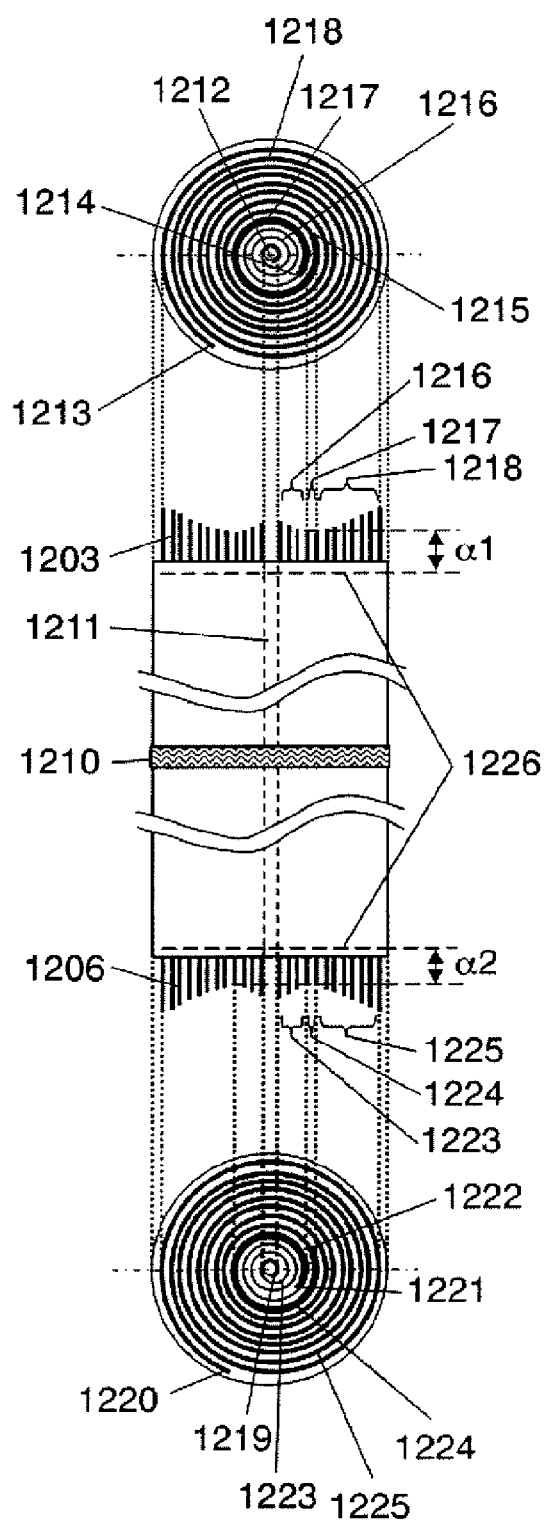

FIG. 14A
FIG. 14B
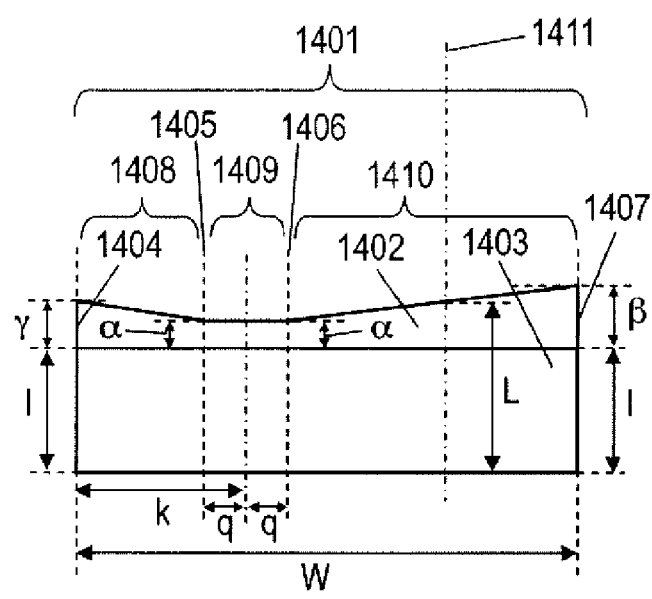
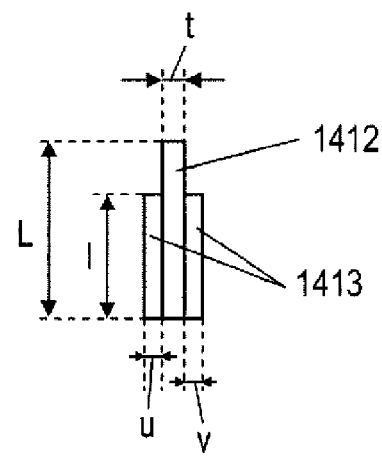

FIG. 17C
FIG. 17D
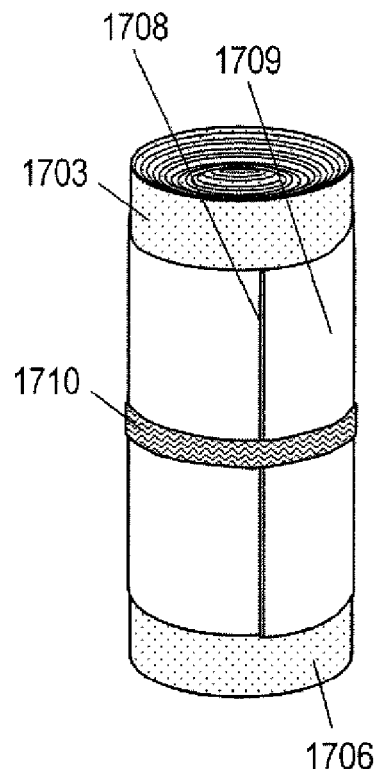
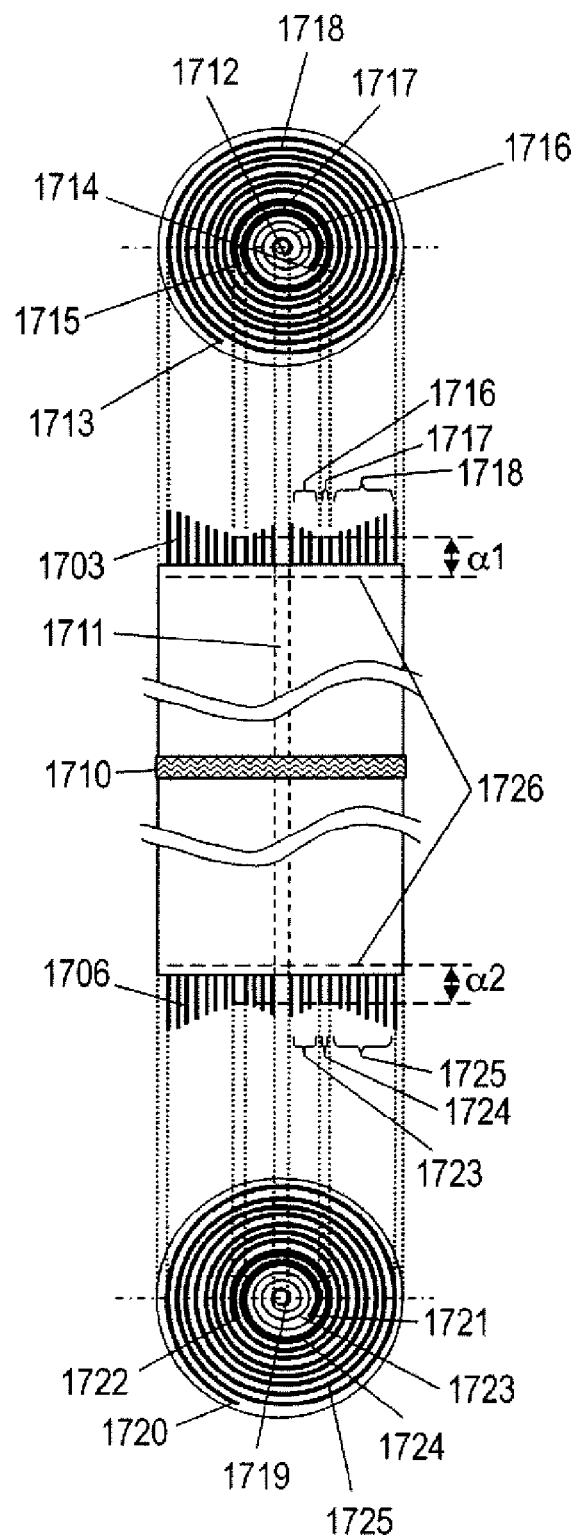

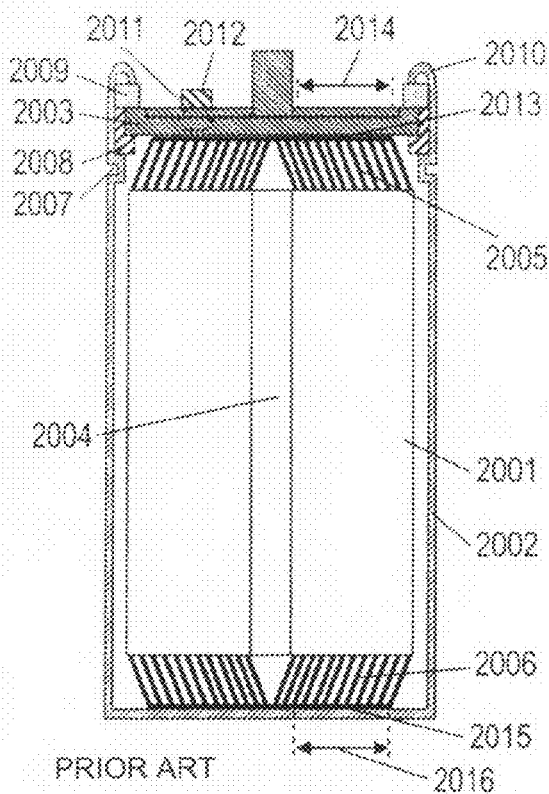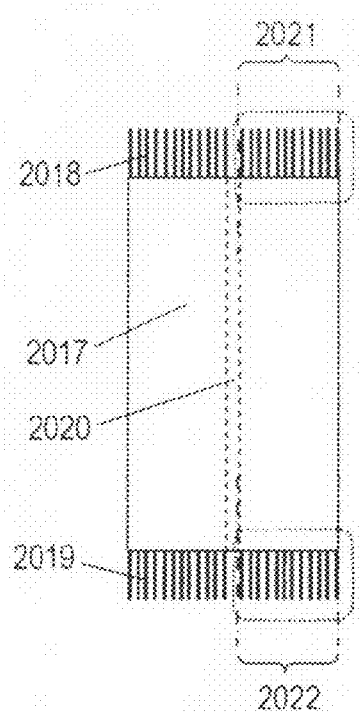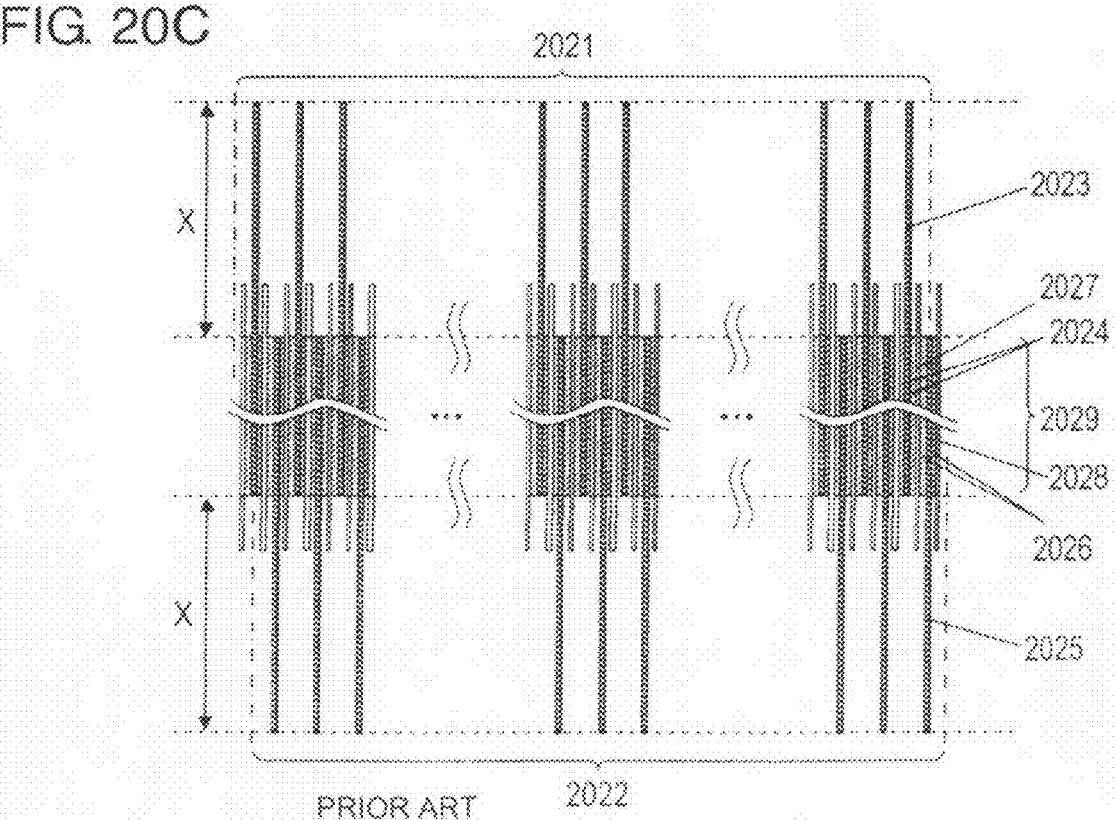

PRIOR ART

CAPACITOR HAVING COLLECTORS WITH SEPARATE REGIONS BETWEEN INNERMOST AND OUTERMOST CIRCUMFERENCES OF A WOUND ELEMENT

The present application is based on International Application PCT/JP2007/069226, filed Oct. 2, 2007, which claims priority to Japanese Patent Application No. 2006-276225, filed Oct. 10, 2006, the entire contents of which are hereby incorporated by reference.

TECHNICAL FIELD

The present invention relates to capacitors, more particularly it relates to capacitors having a wound element formed of an electrode unit corresponding to an anode, another electrode unit corresponding to a cathode, and a separator placed between the electrode units.

BACKGROUND ART

In recent years, a capacitor of a greater capacity and a higher output has drawn attention from the market as a product to be used in a power supply which drives a motorcar. This capacitor is now in a development stage. This kind of capacitor charges or discharges electricity, and its structure is known as an electric storage device disclosed in patent document 1.

This conventional electric storage device includes a wound element formed of an anodic electrode unit, a cathodic electrode unit, and a separator for insulating both the electrode units from each other. A positive collector is disposed on a first axial end and a negative collector is disposed on a second axial end of the wound element, and the positive collector is connected to the anodic electrode unit and the negative collector is connected to the cathodic electrode unit. These members are accommodated in a cylindrical housing having a bottom plate, and electrolyte is filled in the cylindrical housing. The opening of the housing is covered air-tightly with a lid.

The positive and negative collectors are formed of a belt-like electrode foil, on which both sides polarization electrodes are formed. The axial end of the electrode foil on the anode side protrudes to a first side, and another axial end on the cathode side protrudes to a second side, and both of the projected ends have no polarization electrodes. A region having the polarization electrodes and a region having no polarization electrode are formed on the belt-like electrode foil such that they have a given width along the longitudinal direction. The region having no polarization electrodes of the foregoing wound element is bent in part and brought into contact with the positive collector and the negative collector, and then connected to the collectors by, e.g. welding.

FIG. 20A shows a sectional view of a conventional cylindrical capacitor cut along the axial direction. FIGS. 20B, 20C, 20E, and 20F show sectional views of the wound element of the conventional cylindrical capacitor. FIG. 20D shows a fellow to the electrodes of the belt-like electrode unit of the wound element. FIGS. 20C and 20F show enlarged views around collectors 2023 and 2025 of the electrode unit of the wound element shown in FIGS. 20B and 20E. FIGS. 20B and 20C show the status where the wound element has been just rolled up, and FIGS. 20E and 20F show the status where collectors 2023 and 2025 are bent.

As FIG. 20F shows, collectors 2023 and 2025 placed in first region 2021 and second region 2022 of the electrode unit are bent to form collectors 2023 and 2025. As shown in FIG. 20A, lid 2003 working as an anodic member is brought into contact with collector 2023, and cylindrical housing 2002 with a bottom plate working as a cathodic member is brought into contact with collectors 2025, then they are connected by, e.g. welding, thereby forming a first pole and a second pole. The electrolyte is subsequently poured into housing 2002 through hole 2011, which is then closed with stopper 2012. The capacitor is thus completed.

The cylindrical capacitor discussed above needs to reduce its resistance as much as possible in order to meet the requirements of internal resistance depending on the applications. The internal resistance exists in each element of the capacitor, namely the lid working as an anodic member, the cylindrical housing with a bottom plate working as a cathodic member, the electrolyte, the wound element, joint sections between the lid, cylindrical housing and the wound element. For instance, in the case of the conventional structure disclosed in the patent document 1, one of effective means for lowering the resistance is to reduce the width of the region, having no polarization electrodes, in the collector of the electrode unit, so that a plane area of the collector can be reduced and the resistance of the wound element is thus lowered.

However, the width reduction in the wound element discussed above forces the collectors to bend in order to obtain the connecting area between the lid, the cylindrical housing, and the wound element, so that the distance between the separator and the lid, cylindrical housing, wound element is shortened at both the ends of the wound element. The welding for connecting the collector to the lid and cylindrical housing thus sometimes burns the end of the separator, and the insulation between the anodic electrode unit and the cathodic electrode unit becomes in failure.

The cylindrical capacitor discussed above needs a positive insulation between the anode and the cathode, and on top of that, if an apparatus to which the capacitor is mounted is vibrated, the wound element is required not to come off from the lid or the cylindrical housing. To meet this requirement, the lid or the housing is provided with a protrusion at its center, and they are inserted into a winding shaft of the wound element to be tightly assembled. The center of the wound element thus agrees with that of the cylindrical housing so that a given clearance between the wound element and the cylindrical housing is preferably prepared for fixing the wound element to the housing. In the conventional cylindrical capacitor disclosed in patent document 1, collectors 2023 and 2025 of the electrode units are bent toward winding shaft 2020 of wound element 2017, i.e. toward the core of the wound element as shown in FIGS. 20A, 20E and 20F, so that an open end of winding shaft 2020 is closed by the collectors of the fore-going electrode unit. This fact reveals that the insertion of the protrusion prepared at the center of lid 2003 or cylindrical housing 2002 into winding shaft 2004 of wound element 2001 sometimes breaks collectors 2023 and 2025 in parts. Thus the protrusion prepared at the center of lid 2003 or housing 2002 is not recommended, so that it is not possible for fixing wound element 2001 to housing 2002 with the center of wound element 2001 agreeing with the center of cylindrical housing 2002.

The capacitor disclosed in patent document 2 has an advantage with a view of lowering the resistance of the wound element. FIGS. 21A-21D show the structure of this capacitor. FIG. 21A show an electrode unit and a separator before they are assembled into the wound element. FIG. 21B shows a status where collectors at both the ends of the wound element are welded. FIG. 21C shows a plan view of the electrode unit of the capacitor disclosed in patent document 2, and FIG. 21D shows a plan view of the electrode unit of the capacitor disclosed in patent document 1.

The capacitor disclosed in patent document 2 includes the following elements:

anode-side electrode unit 2101 formed of collector 2103 having flaring section 2104 of which width increases from a first end of a long side to a second end thereof and polarization electrode 2105 formed on collector 2103 except in the region where flaring section 2104 exists; and cathode-side electrode unit 2102 formed of collector 2106 having flaring section 2107 of which width increases from a first end of another long side to a second end thereof, and polarization electrode 2108 formed on collector 2106 except in the region where flaring section 2107 exists.

These elements are rolled together with separators 2109, 2110 placed therebetween using the first end of the long side as the center of the roll. At both the ends of wound element 2111 thus rolled up, anode-side flaring section 2104 and cathode-side flaring section 2107 are bundled and welded together respectively to form collectors 2112 and 2113, which are then connected to terminals 2114, 2115 respectively. The width of anode-side flaring section 2104 and the width of the cathode-side flaring section 2107 flare opposite to each other with respect to the width direction of anode-side electrode unit 2102 respectively.

As show in FIG. 21C, electrode unit 2116 disclosed in patent document 2 measures M on its long side, and measures λ on the width of polarization electrode 2118, and the first end of the longitudinal side measures H1+λ, and the second end thereof measures H2+λ. The plane area S0c of collector 2117 is thus calculated with the following equation (1):

$$S0c = \frac{1}{2}M(H1 + H2 + 2\lambda) \quad (1)$$

where H1<H2 is established.

On the other hand, according to the structure shown in patent document 1, electrode unit 2119 measures M on its long side and polarization electrode 2121 measures λ on its width as shown in FIG. 21D. The first and the second ends of the long side measure H2+λ. Plane area S0d of collector 2120 thus figures out M(H2+λ). The difference between S0c and S0d is thus calculated with equation (2).

$$S0c - S0d = \frac{1}{2}M(H1 - H2) \quad (2)$$

Since H1<H2 is established as discussed above, S0c<S0d is established. As a result, the collector of the conventional capacitor disclosed in patent document 2 has a smaller plane area than that of the capacitor disclosed in patent document 1. It will be detailed later but as shown in FIG. 6, the collector has a smaller resistance with its smaller plane area. Therefore, the electrode unit of the wound element of the conventional capacitor disclosed in patent document 2 has a smaller resistance than the electrode unit that of conventional capacitor disclosed in patent document 1. As shown in FIG. 21B, the structure of the capacitor disclosed in patent document 2 allows preventing the edge of electrode unit of the collector from protruding at the edge of the wound element, and also allows a positive connection between the collector and the external terminals of an electric storage device.

According to the structure of the conventional capacitor disclosed in patent document 2; however, the collector of the electrode unit closes the winding shaft of the wound element as shown in FIG. 21B. This is also observed in the conventional capacitor disclosed in patent document 1. The winding shaft closed by the collector prohibits the shaft from being fixed to the housing by using the projection prepared at the center of the lid or the cylindrical housing. As a result, it is difficult for a capacitor to insulate positively between the anode and the cathode, or to obtain the reliability in the vibrating circumstances.

Patent document 1: Unexamined Japanese Patent Application Publication No. H10-294102

Patent document 2: Unexamined Japanese Patent Application Publication No. 2002-56886

DISCLOSURE OF INVENTION

A capacitor of the present invention includes a wound element and electrode members, to be used for an external take-out purpose, coupled respectively to an end face and another end face of the wound element. The externally take-out electrode members correspond to a first pole and a second pole of the wound element. The foregoing structure ensures a connection between the wound element and the externally take-out electrode members and allows the capacitor to have a smaller internal resistance.

The present invention addresses the problem discussed in the background art section and aims to provide the capacitor comprising the following elements:

a wound element including:
  a first electrode unit having a first collector and a first polarization electrode formed locally on both sides of the first collector;
  a second electrode unit having a second collector and a second polarization electrode formed locally on both sides of the second collector; and
  a first separator and a second separator disposed between the first electrode unit and the second electrode unit, a cylindrical housing with a bottom plate, which housing has an annular groove;
a lid of the housing, which lid has a hole;
a winding shaft;
a first annular insulating member;
a second annular insulating member;
a stopper to cover the hole; and
electrolyte, The first electrode unit in the wound element is brought into contact with the lid at the first end face formed of the first collector in part, thereby forming a first pole, and second electrode unit in the wound element is brought into contact with the cylindrical housing at the second end face formed of the second collector in part, thereby forming a second pole. The capacitor is thus formed.

The first collector has a border section between the inner most circumference and the outer most circumference of the wound element, and includes a first region between the inner most circumference and the border section, and a second region between the border section and the outer most circumference.

The second collector also has a border section between the inner most circumference and the outer most circumference of the wound element, and includes a first region between the inner most circumference and the border section, and a second region between the border section and the outer most circumference.

Parts of the first or the second collector, where no first or second polarization electrode exists, in the first region at the first or the second end face are slanted toward outside of the wound element and welded together.

Parts of the first or the second collector, where no first or second polarization electrode exists, in the second region at the first or the second end face are slanted toward the core of the wound element and welded together.

The capacitor of the present invention discussed above thus comprises the following elements:
- a lid working as a first pole of the capacitor;
- a cylindrical housing with a bottom plate working as a second pole of the capacitor; and
- a wound element formed of an electrode unit and a separator.

The collector of the electrode unit at the end face of the wound element is detailed hereinafter: a border section is prepared between the inner most circumference and the outer most section of the wound element, and the collectors of the electrode unit, existing between the inner most circumference and the border section, are bent toward the outer most circumference. On the other hand, the collectors of the electrode unit, existing between the border section and the outer most section, are bent toward the inner most circumference of the wound element. The collectors thus bent are brought into contact with the lid or the cylindrical housing. This structure allows providing the lid or the housing with a protrusion at their centers, and the winding shaft of the wound element can be thus fixed to the lid or the housing with this protrusion. On top of that, the wound element can be held keeping the electrode unit corresponding to the first pole from contact with the cylindrical housing corresponding to the second pole. Both of the poles of the capacitor can be thus positively insulated, thereby assuring the reliability in vibrating circumstances. The electrode unit of the wound element of this capacitor has a border section between its first end and the second end with respect to its longitudinal direction, and, a region where no polarization electrodes exist has a minimum width in this border section, and yet, has a maximum width in at least one of the first end or the second end. This structure allows minimizing the plane area of the collectors of the electrode unit, so that the electrode obtains a minimized resistance, and the capacitor can thus lower its internal resistance.

BRIEF DESCRIPTION OF THE DRAWINGS

FIG. 3C shows a perspective view of an essential part of the wound element rolled up of the capacitor in accordance with the first embodiment of the present invention.

FIG. 3D shows a plan view and a sectional view of an essential part of the capacitor in accordance with the first embodiment of the present invention.

FIG. 8A shows a perspective view of an essential part of a wound element of the capacitor in accordance with the second embodiment of the present invention.

FIG. 8B shows a sectional view of an essential part of the wound element of the capacitor in accordance with the second embodiment of the present invention.

FIG. 8C shows a perspective view of an essential part of the wound element rolled up of the capacitor in accordance with the second embodiment of the present invention.

FIG. 8D shows a plan view and a sectional view of an essential part of the capacitor in accordance with the second embodiment of the present invention.

FIG. 12C shows a perspective view of an essential part of the wound element rolled up of the capacitor in accordance with the third embodiment of the present invention.

FIG. 12D shows a plan view and a sectional view of an essential part of the capacitor in accordance with the third embodiment of the present invention.

FIG. 14A shows a plan view of an electrode unit of the capacitor in accordance with the third embodiment of the present invention.

FIG. 14B shows a sectional view of an essential part of the electrode unit of the capacitor in accordance with the third embodiment of the present invention.

FIG. 17C shows a perspective view of an essential part of the wound element rolled up of the capacitor in accordance with the fourth embodiment of the present invention.

FIG. 17D shows a plan view and a sectional view of an essential part of the capacitor in accordance with the fourth embodiment of the present invention.

FIG. 20A shows a sectional view cut along the axial direction of a conventional cylindrical capacitor.

FIG. 20B shows a sectional view of a wound element of the conventional cylindrical capacitor.

FIG. 20C shows a sectional view of an essential part of the wound element of the conventional cylindrical capacitor.

Figure 1:
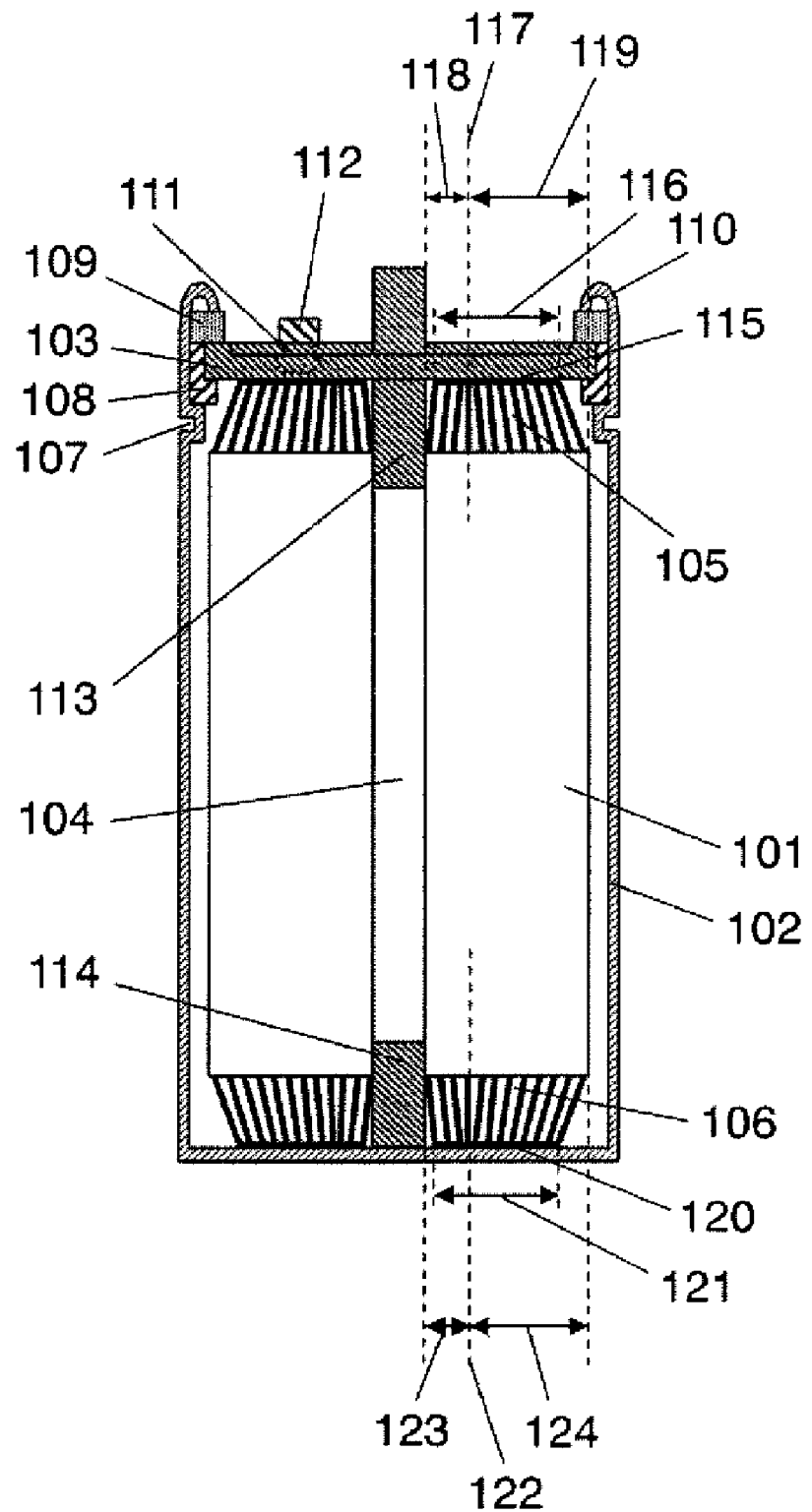
FIG. 1 shows a sectional view of a capacitor in accordance with a first embodiment of the present invention.

DESCRIPTION OF REFERENCE MARKS 101 wound element
102 cylindrical metal housing with a bottom plate
103 metal lid
104 winding shaft
105 collector of a first electrode unit to be a first pole
106 collector of a second electrode unit to be a second pole
107 annular groove engraved on a lateral wall in part of housing 102
108 first annular insulator (packing)
109 second annular insulator (square ring)
110 annular curl section formed of an open end of housing 102
111 hole punched on lid 103
112 stopper
113 projection forming parts of lid 103
114 projection forming parts of a bottom plate of housing 102
115 end face of collector 105 of a first electrode unit
116 welded region between lid 103 and electrode unit 105
117 border section in collector group 105
118 first region in collector group 105
119 second region in collector group 105
120 an end face of collector 106 of a second electrode unit
121 welded region between housing 102 and electrode unit 106
122 border section in collector group 106
123 first region in collector group 106
124 second region in collector group 106
201 electrode unit to be a first pole
202 collector of electrode unit 201 to be a first pole
203 polarization electrode of electrode unit 201 to be a first pole
204 first end of electrode unit 201 (head of winding, i.e. a core section of the wound element)
205 second end of electrode unit 201 (end of winding, i.e. outer most section of the wound element)
206 border section of electrode unit 201
207 first region of electrode unit 201
208 second region of electrode unit 201
209 electrode unit to be a second pole 210 collector of electrode unit 209 to be a second pole
211 polarization electrode of electrode unit 209 to be a second pole
212 first end of electrode unit 209 (head of winding, i.e. a core section of the wound element)
213 second end of electrode unit 209 (end of winding, i.e. outer most section of the wound element)
214 border section of electrode unit 209
215 first region of electrode unit 209
216 second region of electrode unit 209
301 wound element
302 electrode unit to be a first pole
303 collector of electrode unit 302 to be a first pole
304 polarization electrode of electrode unit 302 to be a first pole
305 electrode unit to be a second pole
306 collector of electrode unit 305 to be a second pole
307 polarization electrode of electrode unit 305 to be a second pole
308 first separator
309 second separator
310 winding stopper tape
311 winding shaft
312 head of winding of electrode unit 302 to be a first pole
313 end of winding of electrode unit 302 to be a first pole
314 border section in collector group 303 of an electrode unit to be a first pole
315 first region in collector group 303 of an electrode unit to be a first pole
316 second region in collector group 303 of an electrode unit to be a first pole
317 head of winding of electrode unit 305 to be a second pole
318 end of winding of electrode unit 305 to be a second pole
319 border section in collector group 306 of an electrode unit to be a second pole
320 first region in collector group 306 of an electrode unit to be a second pole
321 second region in collector group 306 of an electrode unit to be a second pole
322 polarization electrode end of an electrode unit to be a first pole and that of an electrode unit to be a second pole
323 cross section
401 wound element
402 collector of an electrode unit to be a first pole
403 collector of an electrode unit to be a second pole
404 wounding shaft
405 first region in collector group 402 of an electrode unit to be a first pole
406 second region in collector group 402 of an electrode unit to be a first pole
407 first region in collector group 403 of an electrode unit to be a second pole
408 second region in collector group 403 of an electrode unit to be a second pole
409 collector of an electrode unit to be a first pole
410 collector of an electrode unit to be a second pole
411 collector of an electrode unit in a first region on a first pole side
412 collector of an electrode unit in a second region on a first pole side
413 border section between a first region and a second region on a first pole side
414 polarization electrode of an electrode unit to be a first pole
415 collector of an electrode unit in a first region on a second pole side
416 collector of an electrode unit in a second region on a second pole side
417 border section between a first region and a second region on a second pole side
418 polarization electrode of an electrode unit to be a second pole
419 first separator
420 second separator
421 opposing sections of polarization electrodes 414, 418
501 electrode unit of a pole of a wound element of a conventional capacitor
502 collector in electrode unit 501
503 polarization electrode region in electrode unit 501
504 first end of electrode unit 501 (core side of the wound element)
505 second end of electrode unit 501 (outer wall side of the wound element)
506 any position in electrode unit 501
507 collector of electrode unit 501
508 polarization electrode of electrode unit 501
509 electrode unit of a pole of a wound element of a capacitor of the present invention
510 collector region, having no polarization electrode, of electrode unit 509
511 polarization electrode region of electrode unit 509
512 first end of electrode unit 509 (core side of the wound element)
513 second end of electrode unit 509 (outer wall side of the wound element)
514 border section
515 first region
516 second region
517 any position of electrode unit 509
518 collector of electrode unit 509
519 polarization electrode of electrode unit 509
701 electrode unit to be a first pole
702 collector of electrode unit 701 to be a first pole
703 polarization electrode of electrode unit 701 to be a first pole
704 first end of electrode unit 701 (head of wiring, i.e. core side of the wound element)
705 second end of electrode unit 701 (end of wiring, i.e. outer wall side of the wound element)
706 first border section of electrode unit 701
707 second border section of electrode unit 701
708 first region of electrode unit 701
709 second region of electrode unit 701
710 third region of electrode unit 701
711 electrode unit to be a second pole
712 collector of electrode unit 711 to be a second pole
713 polarization electrode of electrode unit 711 to be a second pole
714 first end of electrode unit 711 (head of wiring, i.e. core side of the wound element)
715 second end of electrode unit 711 (end of wiring, i.e. outer wall side of the wound element)
716 first border section of electrode unit 711
717 second border section of electrode unit 711
718 first region of electrode unit 711
719 second region of electrode unit 711
720 third region of electrode unit 711
801 wound element
802 electrode unit to be a first pole
803 collector of electrode unit 802 to be a first pole
804 polarization electrode of electrode unit 802 to be a first pole
805 electrode unit to be a second pole 806 collector of electrode unit 805 to be a second pole
807 polarization electrode of electrode unit 805 to be a second pole
808 first separator
809 second separator
810 winding stopper tape
811 winding shaft
812 winding head of electrode unit 802 to be a first pole
813 winding end of electrode unit 802 to be a first pole
814 first border section in collector group 803 of an electrode unit to be a first pole
815 second border section in collector group 803 of an electrode unit to be a first pole
816 first region in collector group 803 of an electrode unit to be a first pole
817 second region in collector group 803 of an electrode unit to be a first pole
818 third region in collector group 803 of an electrode unit to be a first pole
819 winding head of electrode unit 805 to be a second pole
820 winding end of electrode unit 805 to be a second pole
821 first border section in collector group 806 of an electrode unit to be a second pole
822 second border section in collector group 806 of an electrode unit to be a second pole
823 first region in collector group 806 of an electrode unit to be a second pole
824 second region in collector group 806 of an electrode unit to be a second pole
825 third region in collector group 806 of an electrode unit to be a second pole
826 end of polarization electrode of an electrode unit to be a first pole and end of polarization electrode of an electrode unit to be a second pole
827 cross section
901 electrode unit of a pole of a wound element region,
902 collector of electrode unit 901
903 polarization electrode of electrode unit 901
904 first end of electrode unit 901 (core side of the wound element)
905 first border section
906 second border section
907 second end of electrode unit 901 (outer wall side of the wound element)
908 first region
909 second region
910 third region
911 any position of electrode unit 901
912 collector of electrode unit 901
913 polarization electrode of electrode unit 901
1001 wound element
1002 cylindrical metal housing with a bottom plate
1003 metal lid
1004 winding shaft
1005 collector of a first electrode unit to be a first pole
1006 collector of a second electrode unit to be a second pole
1007 annular groove engraved on a lateral wall in part of housing 1002
1008 first annular insulator (packing)
1009 second annular insulator (square ring)
1010 annular curl section formed of an open end of housing 1002
1011 hole punched on lid 1003
1012 stopper
1013 projection forming parts of lid 1003
1014 projection forming parts of a bottom plate of housing 1002
1015 end face of collector 1005 of a first electrode unit
1016 welded region between lid 1003 and electrode unit 1005
1017 first border section of collector group 1005
1018 second border section of collector group 1005
1019 first region of collector group 1005
1020 second region of collector group 1005
1021 third region of collector group 1005
1022 end face of collector 1006 of second electrode unit
1023 welded region between housing 1002 and electrode unit 1006
1024 first border section in collector group 1006
1025 second border section in collector group 1006
1026 first region of collector group 1006
1027 second region of collector group 1006
1028 third region of collector group 1006
1101 electrode unit to be a first pole
1102 collector of electrode unit 1101 to be a first pole
1103 polarization electrode of electrode unit 1101 to be a first pole
1104 first end of electrode unit 1101 (winding head, i.e. core section of the wound element)
1105 second end of electrode unit 1101 (winding end, i.e. outer most section of the wound element)
1106 first border section of electrode unit 1101
1107 second border section of electrode unit 1101
1108 first region of electrode unit 1101
1109 second region of electrode unit 1101
1110 third region of electrode unit 1101
1111 electrode unit to be a second pole
1112 collector of electrode unit 1111 to be a second pole
1113 polarization electrode of electrode unit 1111 to be a second pole
1114 first end of electrode unit 1111 (winding head, i.e. core section of the wound element)
1115 second end of electrode unit 1111 (winding end, i.e. outer most section of the wound element)
1116 first border section of electrode unit 1111
1117 second border section of electrode unit 1111
1118 first region of electrode unit 1111
1119 second region of electrode unit 1111
1120 third region of electrode unit 1111
1201 wound element
1202 electrode unit to be a first pole
1203 collector of electrode unit 1202 to be a first pole
1204 polarization electrode of electrode unit 1202 to be a first pole
1205 electrode unit to be a second pole
1206 collector of electrode unit 1205 to be a second pole
1207 polarization electrode of electrode unit 1205 to be a second pole
1208 first separator
1209 second separator
1210 winding stopper tape
1211 winding shaft
1212 winding head of electrode unit 1202 to be a first pole
1213 winding end of electrode unit 1202 to be a first pole
1214 first border section in collector group 1203 of an electrode unit to be a first pole
1215 second border section in collector group 1203 of an electrode unit to be a first pole
1216 first region in collector group 1203 of an electrode unit to be a first pole
1217 second region in collector group 1203 of an electrode unit to be a first pole
1218 third region in collector group 1203 of an electrode unit to be a first pole
1219 winding head of electrode unit 1205 to be a second pole 1220 winding end of electrode unit 1205 to be a second pole
1221 first border section in collector group 1206 of an electrode unit to be a second pole
1222 second border section in collector group 1206 of an electrode unit to be a second pole
1223 first region in collector group 1206 of an electrode unit to be a second pole
1224 second region in collector group 1206 of an electrode unit to be a second pole
1225 third region in collector group 1206 of an electrode unit to be a second pole
1226 end of polarization electrode of an electrode unit to be a first pole and end of polarization electrode of an electrode unit to be a second pole
1301 wound element
1302 collector of an electrode unit to be a first pole
1303 collector of an electrode unit to be a second pole
1304 winding shaft
1305 first region of collector group 1302 of electrode unit to be a first pole
1306 second region of collector group 1302 of electrode unit to be a first pole
1307 third region of collector group 1302 of electrode unit to be a first pole
1308 first region of collector group 1303 of electrode unit to be a second pole
1309 second region of collector group 1303 of electrode unit to be a second pole
1310 third region of collector group 1303 of electrode unit to be a second pole
1311 collector of electrode unit to be a first pole
1312 collector of electrode unit to be a second pole
1313 collector of electrode unit in first region on first pole side
1314 collector of electrode unit in second region on first pole side
1315 collector of electrode unit in third region on first pole side
1316 border section between first region and second region on first pole side
1317 border section between first region and third region on first pole side
1318 polarization electrode of electrode unit to be a first pole
1319 collector of electrode unit in first region on second pole side
1320 collector of electrode unit in second region on second pole side
1321 collector of electrode unit in third region on second pole side
1322 border section between first region and second region on second pole side
1323 border section between first region and third region on second pole side
1324 polarization electrode of electrode unit to be a second pole
1325 first separator
1326 second separator
1327 opposing sections of polarization electrodes 1318, 1324
1401 collector of a pole of electrode unit
1402 collector of electrode unit 1401
1403 polarization electrode of electrode unit 1401
1404 first end of electrode unit 1401 (core side of wound element)
1405 first border section
1406 second border section
1407 second end of electrode unit 1401 (outer wall side of wound element)
1408 first region
1409 second region
1410 third region
1411 any position of electrode unit 1401
1412 collector of electrode unit 1401
1413 polarization electrode of electrode unit 1401
1501 wound element
1502 cylindrical metal housing with a bottom plate
1503 metal lid
1504 winding shaft
1505 collector of a first electrode unit to be a first pole
1506 collector of a second electrode unit to be a second pole
1507 annular groove engraved on a lateral wall in part of housing 1502
1508 first annular insulator (packing)
1509 second annular insulator (square ring)
1510 annular curl section formed of an open end of housing 1502
1511 hole punched on lid 1503
1512 stopper
1513 projection forming parts of lid 1503
1514 projection forming parts of a bottom plate of housing 1502
1515 end face of collector 1505 of a first electrode unit
1516 welded region between lid 1503 and electrode unit 1505
1517 first border section of collector group 1505
1518 second border section of collector group 1505
1519 first region of collector group 1505
1520 second region of collector group 1505
1521 third region of collector group 1505
1522 end face of collector 1506 of second electrode unit
1523 welded region between housing 1502 and electrode unit 1506
1524 first border section in collector group 1506
1525 second border section in collector group 1506
1526 first region of collector group 1506
1527 second region of collector group 1506
1528 third region of collector group 1506
1601 electrode unit to be a first pole
1602 collector of electrode unit 1601 to be a first pole
1603 polarization electrode of electrode unit 1601 to be a first pole
1604 first end of electrode unit 1601 (winding head, i.e. core section of the wound element)
1605 second end of electrode unit 1601 (winding end, i.e. outer most section of the wound element)
1606 first border section of electrode unit 1601
1607 second border section of electrode unit 1601
1608 first region of electrode unit 1601
1609 second region of electrode unit 1601
1610 third region of electrode unit 1601
1611 step at first border section of electrode unit 1601
1612 step at second border section of electrode unit 1601
1613 electrode unit to be a second pole
1614 collector of electrode unit 1613 to be a second pole
1615 polarization electrode of electrode unit 1613 to be a second pole
1616 first end of electrode unit 1613
1617 second end of electrode unit 1613
1618 first border section of electrode unit 1613
1619 second border section of electrode unit 1613
1620 first region of electrode unit 1613
1621 second region of electrode unit 1613
1622 third region of electrode unit 1613
1623 step at first border section of electrode unit 1613
1624 step at second border section of electrode unit 1613
1701 wound element
1702 electrode unit to be a first pole 1703 collector of electrode unit 1702 to be a first pole
1704 polarization electrode of electrode unit 1702 to be a first pole
1705 electrode unit to be a second pole
1706 collector of electrode unit 1705 to be a second pole
1707 polarization electrode of electrode unit 1705 to be a second pole
1708 first separator
1709 second separator
1710 winding stopper tape
1711 winding shaft
1712 winding head of electrode unit 1702 to be a first pole
1713 winding end of electrode unit 1702 to be a first pole
1714 first border section in collector group 1703 of an electrode unit to be a first pole
1715 second border section in collector group 1703 of an electrode unit to be a first pole
1716 first region in collector group 1703 of an electrode unit to be a first pole
1717 second region in collector group 1703 of an electrode unit to be a first pole
1718 third region in collector group 1703 of an electrode unit to be a first pole
1719 winding head of electrode unit 1705 to be a second pole
1720 winding end of electrode unit 1705 to be a second pole
1721 first border section in collector group 1706 of an electrode unit to be a second pole
1722 second border section in collector group 1706 of an electrode unit to be a second pole
1723 first region in collector group 1706 of an electrode unit to be a second pole
1724 second region in collector group 1706 of an electrode unit to be a second pole
1725 third region in collector group 1706 of an electrode unit to be a second pole
1726 end of polarization electrode of an electrode unit to be a first pole and end of polarization electrode of an electrode unit to be a second pole
1801 wound element
1802 collector of an electrode unit to be a first pole
1803 collector of an electrode unit to be a second pole
1804 winding shaft
1805 first region of collector group 1802 of electrode unit to be a first pole
1806 second region of collector group 1802 of electrode unit to be a first pole
1807 third region of collector group 1802 of electrode unit to be a first pole
1808 first region of collector group 1803 of electrode unit to be a second pole
1809 second region of collector group 1803 of electrode unit to be a second pole
1810 third region of collector group 1803 of electrode unit to be a second pole
1811 collector of electrode unit to be a first pole
1812 collector of electrode unit to be a second pole
1813 collector of electrode unit in first region on first pole side
1814 collector of electrode unit in second region on first pole side
1815 collector of electrode unit in third region on first pole side
1816 border section between first region and second region on first pole side
1817 border section between first region and third region on first pole side
1818 polarization electrode of electrode unit to be a first pole
1819 collector of electrode unit in first region on second pole side
1820 collector of electrode unit in second region on second pole side
1821 collector of electrode unit in third region on second pole side
1822 border section between first region and second region on second pole side
1823 border section between first region and third region on second pole side
1824 polarization electrode of electrode unit to be a second pole
1825 first separator
1826 second separator
1827 opposing sections of polarization electrodes 1818, 1824
1901 collector of a pole of electrode unit
1902 collector of electrode unit 1901
1903 polarization electrode of electrode unit 1901
1904 first end of electrode unit 1901 (core side of wound element)
1905 first border section
1906 second border section
1907 second end of electrode unit 1901 (outer wall side of wound element)
1908 first region
1909 second region
1910 third region
1911 first step
1912 second step
1913 any position of electrode unit 1901
1914 collector of electrode unit 1901
1915 polarization electrode of electrode unit 1901
1916 electrode unit in accordance with third embodiment
1917 collector of electrode unit 1916
1918 electrode unit in accordance with fourth embodiment
1919 collector of electrode unit 1918
1920 differential region 1 between collectors 1917 and 1919
1921 differential region 2 between collectors 1917 and 1919
2001 wound element
2002 cylindrical metal housing with a bottom plate
2003 metal lid
2004 winding shaft
2005 collector of a first electrode unit
2006 collector of a second electrode unit
2007 annular groove engraved on a lateral wall in part of housing
2008 first annular insulator
2009 second annular insulator
2010 annular curl section formed of an open end of housing 2002
2011 hole punched on lid 2003
2012 stopper
2013 end face of collector 2005 of first electrode unit
2014 welded region between lid 2003 and electrode unit 2005
2015 end face of collector 2006 of second electrode unit
2016 welded region between housing 2002 and electrode unit 2006
2017 wound element
2018 collector of electrode unit to be a first pole
2019 collector of electrode unit to be a second pole
2020 winding shaft
2021 first region formed of collector 2002 of electrode unit to be a first pole
2022 second region formed of collector 2003 of electrode unit to be a second pole
2023 collector of electrode unit to be a first pole
2024 polarization electrode of electrode unit to be a first pole 2025 collector of electrode unit to be a second pole
2026 polarization electrode of electrode unit to be a second pole
2027 first separator
2028 second separator
2029 opposing sections of polarization electrodes 2024, 2026
2030 electrode unit of one pole of wound element
2031 collector region having no polarization electrode
2032 polarization electrode region
2033 first end of electrode unit (core side of wound element)
2034 second end of electrode unit (outer wall side of wound element)
2101 anode-side electrode
2102 cathode-side electrode
2103 collector of anode-side electrode 2101
2104 flaring section of anode-side collector 2103
2105 polarization electrode of anode-side electrode 2101
2106 collector of cathode-side electrode 2102
2107 flaring section of cathode-side collector 2106
2108 polarization electrode of cathode-side electrode unit 2102
2109 separator
2110 separator
2111 wound element
2112 anode-side collector
2113 cathode-side collector
2114 anode-side collector terminal
2115 cathode-side collector terminal
2116 electrode unit of a conventional capacitor
2117 collector of electrode unit 2116
2118 polarization electrode of electrode unit 2116
2119 electrode unit of a conventional capacitor
2120 collector of electrode unit 2119
2121 polarization electrode of electrode unit 2119

DESCRIPTION OF PREFERRED EMBODIMENTS

To solve the problems discussed in the background art section, a capacitor of the present invention comprises the following elements:
a wound element including:
  a first electrode unit including a first collector having a first polarization electrode disposed locally on both sides of the first collector;
  a second electrode unit including a second collector having a second polarization electrode disposed locally on both sides of the second collector; and
  a first and a second separators disposed between the first and the second electrode units,
a cylindrical housing with a bottom plate, on which housing an annular groove is engraved;
a lid of the housing having a hole;
a winding shaft;
a first annular insulating member;
a second annular insulating member;
a stopper for closing the hole of the lid; and
electrolyte.

The first electrode unit of the wound element is coupled to the lid at a first end face formed of parts of the first collector, thereby forming a first pole, and the second electrode unit of the wound element is coupled to the housing at a second end face formed of parts of the second collector, thereby forming a second pole.

The wound element of the capacitor includes a border section between the inner most circumference and the outer most circumference of a wound element of the first collector, a first region between the inner most circumference and the border section, and a second region between the border section and the outer most circumference.

The wound element of the capacitor also includes a border section between the inner most circumference and the outer most circumference of a wound element of the second collector, a first region between the inner most circumference and the border section, a second region between the border section and the outer most circumference.

Parts of the first or the second collectors, where no first or second polarization electrodes exist, in the first region of the first or the second end face are slanted toward the outer circumference and welded together.

Parts of the first or the second collectors, where no first or second polarization electrodes exist, in the second region of the first or the second end face are slanted toward the core of the wound element and welded together.

A capacitor of the present invention comprises the following elements:
  a region where a first or a second polarization electrode opposite to each other in a rectangular form on both sides of a first or a second collector; and
  a region where the first or the second polarization electrode is not formed.

A width of the first or the second collector becomes minimum in the border section, and yet, the width thereof becomes maximum in at least one of the inner most circumference or the outer most circumference of the first or the second collector.

A capacitor of the present invention as defined in claim 1 comprises the following elements;
  the first or the second electrode unit including, along the long side thereof, a first end to be a first end section, a second end to be a second end section, a first border section and a second border section in a middle region between the first end section and the second end section; and
  the first or the second collector including, on both sides thereof, a predetermined region where the first or the second polarization electrode opposite to each other in a rectangular form, and a region where the first or the second polarization electrode is not formed.
The width of the first or the second collector takes a minimum value in a section between the first and the second border sections, and yet, takes a maximum value in at least one of the first end section or the second end section.

A capacitor of the present invention as defined in claim 1 comprises the following elements:
  a first or a second electrode unit including, along the long side thereof, a first end to be a first end section, a second end to be a second end section, a first border section and a second border section in a middle region between the first end section and the second end section; and
  a first or a second collector including, on both sides thereof, a predetermined region where a first or a second polarization electrode opposite to each other in a rectangular form, and a region where the first or the second polarization electrode is not formed.
The width of the region, defined between the first end section and the second end section and having no first or second polarization electrodes, takes a minimum value in the section between the first and the second border sections, and the width of the first or the second collector increases by a given amount with respect to the width between the first and the second border sections, and yet, the width takes a maximum amount in at least one of the first end section or the second end section.

A capacitor of the present invention comprises the following elements:
- a wound element including:
  - a first electrode unit including a first collector having a first polarization electrode disposed locally on both sides of the first collector;
  - a second electrode unit including a second collector having a second polarization electrode disposed locally on both sides of the second collector; and
  - a first and a second separators disposed between the first and the second electrode units,
- a cylindrical housing with a bottom plate, on which housing an annular groove is engraved;
- a lid of the housing having a hole;
- a winding shaft;
- a first annular insulating member;
- a second annular insulating member;
- a stopper for closing the hole of the lid; and
- electrolyte.

The first electrode unit of the wound element is coupled to the lid at a first end face formed of parts of the first collector, thereby forming a first pole, and the second electrode unit of the wound element is coupled to the housing at a second end face formed of parts of the second collector, thereby forming a second pole.

The first collector of the wound element of the capacitor includes a first border section and a second border section between the inner most circumference and the outer most circumference, a first region between the inner most circumference and the first border section, a second region between the first and the second border sections, and a third region between the second border section and the outer most circumference.

The second collector of the wound element of the capacitor also includes a first border section and a second border section between the inner most circumference and the outer most circumference, a first region between the inner most circumference and the first border section, a second region between the first and the second border sections, and a third region between the second border section and the outer most circumference.

Parts of the first or the second collectors, where no first or second polarization electrode exist, in the first region are slanted such that the first end face or the second end face is directed toward the outer circumference and welded.

Parts of the first or the second collectors, where no first or second polarization electrodes exist, in the third region are slanted such that the first end face or the second end face is directed toward the core of the wound element and welded.

A capacitor of the present invention comprises the following elements:
- a region where a first or a second polarization electrode is formed opposite to each other in a rectangular form on both sides of a first or a second collector; and
- a region where the first or the second polarization electrode is not formed.

A width of the region where the first or the second polarization electrode is not formed takes a minimum value in the second region, and yet, takes the maximum value on at least one of the inner most or the outer most circumference of the first or the second collector.

A capacitor of the present invention comprises the following elements:
- a region where a first or a second polarization electrode is formed opposite to each other in a rectangular form on both sides of a first or a second collector; and
- a region where the first or the second polarization electrode is not formed.

A width of the region where the first or the second polarization electrode is not formed takes a minimum value in the second region, and yet, the width increases by a given amount with respect to the width of the second region in at least one of around the first border section or around the second border section, the width yet still takes the maximum value in at least one of the inner most or the outer most circumference of the first or the second collector.

The lid of the capacitor of the present invention includes a projection at the center of its surface to be coupled with the wound element.

The housing of the capacitor of the present invention includes, at its bottom center, a projection protruding inward.

The sections having the minimum width of the first and the second electrode units of the capacitor of the present invention protrude outward by 0.6-1.0 mm with respect to the edges of the first and second separators.

The capacitor of the present invention is formed of at least the following elements:
- a lid functioning as a first pole of the capacitor;
- a cylindrical housing with a bottom plate, which housing functions as a second pole of the capacitor;
- a wound element formed of electrode units and separators.

The wound section is provided with a border section between its inner most circumference and its outer most circumference, and collectors of the electrode unit between the inner most circumference and the border section are bent toward the outer most circumference of the wound element, and collectors of the electrode unit between the border section and the outer most circumference are bent toward the inner most circumference of the wound element. The lid or the housing is coupled to the collectors thus bent. This structure allows preparing a projection at the center of the lid or the housing, and the projection allows fixing a winding shaft of the wound element to the lid or the housing. The structure also allows holding the electrode unit, working as a first pole, kept from touching the housing which works as a second pole of the capacitor, so that both of the poles of the capacitor can be positively insulated, and the reliability in vibrating circumstances can be assured.

The capacitor of the present invention includes a border section between a first end and a second end of the electrode unit, along the long side, of the wound element. A width of a region where no polarization electrode is formed takes a minimum value on this border section, and yet, the width takes a maximum value on at least one of the first end or the second end. This structure allows reducing a plane area of the collectors of the electrode, so that the electrode has a smaller resistance. As a result, an internal resistance of the capacitor can be lowered.

Preferred embodiments of the present invention are demonstrated hereinafter with reference to the accompanying drawings. Each one of the embodiments is only an example for carrying out the present invention, which is thus not limited by these embodiments.

Exemplary Embodiment 1

Figure 2A:
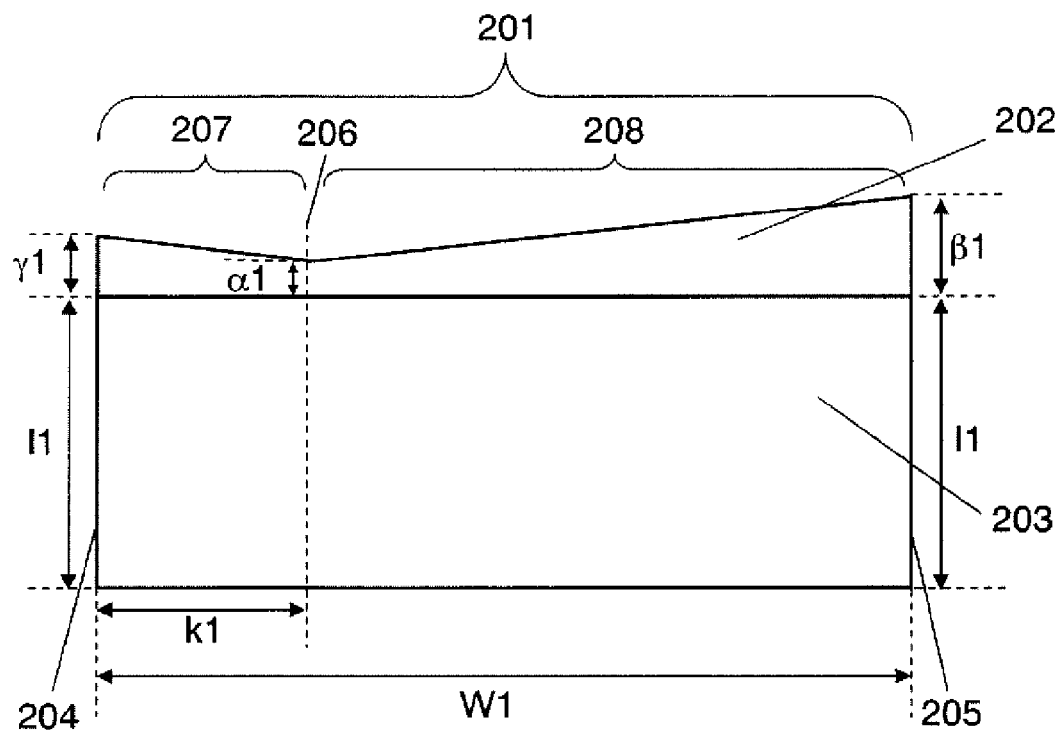
FIG. 2A shows a plan view of an electrode unit of the capacitor in accordance with the first embodiment of the present invention.
Figure 2B:
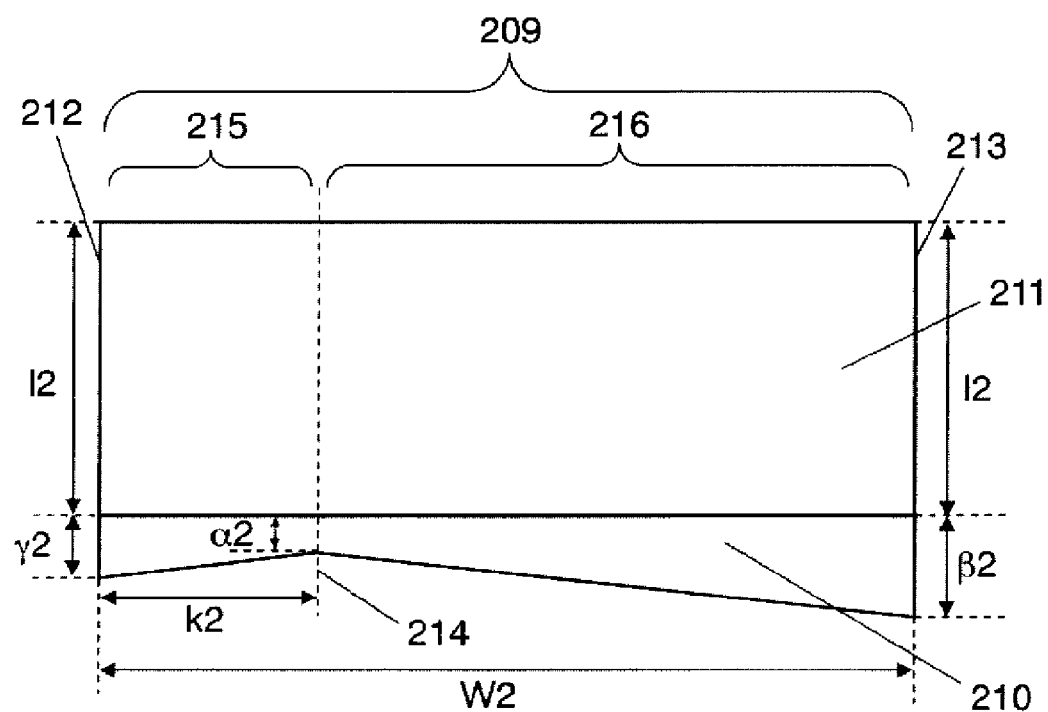
FIG. 2B shows another electrode unit of the capacitor in accordance with the first embodiment of the present invention.
Figure 3A:
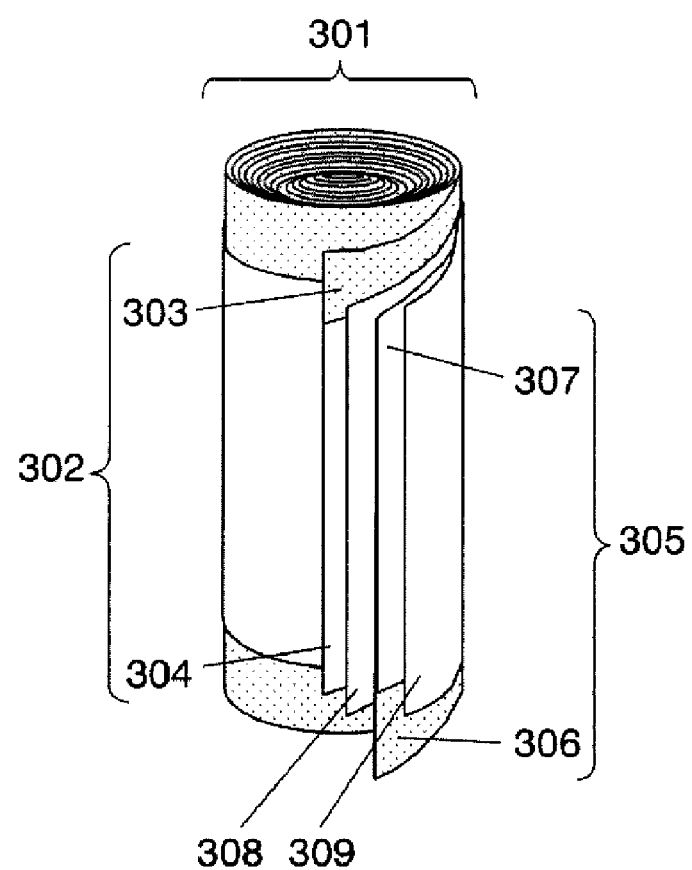
FIG. 3A shows a perspective view of an essential part of a wound element of the capacitor in accordance with the first embodiment of the present invention.
Figure 3B:
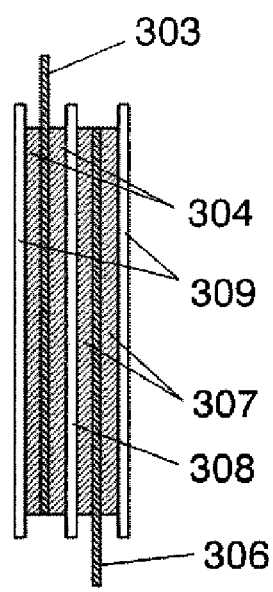
FIG. 3B shows a sectional view of an essential part of the wound element of the capacitor in accordance with the first embodiment of the present invention.
Figure 4A:
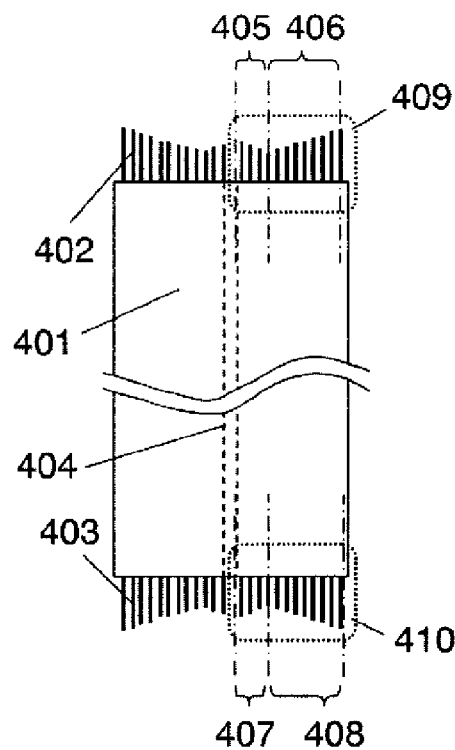
FIG. 4A shows a sectional view of an essential part of a wound element of the capacitor in accordance with the first embodiment of the present invention.
Figure 4B:
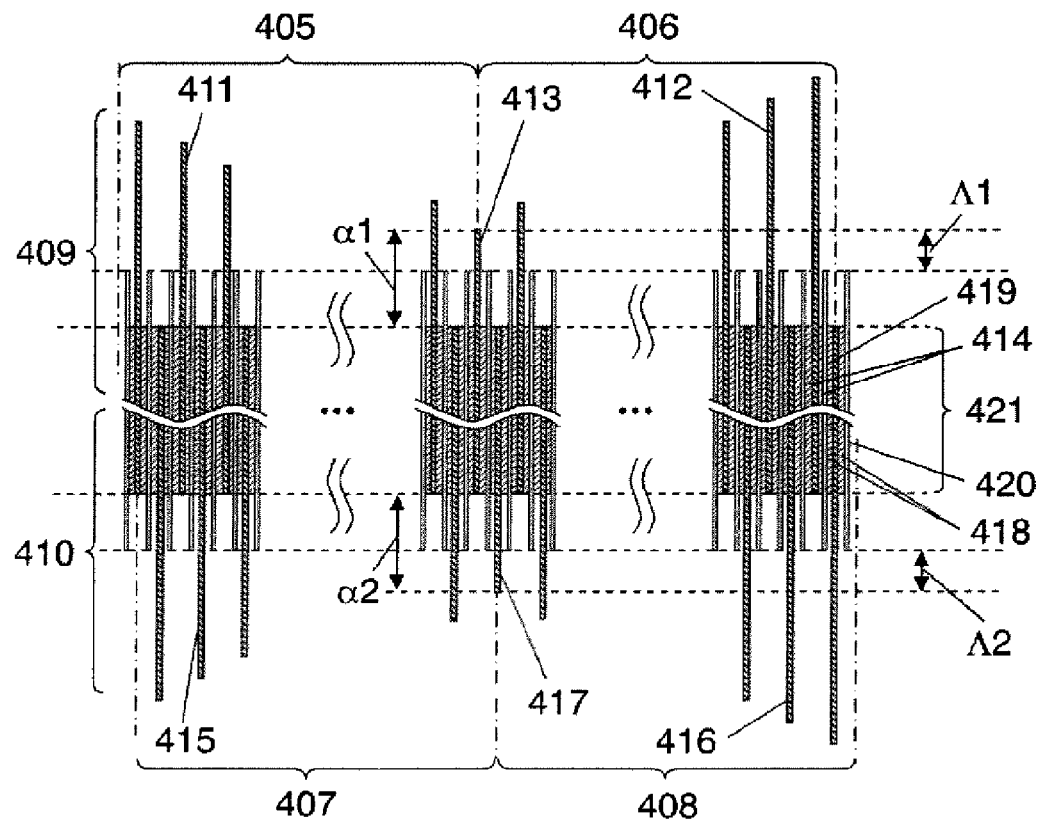
FIG. 4B shows a sectional view of an enlarged essential part of the wound element of the capacitor in accordance with the first embodiment of the present invention.
Figure 4C:
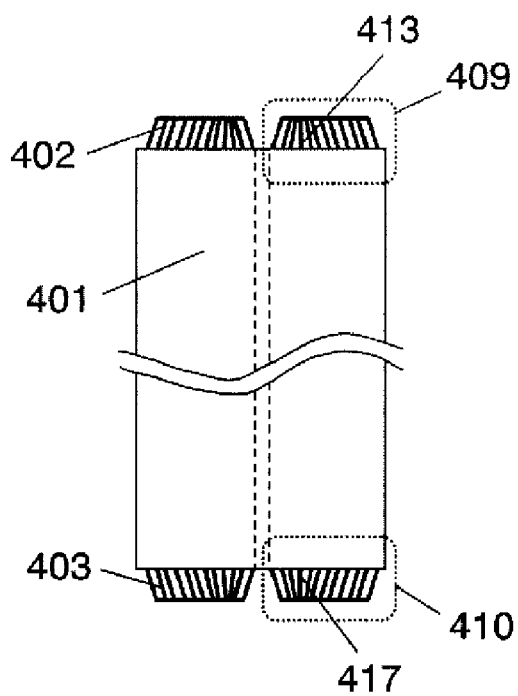
FIG. 4C shows a sectional view of an essential part of bent collectors of the wound element of the capacitor in accordance with the first embodiment of the present invention.
Figure 4D:
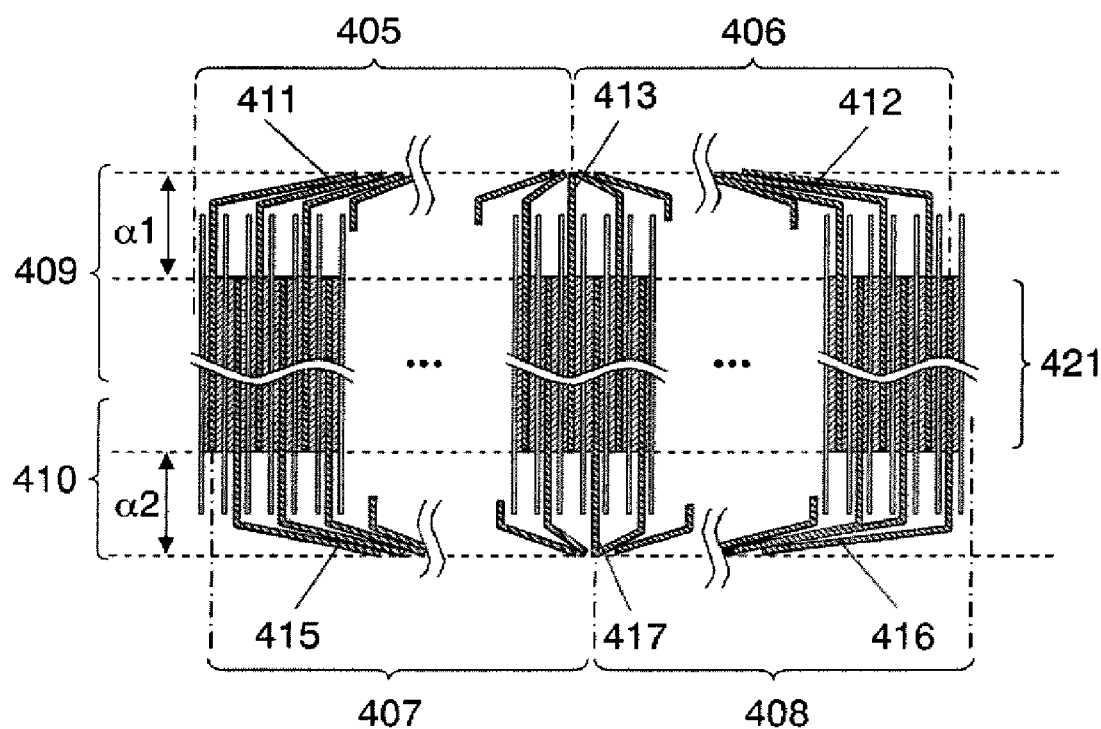
FIG. 4D shows a sectional view of an enlarged essential part of the bent collectors of the wound element of the capacitor in accordance with the first embodiment of the present invention.

The first exemplary embodiment is demonstrated hereinafter with reference to FIG. 1-FIG. 5. FIG. 1 shows a capacitor in accordance with the first embodiment of the present invention, to be more specific, it shows the sectional view of a wound element cut along its winding shaft. FIGS. 2A and 2B show plan views of electrode units, before they are wound, corresponding to respective poles of the wound element of the capacitor. FIG. 3A-3D show the wound element. FIG. 3A shows a perspective view illustrating that the wound element is half-finished its winding. FIG. 3B shows a sectional view illustrating positional relations among structural elements of the wound element. FIG. 5C shows a perspective view illustrating that the wound element is finished its winding. FIG. 3D shows a plan view of an end face of the wound element viewed from the first pole and the second pole, and a sectional view of the wound element cut along its winding shaft and its border section that is described later. FIGS. 4A and 4C show sectional views of the wound element cut along its winding shaft. FIGS. 4B and 4D show enlarged views around the end face of the collector of the wound element. FIGS. 4A and 4B show the wound element just finished its winding. FIGS. 4B and 4D show statuses where the end faces of the collectors are bent. FIG. 5A-FIG. 5D show plan views and sectional views illustrating the comparisons between the electrode unit of the wound element of the capacitor in accordance with the first embodiment and that of the conventional capacitor. The electrode unit shown here does not specify a first pole or a second pole, and illustrates the electrode unit with one pole.

As shown in FIG. 1, wound element 101 is accommodated in cylindrical metal housing 102 having a bottom plate, and metal lid 103 closes housing 102, so that the capacitor is formed. Lid 103 is annular insulating packing 108 of which sectional view shows letter L, or a sealing member. Lid 103 is insulated from housing 102 by annular insulating square ring 109 of which sectional view shows a rectangular shape.

As shown in FIG. 3A-FIG. 3D, wound element 101 is formed by winding electrode unit 302 to be a first pole, e.g. anode, first separator 308, electrode unit 305 to be a second pole, e.g. cathode, second separator 309 together on winding shaft 311 as a core. Electrode unit 302 to be a first pole is formed of collector 303 and polarization electrode 304, which is placed opposite to each other on both sides of collector 303. Electrode unit 305 to be a second pole is formed of collector 306 and polarization electrode 307, which is placed opposite to each other on both sides of collector 306. As shown in FIG. 3B, first separator 308 and second separator 309 are placed such that they lap over polarization electrodes 304, 307 so that they can fully cover electrodes 304 and 307. The capacitor shown in FIG. 1 contains electrolyte impregnated between housing 102, wound element 101, and lid 103; however, the electrolyte is not shown here.

As shown in FIGS. 2A and 2B, electrode unit 201 to be the first pole has different widths along its longitudinal direction. To be more specific, in the section between first end 204 and second end 205 of the long side, although polarization electrode 203 maintains its width at "l1", the width of collector 202 vanes, e.g., "l1+γ1" at first end 204 and "l1+β1" at its second end 205. Between both the ends, i.e. in the foregoing section, the width takes the minimum value "l1+α1" on section 206.

Electrode unit 209 to be the second pole has a similar structure to that of electrode unit 201. In the section between first end 212 and second end 213 of the long sides although polarization electrode 211 maintains its width at "l2", the width of collector 210 varies, e.g., "l2+γ2" at first end 212 and "l2+β2" at its second end 213. Between both the ends, the width takes the minimum value "l2+α2" on section 214.

The foregoing dimensions, α1, β1, γ1, and α2, β2, γ2, satisfy the following relations: α1<γ1<β1, and α2<γ2<β2, and yet, any one of the greater-than signs may come with an equal sign. The foregoing dimensions also satisfy the following conditions:

Dimensions α1 and α2 are the minimum values that can prevent the separator from being burned by the welding for coupling the lid or the housing of the capacitor with the wound element including electrode units 201, 209. Dimension β1 is at least greater than α1, and β2 is at least greater than α2, however, the actual value is determined by the conditions when the electrode unit is formed. For instance, in the case of cutting out the greatest possible numbers of electrode units from one sheet of electrode foil, since the width of the polarization electrode region is kept at a given value, the dimensions of the collector region, where no polarization electrodes are formed, can be reduced as small as possible. Dimensions β1 and β2 are the minimum dimensions that can be limited by the foregoing circumstances. On top of that, dimension γ1 is a medium value between α1 and β1, and γ2 exists is a medium value between α2 and β2, To satisfy the foregoing conditions, electrode units 201, 209 are placed such that first ends 204, 212 are to be the winding heads, i.e. they are placed at the core section of the wound element, and polarization electrodes 203, 211 are opposed to each other, and yet, second ends 205, 213 are placed at the winding ends, i.e. at the outer most circumference of the wound element. The wound element is thus formed.

As shown in FIG. 3C and FIG. 3D, in the foregoing wound element, the widths of collector 303 of electrode unit 302 and collector 306 of electrode unit 305 taper in regions 315 and 320 from the core section toward the outer most circumference of the wound element. The widths, on the other hand, flare in regions 316 and 321 toward the outer most circumference of the wound element.

As shown in FIG. 4, end faces of collectors 402, 403 of the electrode unit of wound element 401 are bent in different directions depending on each region. To be more specific, collector 411 and collector 415 bend themselves such that their end faces are directed toward the outer circumference of wound element 401. Collector 411 belongs to first region 405 in collector group 402 of the electrode unit to be the first pole, and collector 415 belongs to the first region 407 in collector group 403 of the electrode unit to be the second pole. On the other hand, collector 412 and collector 416 bend themselves such that their end faces are directed toward the core of the wound element. Collector 412 belongs to second region 406 in collector group 402 of the electrode unit to be the first pole, and collector 416 belongs to the second region 408 in collector group 403 of the electrode unit to be the second pole. Border sections 413 and 417 are not bent.

The capacitor with the wound element, in which the collectors of the electrode units are bent, has the following advantages: As shown in FIG. 1, collectors 105 of the first electrode unit to be the first pole and collectors 106 of the second electrode unit to be the second pole are bent in regions 118 and 123 toward the outer circumference from the core of wound element 101. On the other hand, these collectors are bent toward the core from the outer circumference in regions 119 and 124, and the collectors in border sections 117 and 122 are not bent. The collectors are thus welded to lid 103 and housing 102 at their end faces 115 and 120 respectively. In other words, all the collectors are not necessarily bent, but parts of the collectors are bent. This structure allows preventing collectors 105 and 106 from being damaged by projection 113 prepared at the center of lid 103 or projection 114 prepared at the center of cylindrical housing 102. Wound element 101 thus can be fixed to the center of lid 103 or housing 102 free from a contact between collector 105 and housing 102. As a result, the first pole is positively insulated from the second pole of the capacitor, and the wound element is positively fixed to the housing, so that the reliability in vibrating circumferences can be assured.

On top of that, as shown in FIG. 5C, electrode unit 509 of the capacitor in accordance with the first embodiment of the present invention measures "W" on the long side, and polarization electrode region 511 constantly measures its width "l" on any point on the long side. Width of collector 510 varies depending on points on the long side. To be more specific, the width of collector 510 measures "l+γ" on first end 512 and tapers from first end 512 to border section 514 in region 515, specifically the width measures "l+α" on border section 514 that is away from first end 512 by distance "k". In region 516, the width flares from border section 514 toward second end 513, and measures "l+β" on second end 513. Distance "k" from first end 512 satisfies the relation of 0<k<W. The width of collector 510 satisfies the relation of α<γ<β. The relations discussed previously about dimensions α1, β1, γ1 and α2, β2, γ2 can be applied also to dimensions α, β, γ.

Figure 5A:
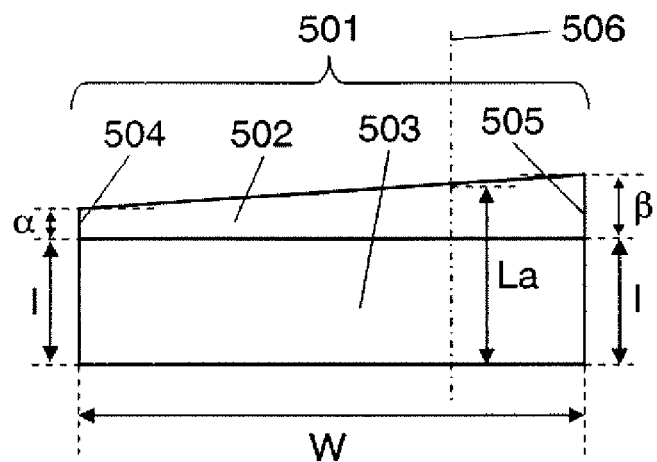
FIG. 5A shows a plan view of an electrode unit of a conventional capacitor.
Figure 5B:
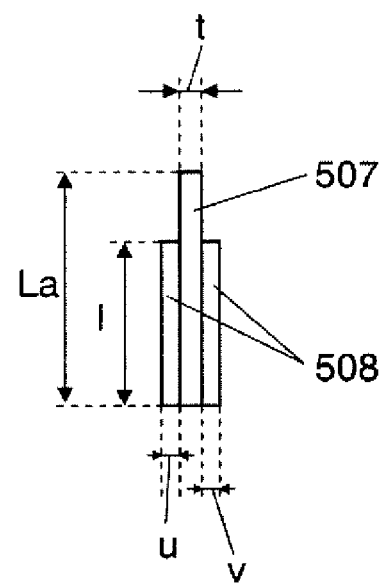
FIG. 5B shows a sectional view of an essential part of the electrode unit of the conventional capacitor.
Figure 5C:
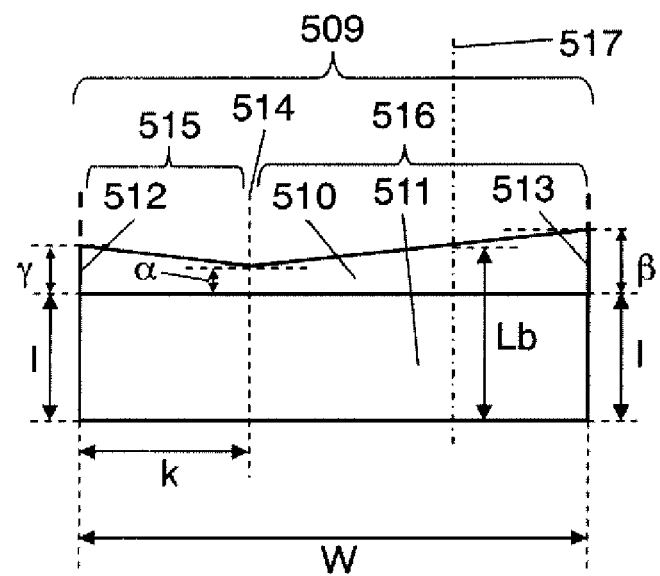
FIG. 5C shows a plan view of an electrode unit of the capacitor in accordance with the first embodiment of the present invention.
Figure 5D:
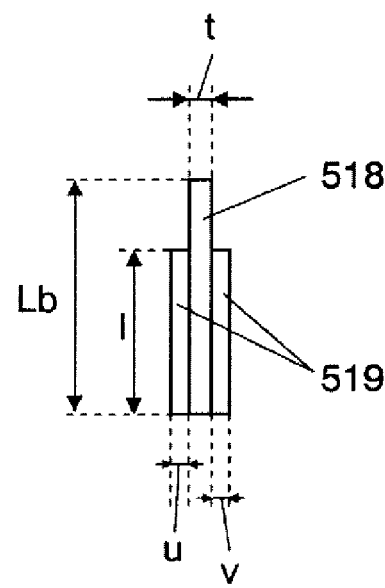
FIG. 5D shows a sectional view of an essential part of the electrode unit of the capacitor in accordance with the first embodiment of the present invention.

FIG. 5D shows a sectional view of electrode unit 509 shown in FIG. 5C cut vertically (along the thickness direction) at any point 517. Electrode unit 509 is formed of collector 518 having thickness "t", polarization electrode 519 formed on both sides of collector 518 with thickness "u" and "v" respectively, and has width "Lb".

The advantage of the foregoing electrode unit 509 is described hereinafter with reference to the drawings illustrating the comparison with an electrode unit of a conventional capacitor, and the relations between voltage, current, and resistance of a conductive unit.

FIG. 5A shows a plan view of the electrode unit of the conventional capacitor, and FIG. 5B shows a sectional view of electrode unit 501 shown in FIG. 5A cut vertically (along the thickness direction) at any point 506. Electrode unit 501 and electrode unit 509 shown in FIG. 5C have the same structural elements, namely, the material and the thickness of the collector and the polarization electrode are common to both of the electrode units. The structure of electrode unit 501 at any point 506 in the sectional view cut along the width direction is illustrated in FIG. 5B. Electrode unit 501 is thus formed of collector 507 having thickness "t" and polarization electrode 508 formed on both sides of collector 507 with thickness "u" and "v" respectively, and has width "La".

In electrode unit 501, the width of polarization electrode 503 constantly measures "l" at any point on the long side of electrode unit 501, and equal to that of polarization electrode 511 of electrode unit 509. The width of collector 502 flares from first end 504 toward second end 505. To be more specific, the width takes a minimum value "α" on first end 504 and takes a maximum value "β" on second end 505. Plane area "Sa" of collector 502 of electrode unit 501 discussed above is exwelded with the following equation (3).

$$Sa = \frac{1}{2}W(\alpha + \beta + 2l) \tag{3}$$

Plane area "Sb" of collector 510 of electrode unit 509 is exwelded with the following equation (4):

$$Sb = \frac{1}{2}W(\alpha + \beta + 2l) - \frac{1}{2}k(\beta - \gamma) \tag{4}$$

where the difference between Sa and Sb is exwelded with the following equation (5):

$$Sa - Sb = \frac{1}{2}k(\beta - \gamma) \tag{5}$$

The foregoing dimensions satisfy the following relations:
Since k>0 and β>γ are established as discussed previously, Sa−Sb>0, i.e. Sa>Sb is established.

Figure 6:
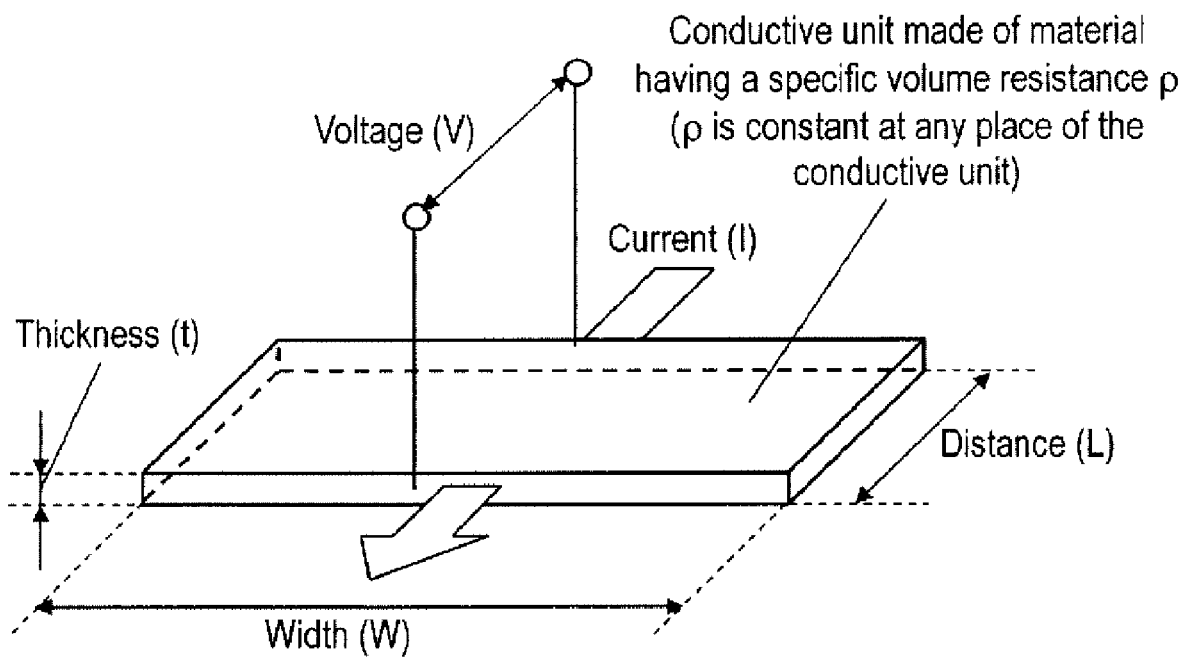
FIG. 6 schematically shows relations among a voltage, a current and a resistance in a conductive material.

FIG. 6 shows relations between a current and a resistance in a rectangular parallelepiped conductive unit to which a given voltage is applied. This conductive unit is made of uniform material and has given dimensions. In FIG. 6, the conductive unit has a given volume resistance rate "ρ" at any part of the unit. A given voltage "V" is applied across this conductive unit between the two lateral faces apart from each other by distance "L", and current "I" runs between the lateral faces. In this case, resistance "R" of the conductive unit is exwelded with equation (6):

$$R = \frac{V}{I} \tag{6}$$

The relation between volume resistance rate "ρ" and resistance "R" is exwelded with equation (7).

$$\rho = R \times \frac{W \times t}{L} \tag{7}$$

Therefore, the following equation (8) is found:

$$R = \rho \times \frac{L}{W \times t} \tag{8}$$

Assume that thickness "t" and width "W" take predetermined values, then resistance "R" can be determined by distance "L", or equation (9) can be found.

$$R = \rho \times \frac{L \times W}{W^2 \times t} = \left(\frac{\rho}{W^2 t}\right) \times (LW) \tag{9}$$

Resistance "R" is thus proportionate to the product of "L" and "W", i.e. plane are "LW" of the conductive unit.

A comparison between plane area "Sa" of collector 502 and that (Sb) of collector 510 results in the relation of Sa>Sb. The plane area of the collector of the capacitor of the present invention is smaller than that of the conventional one, so that the structure of electrode unit 509 of the capacitor of the present invention allows having a lower resistance than electrode unit 501 of the conventional capacitor.

In FIG. 2, the lengths of electrode unit 201 working as the first pole and electrode unit 209 working as the second pole are marked with "W1" and "W2" respectively for expressing the dimension of identical parts of units 201 and 209 to each other. This dimension can be set in response to the target performance of the capacitor, e.g. W1 can be equal to or different from W2. This instance can be applied to "l1" and "l2", "k1" and "k2", "α1" and "α1", "β1" and "β2", "γ1" and "γ2". When electrode units 201 and 209 are wound, first ends 204 and 212 can agree with each other at the winding head, or they do not necessarily agree with each other. Second ends 205 and 213 can agree with each other at the winding end, or they do not necessarily agree with each other. These items can be set in response to the target performance of the capacitor.

In FIG. 4B, collector 412 protrudes from first separator 419 and second separator 420 by length Λ1, and collector 416 protrudes from first separator 419 and second separator 420 by length Λ2. The lengths Λ1 and Λ2 preferably fall within the range of 0.6-1.0 mm. These preferable lengths allow preventing separators 419 and 420 from being burned when wound element 401 is welded to housing 102 or lid 103 shown in FIG. 1. It also allows maximizing the dimensions of polarization electrodes 414 and 418 with respect to housing 102 which has a predetermined depth, so that a capacitor having a large capacity is obtainable.

In FIG. 5, polarization electrode 519 has thickness "u" and "v" respectively on either side of collector 518; however, "u" and "v" can be equal to or different from each other due to the same reason discussed previously.

Exemplary Embodiment 2

The second embodiment is demonstrated hereinafter with reference to FIG. 1, FIG. 4, and FIG. 7-FIG. 9. The capacitor in accordance with the second embodiment differs from that of the first embodiment in the structure of the electrode unit. However, it includes similar structures in parts to those of the first embodiment, and those similar parts are already shown in FIG. 1 and FIG. 4. Hereinafter the different parts from the first embodiment are described.

Figure 7A:
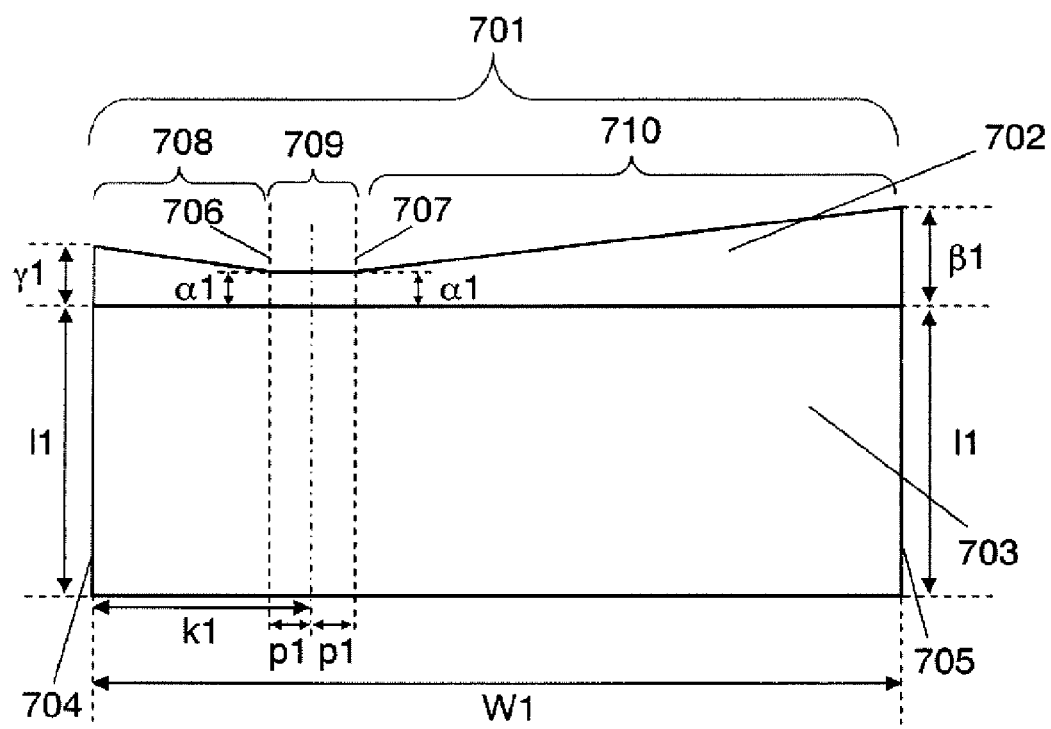
FIG. 7A shows a plan view of an electrode unit of a capacitor in accordance with a second embodiment of the present invention.
Figure 7B:
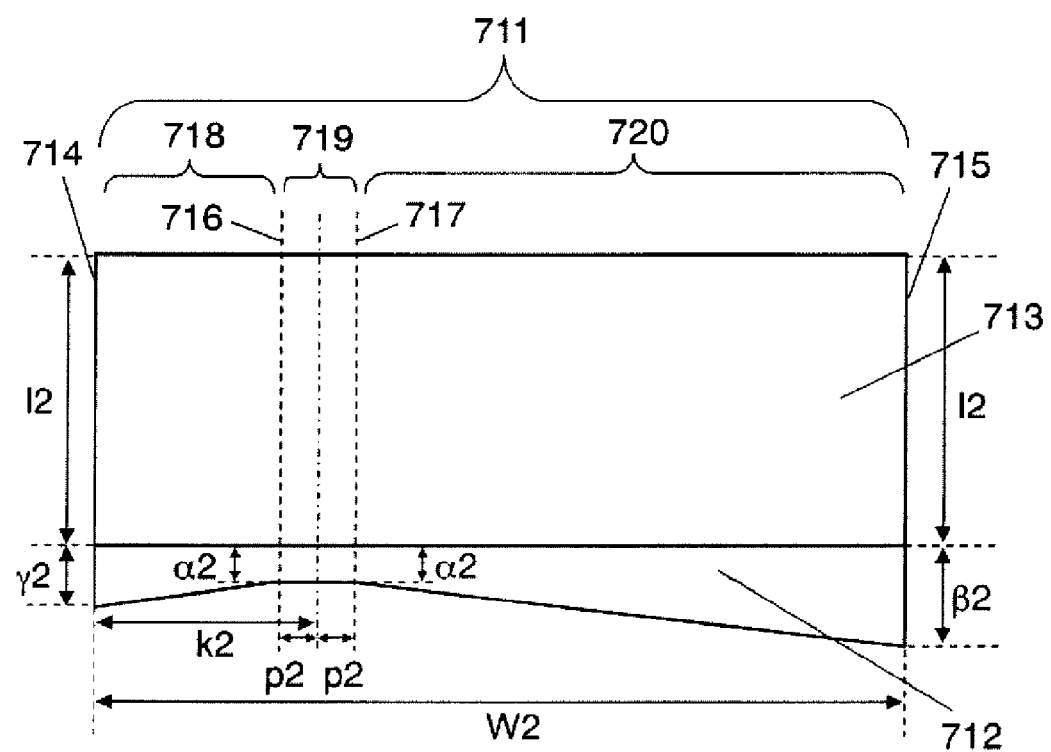
FIG. 7B shows a plan view of another electrode unit of the capacitor in accordance with the second embodiment of the present invention.
Figure 9A:
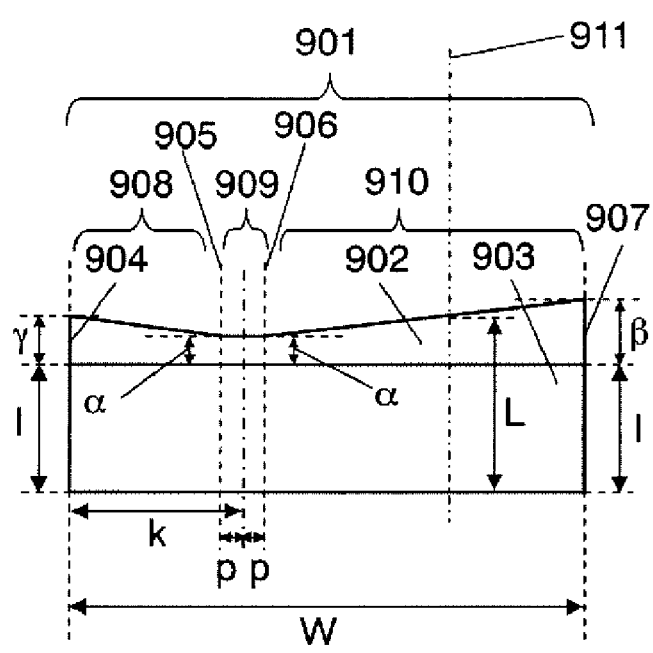
FIG. 9A shows a plan view of an electrode unit of the capacitor in accordance with the second embodiment of the present invention.
Figure 9B:
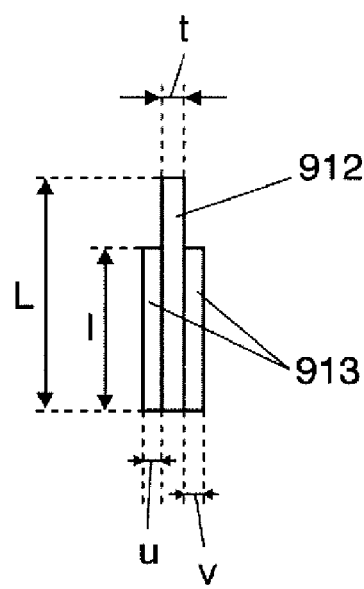
FIG. 9B shows a sectional view of an essential part of the capacitor in accordance with the second embodiment of the present invention.

FIGS. 7A and 7B show plan views of an electrode unit of a capacitor, and respective electrode units corresponding to respective poles of the capacitor are ready to be wound. FIG. 8A-FIG. 8D show a wound element, and FIG. 8A shows a perspective view of the wound element half-finished the winding, and FIG. 8B shows a sectional view illustrating positional relations among the structural elements of the wound element. FIG. 5C shows a perspective view of the wound element finished its winding. FIG. 8D shows a plan view of an end face of the wound element viewed from the first pole and the second pole, and a sectional view of the wound element cut along its winding shaft and its border section that is described later. FIG. 9A shows a plan view of an electrode unit of the wound element of the capacitor. FIG. 9B shows a sectional view of an essential part of the electrode unit with only one pole illustrated.

As shown in FIG. 7, electrode unit 701 to be the first pole has different widths along its long side. To be more specific, in the section between first end 704 and second end 705 of the long side, although polarization electrode 703 maintains its width at "l1", the width of collector 702 varies in some regions, e.g., "l1+γ1" at first end 704 and "l1+β1" at its second end 705. In first region 708 of electrode unit 701, the width of collector 702 tapers from first end 704 to first border section 706 which is placed away from first end 704 by distance "k1−p1". In second region 7 placed between first border section 706 and second border section 707 which is placed away from first end 704 by distance "k1+p1", the width stays at a minimum value "l1+α1". In third region 710, the width flares from second border section 707 to second end 705. The width does not necessarily increase linearly at a given rate. A different point from the first embodiment is a placement, along the long side, of second region 709 where the width stays at the minimum value. The length of second region 709 is 2×p1, i.e. 2p1 as shown in FIG. 7. Dimensions k1, p1, and W1 are in the relations of $0<p1<k1<W1$, and $p1<W1-k1$.

Electrode unit 711 to be the second pole has a similar structure to what is discussed above; In the section between first end 714 and second end 715 of the long side, although polarization electrode 713 maintains its width at "l2", the width of collector 712 varies in some regions, e.g., "l2+γ2" at first end 714 and "l2+β2" at its second end 715. In first region 718 of electrode unit 711, the width of collector 712 tapers from first end 714 to first border section 716 which is placed away from first end 714 by distance "k2−p2". In second region 719 placed between first border section 716 and second border section 717 which is placed away from first end 714 by distance "k2+p2", the width stays at a minimum value "l2+α2". In third region 720, the width flares from second border section 717 to second end 715. The width does not necessarily increase linearly at a given rate. A different point from the first embodiment is a placement, along the long side, of second region 719 where the width stays at the minimum value. The length of second region 719 is 2×p2, i.e. 2p2 as shown in FIG. 7. Dimensions k2, p2, and W2 are in the relations of $0<p2<k2<W2$, and $p2<W2-k2$.

The dimensions α1, β1, γ1 and α2, β2, γ2 are in the relations of $α1<γ1<β1$, and $α2<γ2<β2$, and also they satisfy the same conditions as discussed in the first embodiment. Any one of the foregoing greater-than signs may come with an equal sign.

Electrode units 701, 711 discussed above are configured such that first ends 704, 714 are to be the winding heads, i.e. they are placed at the core section of the wound element, and polarization electrodes 703, 713 are opposed to each other, and yet, second ends 705, 715 are placed at the winding ends, i.e. at the outer most circumference of the wound element. The wound element is thus formed.

As shown in FIG. 8C and FIG. 8D, in the foregoing wound element, the widths of collector 803 of electrode unit 802 and collector 806 of electrode unit 805 taper in regions 816 and 823 from the core section toward the outer circumference of the wound element. The widths stay at the minimum values in regions 817 and 824, on the other hand, they flare in regions 818 and 825 toward the outer circumference of the wound element.

As it is described already in the first embodiment, it is also applicable to the second embodiment, i.e. collectors 402 and 403 of the electrode units of wound element 401 bend themselves such that their end faces are directed in different directions in response to the respective regions as shown in FIGS. 4C and 4D. To be more specific, collector 411 and collector 415 bend themselves such that their end faces are directed toward the outer circumference of wound element 401. Collector 411 belongs to first region 405 in collector group 402 of the electrode unit to be the first pole, and collector 415 belongs to the first region 407 in collector group 403 of the electrode unit to be the second pole. On the other hand, collector 412 and collector 416 bend themselves such that their end faces are directed toward the core of the wound element. Collector 412 belongs to second region 406 in collector group 402 of the electrode unit to be the first pole, and collector 416 belongs to the second region 408 in collector group 403 of the electrode unit to be the second pole. Collectors in border sections 413 and 417 are not bent.

The capacitor, in accordance with the second embodiment, having the wound element, in which the collectors of the electrode units are bent, has the following advantages: As shown in FIG. 1, collectors 105 of the first electrode unit to be the first pole and collectors 106 of the second electrode unit to be the second pole are bent in regions 118 and 123 toward the outer circumference from the core of wound element 101. On the other hand, in regions 119 and 124, they are bent toward the core from the outer circumference, and the collectors in border sections 117 and 122 are not bent. Collectors 105 and 106 in the foregoing status are welded with lid 103 and housing 102 at their end faces 115 and 120. This structure allows preventing collectors 105 and 106 from being damaged by projection 113 prepared at the center of lid 103 or projection 114 prepared at the center of cylindrical housing 102. Wound element 101 thus can be fixed to the center of lid 103 or housing 102 free from a contact between collector 105 and housing 102. As a result, the first pole is positively insulated from the second pole of the capacitor, and the wound element is positively fixed to the housing, so that the reliability in vibrating circumferences can be assured.

On top of that, as shown in FIG. 9A, electrode unit 901 of the capacitor in accordance with the second embodiment of the present invention measures "W" on the long side, and polarization electrode region 903 constantly measures its width "l" on any point on the long side. The width of collector 902 varies depending on points on the long side. To be more specific, the width of collector 902 measures "l+γ" on first end 904 and tapers from first end 904 to border section 905 in region 908, specifically the width measures "l+α" in region 909 between border section 905 and border section 906. Border section 905 is away from first end 904 by distance "k−p" and border section 906 is away from first end 904 by distance "k+p". In region 910, the width flares from border section 906 toward second end 907, and measures "l+β" on second end 907. Dimensions "k", "p", "W" are in the relations of 0<p<k<W, and p<W−k. The width of collector 902 satisfies the relation of α<γ<β. The relations discussed previously about dimensions α1, β1, γ1 and α2, β2, γ2 can be also applied to dimensions α, β, γ.

FIG. 9B shows a sectional view of electrode unit 901 shown in FIG. 9A cut vertically (along the thickness direction) at any point 911. Electrode unit 901 is formed of collector 912 having thickness "t", polarization electrode 913 formed on both sides of collector 912 with thickness "u" and "v" respectively, and has width "L".

The advantage of the foregoing electrode unit 901 is described hereinafter through comparing the capacitor in accordance with the first embodiment with the electrode unit of this second embodiment. As shown in FIG. 5, plane area Sb of collector 510 of electrode unit 509 of the capacitor in accordance with the first embodiment is exwelded with equation 10:

$$Sb = \frac{1}{2}W(\alpha + \beta + 2l) - \frac{1}{2}k(\beta - \gamma) \quad (10)$$

On the other hand, plane area Sc of collector 902 of electrode unit 901 shown in FIG. 9 is expressed with equation (11):

$$Sc = \frac{1}{2}W(\alpha + \beta + 2l) - \frac{1}{2}k(\beta - \gamma) - \frac{1}{2}p(\beta + \gamma - 2\alpha) \quad (11)$$

The difference between Sb and Sc is expressed with equation 12:

$$Sb - Sc = \frac{1}{2}p(\beta + \gamma - 2\alpha) \quad (12)$$

The foregoing dimensions satisfy the following relations:
Since p>0 and β>γ>α are established as discussed previously, Sb−Sc>0, i.e. Sb>Sb is established. The structure of the electrode unit employed in the capacitor in accordance with the second embodiment allows reducing the plane area of the collector from that of the capacitor in accordance with the first embodiment, so that the collector has a further lower resistance as shown in FIG. 6. As a result, the capacitor can lower its internal resistance.

In FIG. 7, the lengths of electrode unit 701 corresponding to the first pole and electrode unit 711 corresponding to the second pole are marked with "W1" and "W2" respectively for expressing the dimension of the identical parts to each other of units 701 and 711. These dimensions can be set in response to the target performance of the capacitor, e.g. W1 can be equal to or different from W2. This instance can be applied to "l1" and "l2", "k1" and "k2", "p1" and "p2", "α1" and "α2", "β1" and "β2", "γ1" and "γ2". When electrode units 701 and 711 are wound, first ends 704 and 714 can agree with each other at the winding head, or they do not necessarily agree with each other. Second ends 705 and 715 can agree with each other at the winding end, or they do not necessarily agree with each other. These items can be set in response to the target performance of the capacitor.

As it is already discussed in the first embodiment, it is also applicable to the second embodiment, i.e. in FIG. 4B, collector 412 protrudes from first separator 419 and second separator 420 by length Λ1, and collector 416 protrudes from first separator 419 and second separator 420 by length Λ2. The lengths Λ1 and Λ2 preferably fall within the range of 0.6-1.0 mm. These preferable lengths allow preventing separators 419 and 420 from being burned when wound element 401 is welded to housing 102 or lid 103 shown in FIG. 1. It also allows maximizing the dimensions of polarization electrodes 414 and 418 with respect to housing 102 which has a predetermined depth, so that a capacitor having a large capacity is obtainable.

In FIG. 9, polarization electrode 913 has thickness "u" and "v" respectively on either side of collector 912; however, "u" and "v" can be equal to or different from each other due to the same reason discussed previously.

Exemplary Embodiment 3

The third embodiment of the present invention is demonstrated hereinafter with reference to FIG. 10-FIG. 14.

Figure 10:
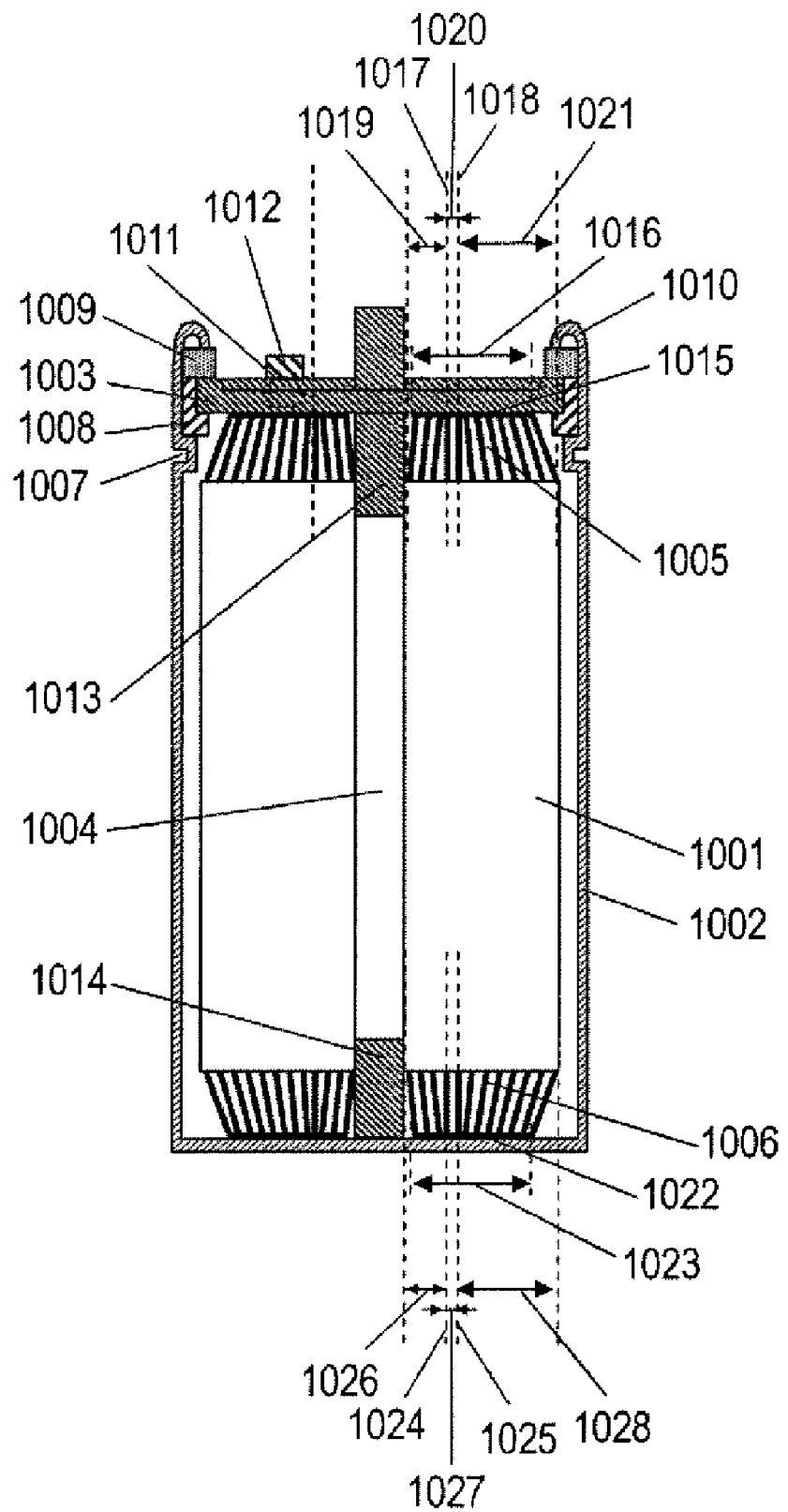
FIG. 10 shows a sectional view of a capacitor in accordance with a third embodiment of the present invention.
Figure 11A:
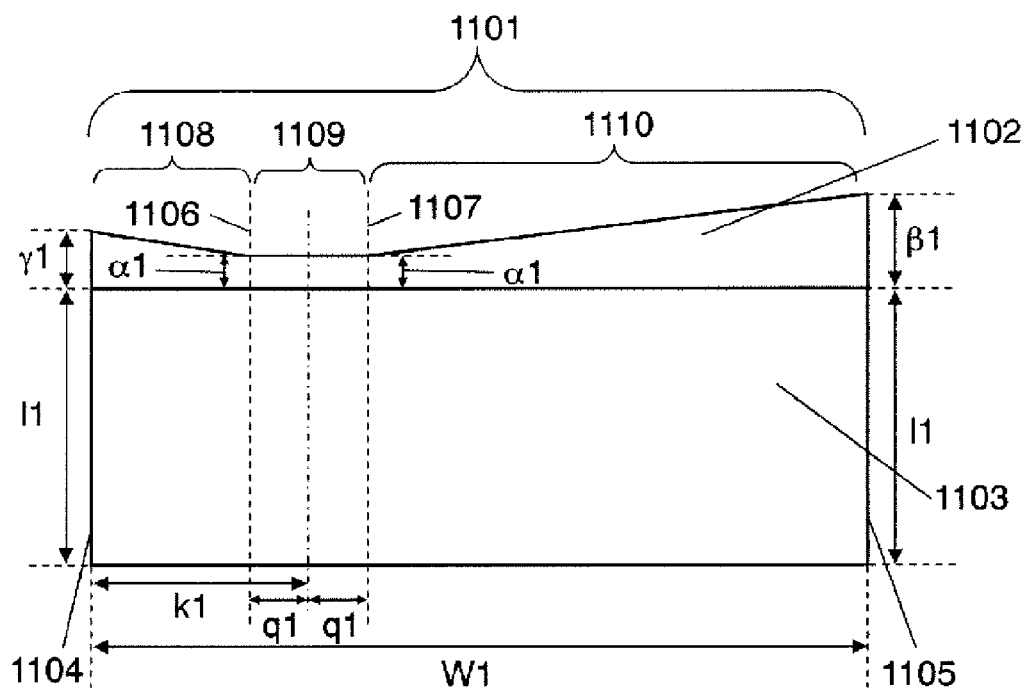
FIG. 11A shows a plan view of an electrode unit of the capacitor in accordance with the third embodiment of the present invention.
Figure 11B:
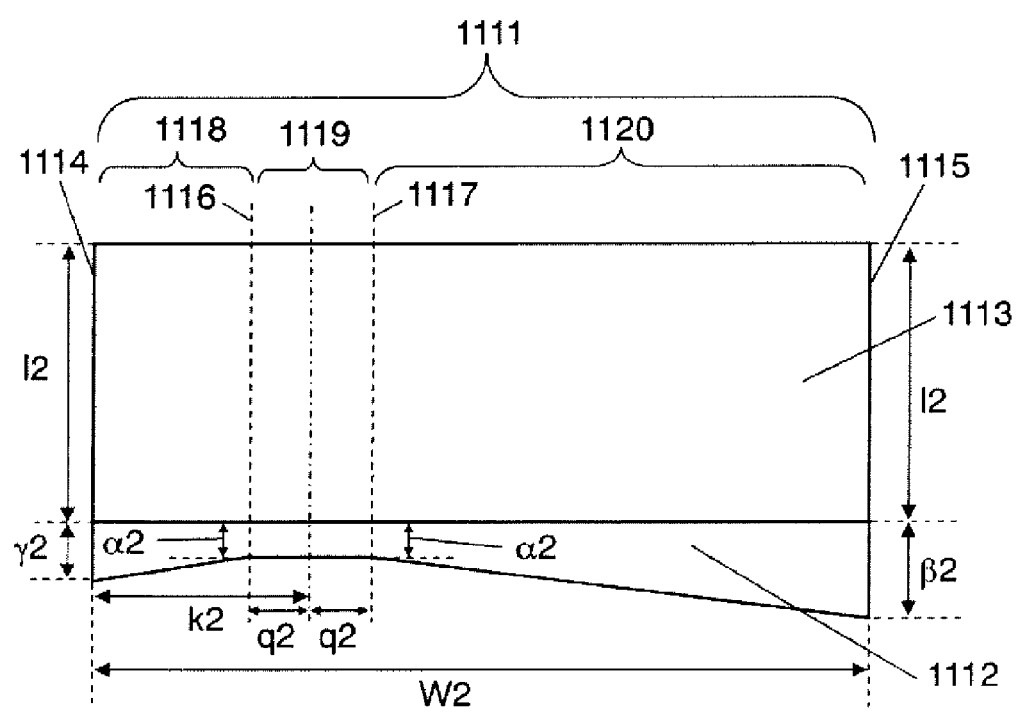
FIG. 11B shows a plan view of another electrode unit of the capacitor in accordance with the third embodiment of the present invention.
Figure 12A:
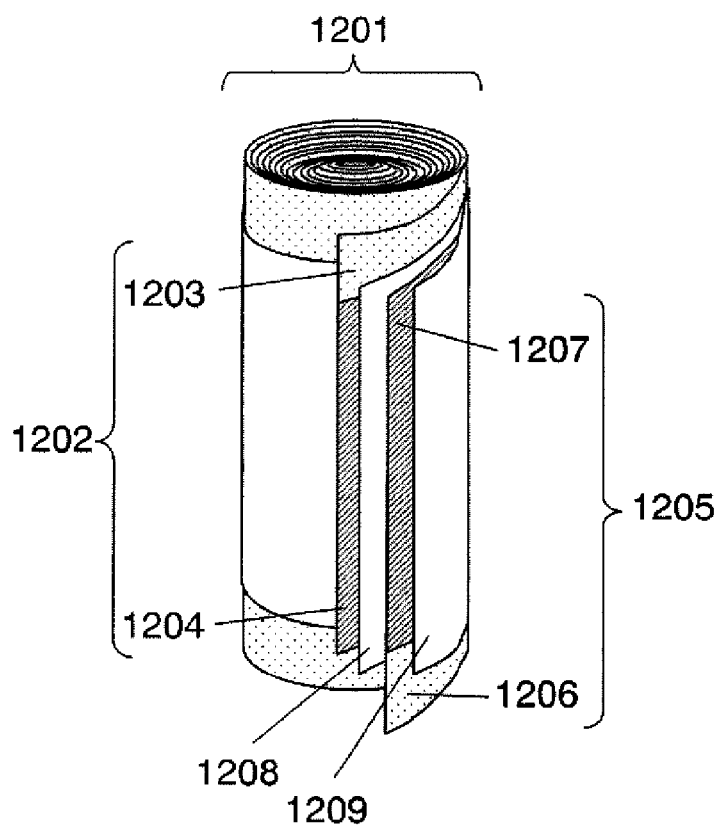
FIG. 12A shows a perspective view of an essential part of a wound element of the capacitor in accordance with the third embodiment of the present invention.
Figure 12B:
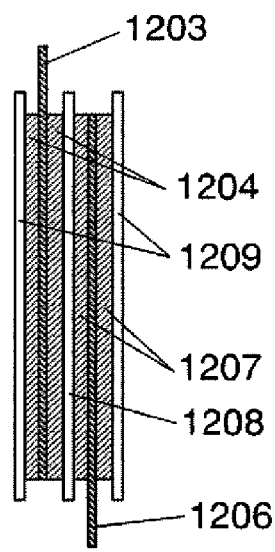
FIG. 12B shows a sectional view of an essential part of the wound element of the capacitor in accordance with the third embodiment of the present invention.
Figure 13A:
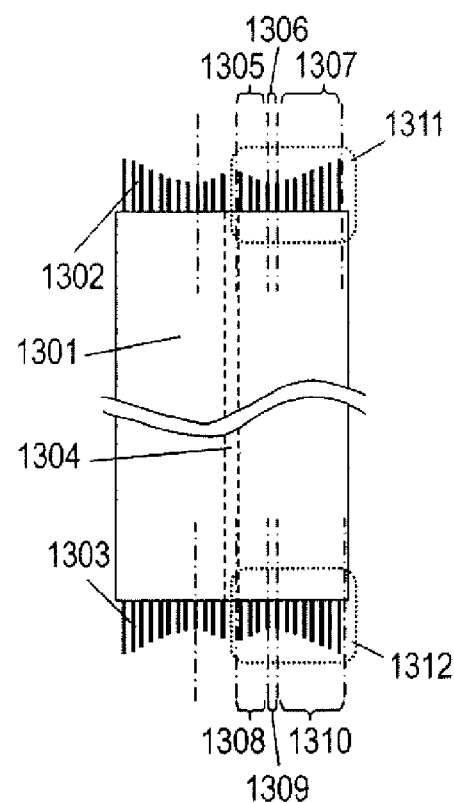
FIG. 13A shows a sectional view of an essential part of a wound element of the capacitor in accordance with the third embodiment of the present invention.
Figure 13B:
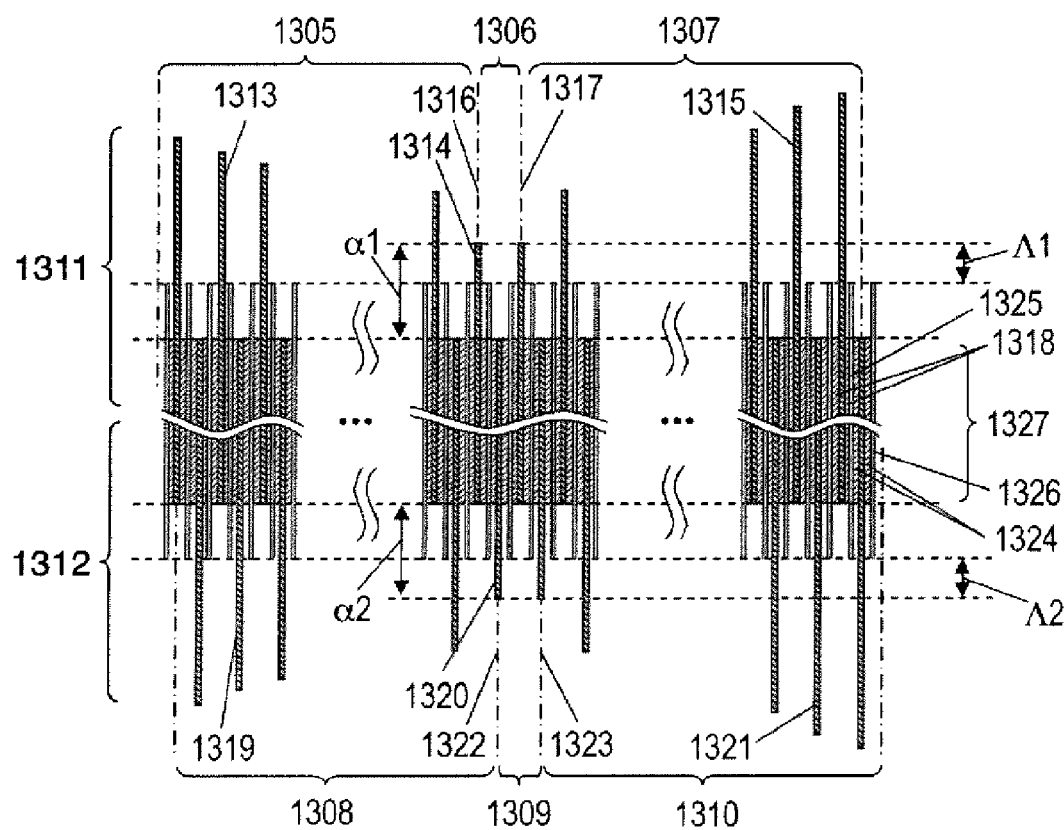
FIG. 13B shows a sectional view of an enlarged essential part of the wound element of the capacitor in accordance with the third embodiment of the present invention.
Figure 13C:
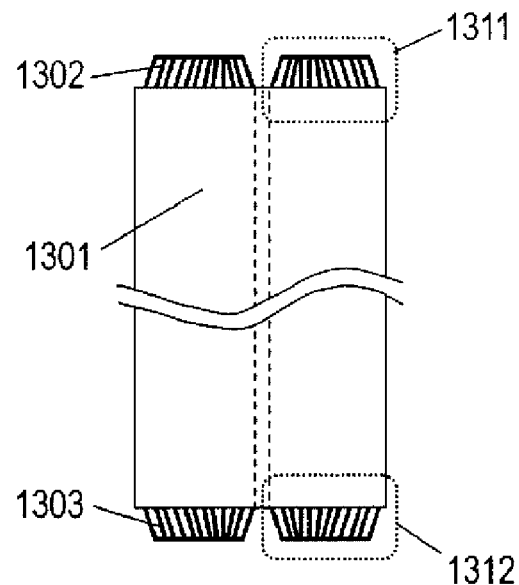
FIG. 13C shows a sectional view of an essential part of bent collectors of the wound element of the capacitor in accordance with the third embodiment of the present invention.
Figure 13D:
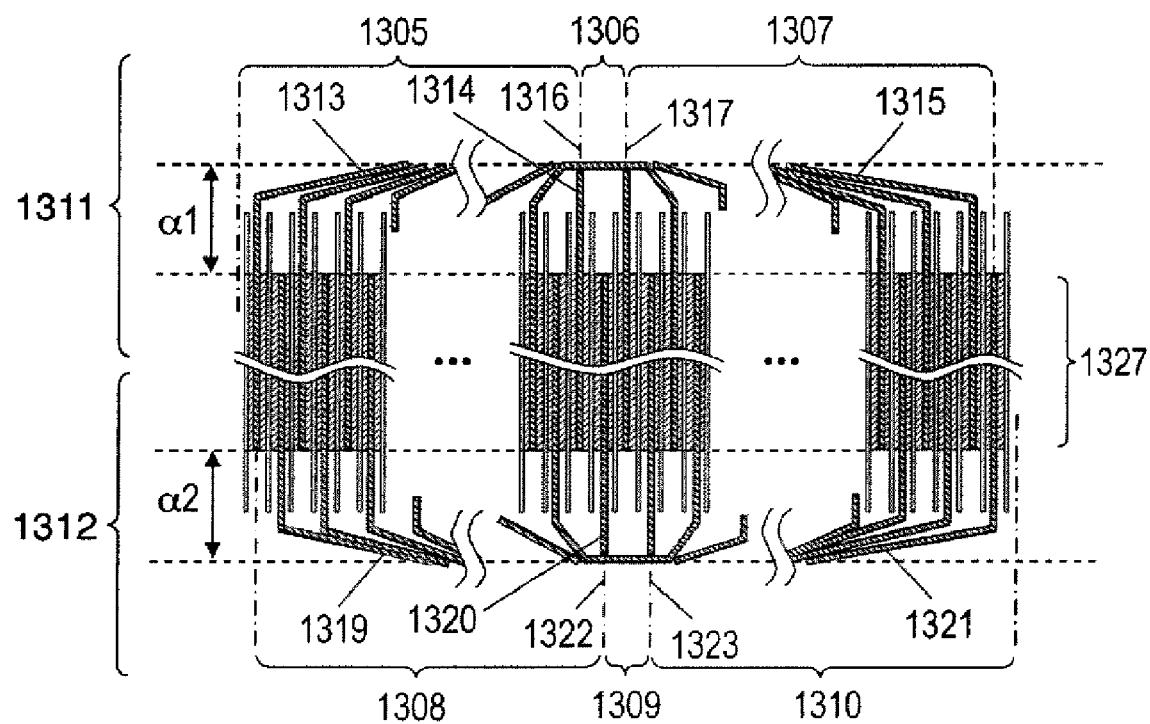
FIG. 13D shows a sectional view of an enlarged essential part of the bent collectors of the wound element of the capacitor in accordance with the third embodiment of the present invention.

FIG. 10 shows a sectional view of the capacitor in accordance with the third embodiment, in FIG. 10 the capacitor is cut along a winding shaft of a wound element. FIGS. 11A and 11B show plan views of an electrode unit of the wound element, and the plan views illustrate status where the wound element is ready to be wound. FIGS. 12A-12D show the wound element. FIG. 12A shows a perspective view of the wound element half-finished the winding, and FIG. 12B shows a sectional view illustrating positional relations among the structural elements of the wound element. FIG. 12C shows a perspective view of the wound element finished its winding. FIG. 12D shows a plan view of an end face of the wound element viewed from the first pole, and a sectional view of the wound element cut along its winding shaft and its border section that is described later. FIGS. 13A and 13C show sectional views of the wound element cut along the winding shaft. FIGS. 13B and 13D show enlarged views around an end face of a collector of the wound element. FIGS. 13A and 13B show the wound element just finished the winding, and FIGS. 13C and 13D show the status where the collectors are bent. FIG. 14 shows a plan view and a sectional view of an essential part of the electrode unit with only one pole illustrated.

As shown in FIG. 10, the capacitor is formed of wound element 1001 accommodated in cylindrical metal housing 1002 which has a bottom plate and is closed by metal lid 1003. Lid 1003 is insulated from housing 1002 with annular insulating packing 1008, of which sectional view shows a letter "L", and annular insulating square ring 1009 which works as a sealing member and shows a rectangle in its sectional view.

As shown in FIGS. 12A-12D, wound element 1001 comprises the following elements:
electrode unit 1202 to be a first pole, e.g. anode;
first separator 1208;
electrode unit 1205 to be a second pole, e.g. cathode; and
second separator 1209.

These elements are rolled up together on winding shaft 1211 as a core. Electrode unit to be the first pole includes collector 1203 and polarization electrode 1204, which is placed oppositely to each other on both sides of collector 1203. Electrode unit 1205 to be the second pole includes collector 1206 and polarization electrode 1207, which is placed oppositely to each other on both sides of collector 1206. As shown in FIG. 12B, first separator 1208 and second separator 1209 are placed such that they lap over polarization electrodes 1204, 1207 so that they can fully cover electrodes 1204 and 1207. The capacitor shown in FIG. 10 contains electrolyte impregnated between housing 1002, wound element 1001, and lid 1003; however, the electrolyte is not shown here.

As shown in FIG. 11, electrode unit 1101 to be the first pole has different widths along its long side. To be more specific, in the section between first end 1104 and second end 1105 of the long side, although polarization electrode 1103 maintains its width at "l1", the width of collector 1102 varies in some regions, e.g., "l1+γ1" at first end 1104 and "l1+β1" at its second end 1105. In first region 1108 of electrode unit 1101, the width of collector 1102 tapers from first end 1104 to first border section 1106 which is placed away from first end 1104 by distance "k1−q1". In second region 1109 placed between first border section 1106 and second border section 1107 which is placed away from first end 1104 by distance "k1+q1", the width stays at a minimum value "l1+α1". In third region 1110, the width flares from second border section 1107 to second end 1105. A different point from the first embodiment is a placement, along the long side, of second region 1109 where the width stays at the minimum value. A different point from the second embodiment is locations of the first and the second border sections based on the relation of q1>p1. The lengths of those regions are in the relation of 2q1>2p1. Dimensions k1, q1, and W1 are in the relations of 0<q1<k1<W1, and q1<W1−k1.

Electrode unit 1111 to be the second pole has a similar structure to what is discussed above; In the section between first end 1114 and second end 1115 of the long side, although polarization electrode 1113 maintains its width at "l2", the width of collector 1112 varies in some regions, e.g., "l2+γ2" at first end 1114 and "l2+β2" at its second end 1115. In first region 1118 of electrode unit 1111, the width of collector 1112 tapers from first end 1114 to first border section 1116 which is placed away from first end 1114 by distance "k2−q2". In second region 1119 placed between first border section 1116 and second border section 1117 which is placed away from first end 1114 by distance "k2+q2", the width stays at a minimum value "l2+α2". In third region 1120, the width flares from second border section 1117 to second end 1115. A different point from the first embodiment is a placement, along the long side, of second region 1119 where the width stays at the minimum value. A different point from the second embodiment is locations of the first and the second border sections based on the relation of q2>p2. The lengths of those regions are in the relation of 2q2>2p2. Dimensions k2, q2, and W2 are in the relations of 0<q2<k2<W2, and q2<W2−k2.

The dimensions α1, β1, γ1 and α2, β2, γ2 are in the relations of α1<γ1<β1, and α2<γ2<β2, and also they satisfy the same conditions as discussed in the first embodiment. Any one of the foregoing greater-than signs may come with an equal sign.

Electrode units 1101, 1111 discussed above are configured such that first ends 1104, 1114 are to be the winding heads, i.e. they are placed at the core section of the wound element, and polarization electrodes 1103, 1113 are placed oppositely to each other, and yet, second ends 1105, 1115 are placed at the winding ends, i.e. at the outer most circumference of the wound element. The wound element is thus formed.

As shown in FIG. 12C and FIG. 12D, in the foregoing wound elements the widths of collector 1203 of electrode unit 1202 and collector 1206 of electrode unit 1205 taper in regions 1216 and 1223 from the core section toward the outer circumference of the wound element. The widths stay at the minimum values in regions 1217 and 1224, on the other hand, they flare in regions 1218 and 1225 toward the outer circumference of the wound element. This third embodiment differs from the second embodiment in a greater length of regions 1217 and 1224. In FIG. 12D, the length of regions 1217 and 1224 is greater than one turn of the wound element.

As shown in FIGS. 13C and 13D, collectors 1302 and 1303 of the electrode units of wound element 1301 bend themselves such that their end faces are directed in different directions in response to the respective regions. To be more specific, collector 1313 and collector 1319 bend themselves such that their end faces are directed toward the outer circumference of wound element 1301. Collector 1313 belongs to first region 1305 in collector group 1302 of the electrode unit to be the first pole, and collector 1319 belongs to the first region 1308 in collector group 1303 of the electrode unit to be the second pole. On the other hand, collector 1315 and collector 1321 bend themselves such that their end faces are directed toward the core of the wound element. Collector 1315 belongs to third region 1307 in collector group 1302 of the electrode unit to be the first pole, and collector 1321 belongs to the second region 1310 in collector group 1303 of the electrode unit to be the second pole. Collector 1314 belonging to second region 1306 in collector group 1302 of the electrode unit to be the first pole is not bent, and collector 1320 belonging to second region 1309 in collector group 1303 of the electrode unit to be the second pole is also not bent.

The capacitor, in accordance with the third embodiment, having the wound element, in which the collectors of the electrode units are bent, has the following advantages: As shown in FIG. 10, collectors 1005 of the first electrode unit to be the first pole and collectors 1006 of the second electrode unit to be the second pole are bent in regions 1019 and 1026 toward the outer circumference from the core of wound element 1001. On the other hand, the collectors in regions 1021 and 1028 are bent toward the core from the outer circumference of wound element 1001, and the collectors in border sections 1020 and 1027 are not bent. Collectors 1005 and 1006 in the foregoing status are welded with lid 1003 and housing 1002 at their end faces 1015 and 1022. This structure allows preventing collectors 1005 and 1006 from being damaged by projection 1013 prepared at the center of lid 1003 or projection 1014 prepared at the center of cylindrical housing 1002. Wound element 1001 thus can be fixed to the center of lid 1003 or housing 1002 free from a contact between collector 1005 and housing 1002. As a result, the first pole is positively insulated from the second pole of the capacitor, and the wound element is positively fixed to the housing, so that the reliability in vibrating circumferences can be assured.

On top of that, as shown in FIG. 14A, electrode unit 1401 of the capacitor in accordance with the third embodiment of the present invention measures "W" on the long side, and polarization electrode region 1403 constantly measures its width "l" on any point on the long side. The width of collector 1402 varies depending on points on the long side. To be more specific, the width of collector 1402 measures "l+γ" on first end 1404 and tapers from first end 1404 to border section 1405 in region 1408, specifically the width measures "l+α" in region 1409 between border section 1405 and border section 1406. Border section 1405 is away from first end 1404 by distance "k−q" and border section 1406 is away from first end 1404 by distance "k+q". In region 1410, the width flares from border section 1406 toward second end 1407, and measures "l+β" on second end 1407. Dimensions "k", "q", "W" are in the relations of 0<q<k<W, and q<W−k. The width of collector 1402 satisfies the relation of α<γ<β. The relations discussed in the first and the second embodiments about dimensions α1, β1, γ1 and α2, β2, γ2 can be also applied to dimensions α, β, γ.

FIG. 14B shows a sectional view of electrode unit 1401 shown in FIG. 14A cut vertically (along the thickness direction) at any point 1411. Electrode unit 1401 is formed of collector 1412 having thickness "t", polarization electrode 1413 formed on both sides of collector 1412 with thickness "u" and "v" respectively, and has width "L".

The advantage of the foregoing electrode unit 1401 is described hereinafter through comparing the capacitors in accordance with the first and the second embodiments with the electrode unit of this third embodiment. As shown in FIG. 5, plane area Sb of collector 510 of electrode unit 509 of the capacitor in accordance with the first embodiment is expressed with equation (13):

$$Sb = \frac{1}{2}W(\alpha + \beta + 2l) - \frac{1}{2}k(\beta - \gamma) \quad (13)$$

As shown in FIG. 9, plane area Sc of collector 902 of electrode unit 901 is expressed with equation (14):

$$Sc = \frac{1}{2}W(\alpha + \beta + 2l) - \frac{1}{2}k(\beta - \gamma) - \frac{1}{2}p(\beta + \gamma - 2\alpha) \quad (14)$$

where Sb>Se is established. Plane area Sd of collector 1402 of electrode unit 1401 shown in FIG. 4 is described with equation (15):

$$Sd = \frac{1}{2}W(\alpha + \beta + 2l) - \frac{1}{2}k(\beta - \gamma) - \frac{1}{2}q(\beta + \gamma - 2\alpha) \quad (15)$$

The difference between Sc and Sd is expressed with equation (16):

$$Sc - Sd = \frac{1}{2}(q - p)(\beta + \gamma - 2\alpha) \quad (16)$$

The foregoing dimensions satisfy the following relations: Since q>p>0 and β>γ>α are established as discussed previously, Sc−Sd>0, i.e. Sc>Sd is established. The structure of the electrode unit employed in the capacitor in accordance with the third embodiment allows reducing the plane area of the collector from that of the capacitor in accordance with the first and the second embodiments, so that the collector has a further lower resistance as shown in FIG. 6. As a result, the capacitor can lower its internal resistance.

In FIG. 11, the lengths of electrode unit 1101 corresponding to the first pole and electrode unit 1111 corresponding to the second pole are marked with "W1" and "W2" respectively for expressing the dimensions of the identical parts to each other of units 1101 and 1111. These dimensions can be set in response to the target performance of the capacitor, e.g. W1 can be equal to or different from W2. This instance can be applied to "l1" and "l2", "k1" and "k2", "q1" and "q2", "α1" and "α2", "β1" and "β2", "γ1" and "γ2". When electrode units 1101 and 1111 are wound, first ends 1104 and 1114 can agree with each other at the winding head, or they do not necessarily agree with each other Second ends 1105 and 1115 can agree with each other at the winding end, or they do not necessarily agree with each other. These items can be set in response to the target performance of the capacitor.

In FIG. 13, collector 1314 protrudes from first separator 1325 and second separator 1326 by length Λ1, and collector 1320 protrudes from first separator 1325 and second separator 1326 by length Λ2. The lengths Λ1 and Λ2 preferably fall within the range of 0.6-1.0 mm. These preferable lengths allow preventing separators 1325 and 1326 from being burned when wound element 1301 is welded to housing 1002 or lid 1003 shown in FIG. 10. It also allows maximizing the dimensions of polarization electrodes 1313 and 1324 with respect to housing 1002 which has a predetermined depth, so that a capacitor having a large capacity is obtainable.

In FIG. 14, polarization electrode 1413 has thickness "u" and "v" respectively on either side of collector 1412; however, "u" and "v" can be equal to or different from each other due to the same reason discussed previously.

Exemplary Embodiment 4

The fourth embodiment is demonstrated hereinafter with reference to FIG. 15-FIG. 19. The capacitor in accordance with the fourth embodiment differs from that of the third embodiment in the structure of the electrode unit.

Figure 15:
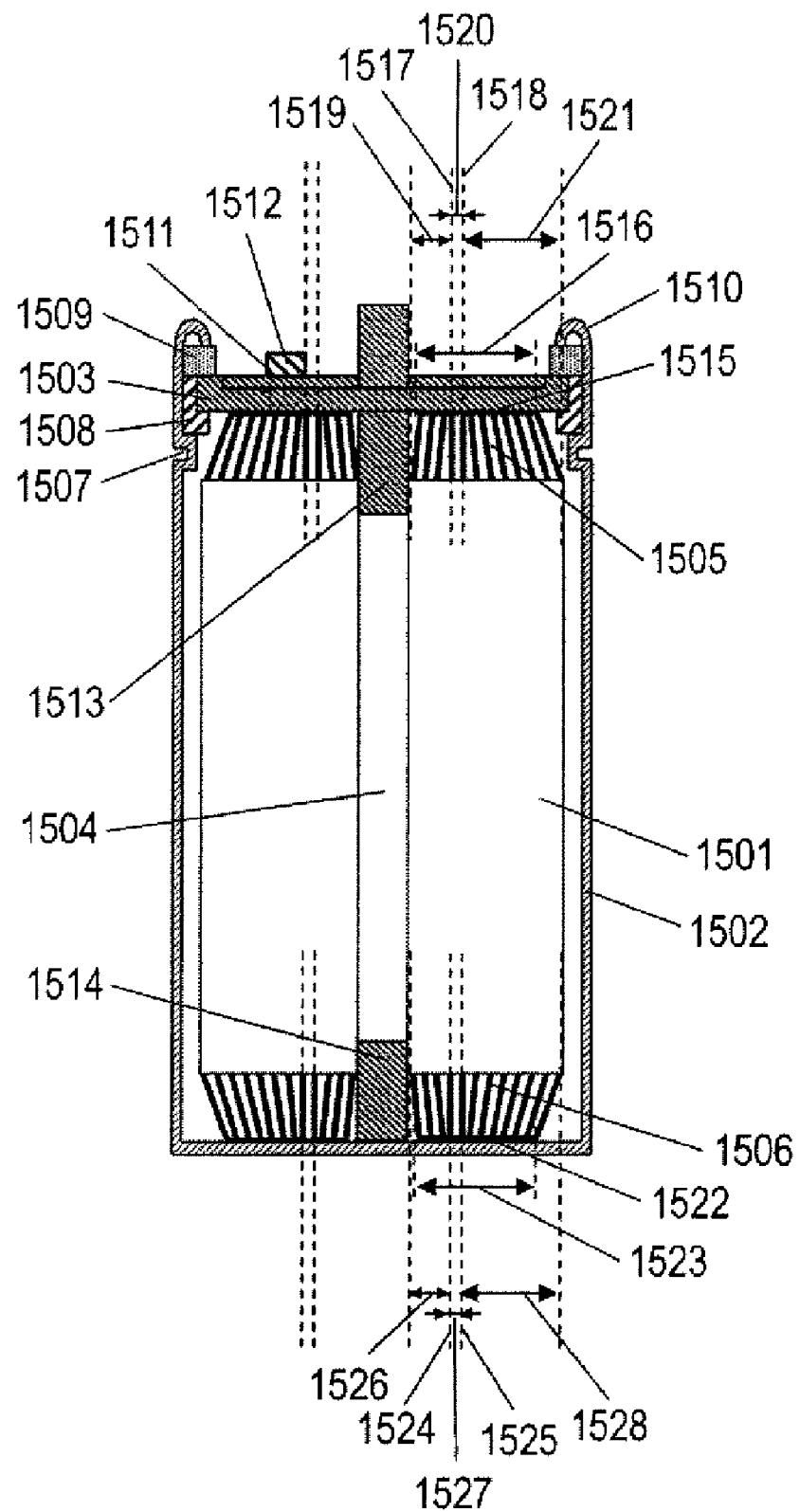
FIG. 15 shows a sectional view of a capacitor in accordance with a fourth embodiment of the present invention.
Figure 16A:
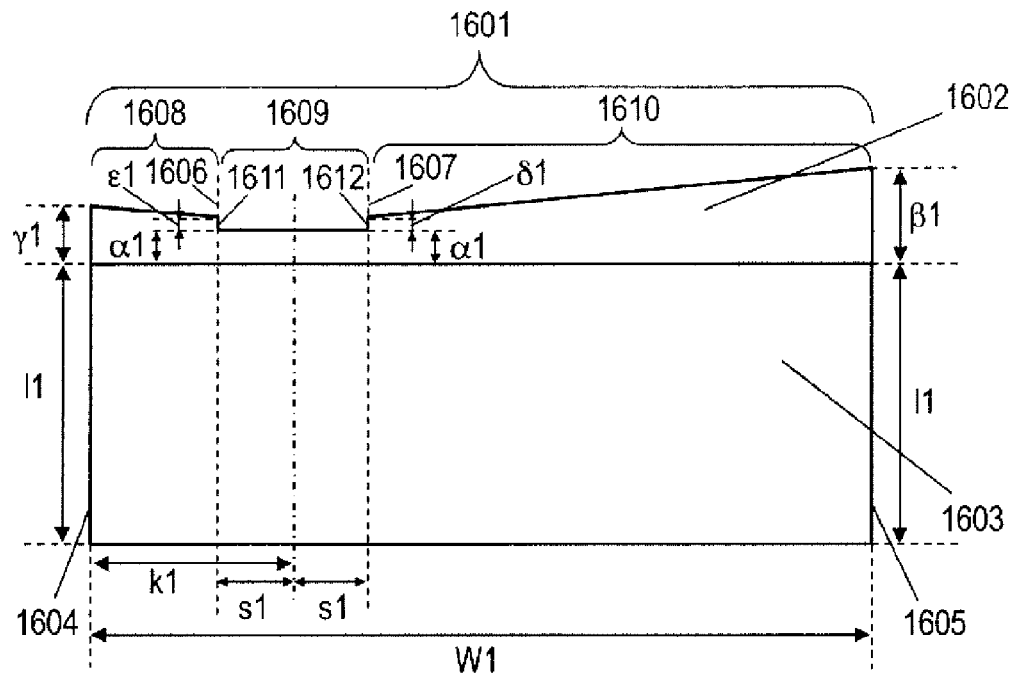
FIG. 16A shows a plan view of an electrode unit of the capacitor in accordance with the fourth embodiment of the present invention.
Figure 16B:
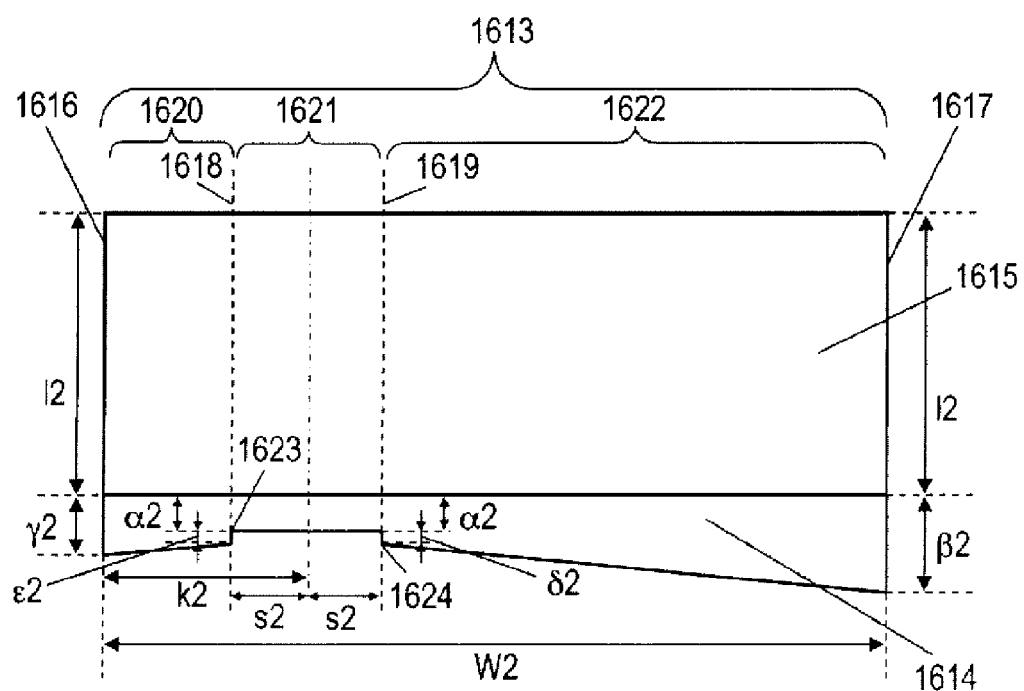
FIG. 16B shows a plan view of another electrode unit of the capacitor in accordance with the fourth embodiment of the present invention.
Figures 17A, 17B:
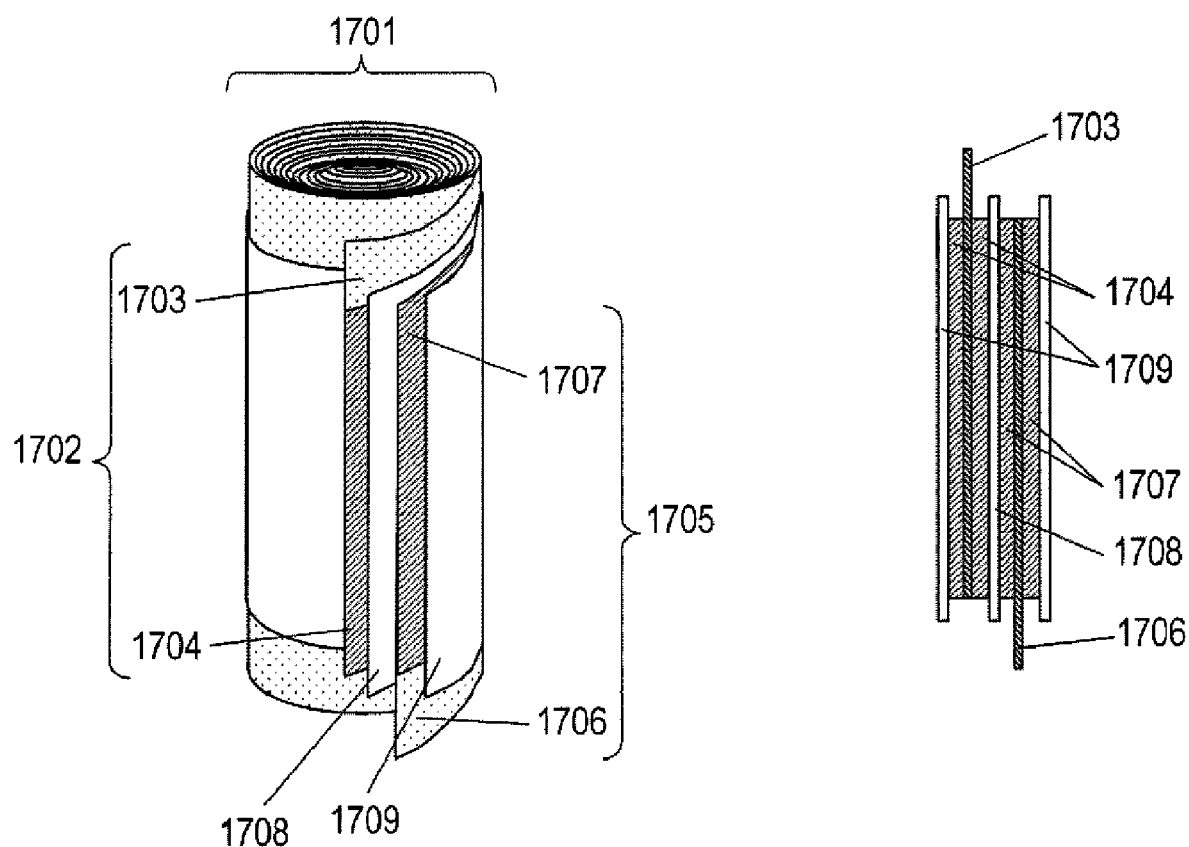
FIG. 17A shows a perspective view of an essential part of a wound element of the capacitor in accordance with the fourth embodiment of the present invention.
FIG. 17B shows a sectional view of an essential part of the wound element of the capacitor in accordance with the fourth embodiment of the present invention.
Figure 18A:
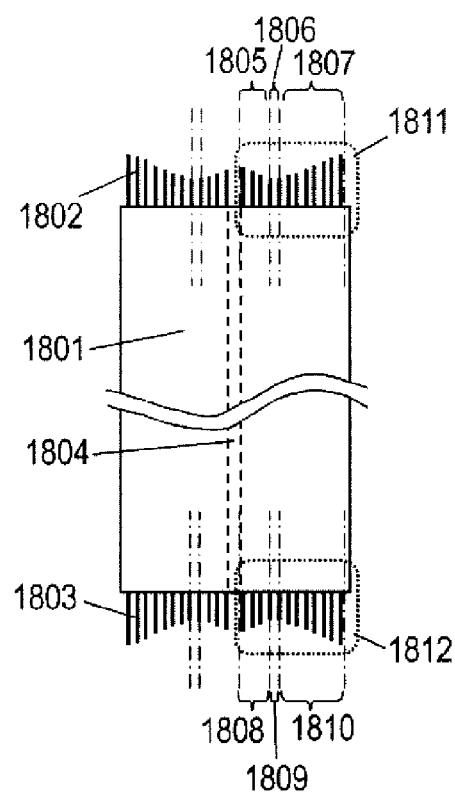
FIG. 18A shows a sectional view of an essential part of a wound element of the capacitor in accordance with the fourth embodiment of the present invention.
Figure 18B:
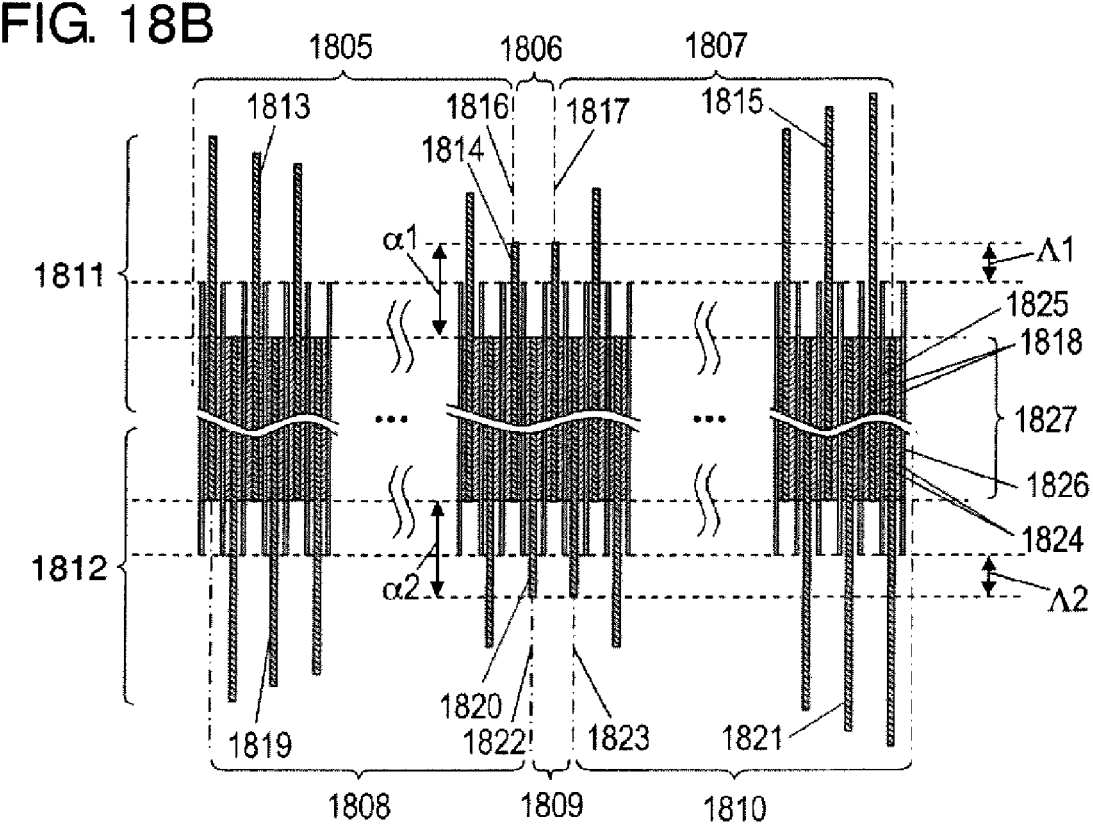
FIG. 18B shows a sectional view of an enlarged essential part of the wound element of the capacitor in accordance with the fourth embodiment of the present invention.
Figure 18C:
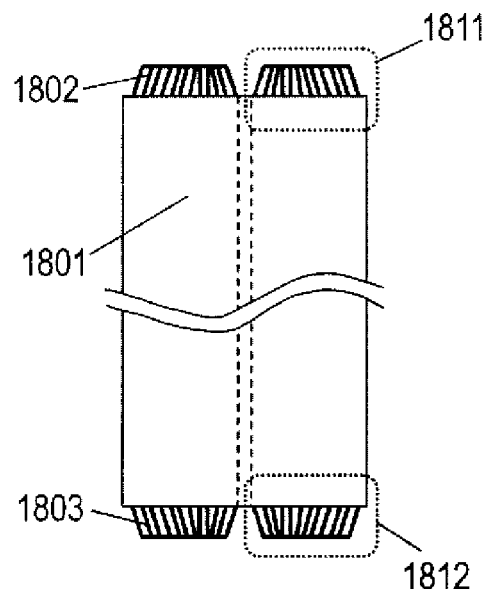
FIG. 18C shows a sectional view of an essential part of bent collectors of the wound element of the capacitor in accordance with the fourth embodiment of the present invention.
Figure 18D:
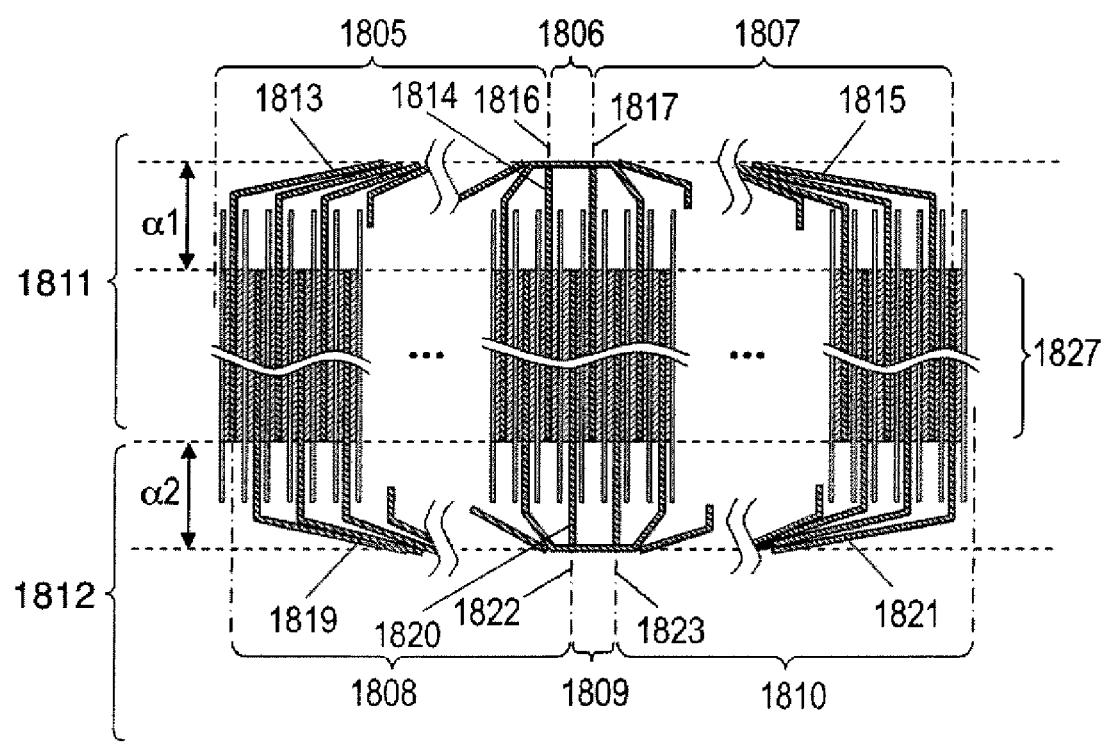
FIG. 18D shows a sectional view of an enlarged essential part of the bent collectors of the wound element of the capacitor in accordance with the fourth embodiment of the present invention.

FIG. 15 shows a sectional view of the capacitor in accordance with the fourth embodiment, in FIG. 15 the capacitor is cut along a winding shaft of a wound element. FIGS. 16A and 16B show plan views of an electrode unit of the wound element, and the plan views illustrate status where the wound element is ready to be wound. FIGS. 17A-17D show the wound element. FIG. 17A shows a perspective view of the wound element half-finished the winding, and FIG. 17B shows a sectional view illustrating positional relations among the structural elements of the wound element. FIG. 17C shows a perspective view of the wound element finished its winding. FIG. 17D shows a plan view of an end face of the wound element viewed from the first pole, and a sectional view of the wound element cut along its winding shaft and its border section that is described later. FIGS. 18A and 18C show sectional views of the wound element cut along the winding shaft. FIGS. 18B and 18D show enlarged views around an end face of a collector of the wound element. FIGS. 18A and 18B show the wound element just finished the winding, and FIGS. 18C and 18D show the status where the collectors are bent. FIG. 19A-19D show a plan view and a sectional view of an essential part of the electrode unit with only one pole illustrated.

As shown in FIG. 15, the capacitor is formed of wound element 1501 accommodated in cylindrical metal housing 1502 which has a bottom plate and is closed by metal lid 1503. Lid 1503 is insulated from housing 1502 with annular insulating packing 1508, of which sectional view shows a letter "L", and annular insulating square ring 1509 which works as a sealing member and shows a rectangle in its sectional view.

As shown in FIGS. 17A-17D, wound element 1501 comprises the following elements:
electrode unit 1702 to be a first pole, e.g. anode;
first separator 1708;
electrode unit 1705 to be a second pole, e.g. cathode; and
second separator 1709.
These elements are rolled up together on winding shaft 1711 as a core. Electrode unit 1702 to be the first pole includes collector 1703 and polarization electrode 1704 which is placed oppositely to each other on both sides of collector 1703. Electrode unit 1705 to be the second pole includes collector 1706 and polarization electrode 1707 which is placed oppositely to each other on both sides of collector 1706. As shown in FIG. 17B, first separator 1708 and second separator 1709 are placed such that they lap over polarization electrodes 1704, 1707 so that they can fully cover electrodes 1704 and 1707. The capacitor shown in FIG. 15 contains electrolyte impregnated between housing 1502, wound element 1501, and lid 1503; however, the electrolyte is not shown here.

As shown in FIGS. 16A and 163, electrode unit 1601 to be the first pole has different widths along its long side. To be more specific, in the section between first end 1604 and second end 1605 of the long side, although polarization electrode 1603 maintains its width at "l1", the width of collector 1602 varies in some regions, e.g., "l1+γ1" at first end 1604 and "l1+β1" at its second end 1605. In first region 1608 of electrode unit 1601, the width of collector 1602 tapers from first end 1604 to first border section 1606 which is placed away from first end 1604 by distance "k1−s1", and the width decreases to "l1+α1+ε1" at the first border section 1606. At the same time, the width lowers by "ε1" at step 1611, namely the width reaches the minimum value of "l1+α1". In second region 1609 placed between first border section 1606 and second border section 1607 which is placed away from first end 1604 by distance "k1+s1", the width stays at the minimum value "l1+α1". The width however increases by "δ1" at second border section 1607, i.e. step 1612, so that the width becomes "l1+α1+δ1". In third region 1610 of electrode unit 1601, the width flares from second border section 1607 to second end 1605. A different point from the first embodiment is a placement, along the long side, of the region where the width stays at the minimum value. A different point from the second and the third embodiments is locations of the first and the second border sections based on the relation of s1>q1>p1. The lengths of those regions are in the relation of 2s1>2q1>2p1. Another different point from the second and the third embodiments is step-like variations in the widths by "ε1" and "δ1" at the first and the second border sections respectively. Dimensions k1, s1, and W1 are in the relations of 0<s1<k1<W1, and s1<W1−k1.

A similar configuration discussed above is applicable to electrode unit 1613 to be the second pole. To be more specific, in the section between first end 1616 and second end 1617 of the long side, although polarization electrode 1615 maintains its width at "l2", the width of collector 1614 varies in some regions, e.g., "l2+γ2" at first end 1616 and "l2+β2" at its second end 1617. In first region 1620 of electrode unit 1613, the width of collector 1614 tapers from first end 1616 to first border section 1618 which is placed away from first end 1616 by distance "k2−s2", and the width decreases to "l2+α2+ε2" at the first border section 1618. At the same time, the width lowers by "ε2" at step 1623, namely the width reaches the minimum value of "l2+α2". In second region 1621 placed between first border section 1618 and second border section 1619 which is placed away from first end 1616 by distance "k2+s2", the width stays at the minimum value "l2+α2". The width however increases by "δ2" at second border section 1619, i.e. step 1624, so that the width becomes "l2+α2+δ2". In third region 1622 of electrode unit 1613, the width flares from second border section 1619 to second end 1617. A different point from the first embodiment is a placement, along the long side, of the region where the width stays at the minimum value. A different point from the second and the third embodiments is locations of the first and the second border sections based on the relation of s2>q2>p2. The lengths of those regions are in the relation of 2s2>2q2>2p2. Another different point from the second and the third embodiments is step-like variations in the widths by "ε2" and "δ2" at the first and the second border sections respectively.

The foregoing dimensions α1, β1, γ1, and α2, β2, γ2 are in the relations of α1<γ1<β1, and α2<γ2<β2, and they satisfy the conditions similar to those discussed in embodiments 1-3. Any one of these greater-than signs may come with an equal sign. Dimensions k1, s1, W1 are in the relations of 0<s1<k1<W1, and s1<W1−k1, and the relation α1+ε1<γ1 as well as α1+δ1<β1 is established. Dimensions k2, s2, and W2 are in the relations of 0<s2<k2<W2, and s2<W2−k2. Relations of α2+ε2<γ2 and α2+δ2<β2 are also established.

Electrode units 1601, 1613 discussed above are configured such that first ends 1604, 1616 are to be the winding heads, i.e. they are placed at the core section of the wound element, and polarization electrodes 1603, 1615 are placed oppositely to each other, and yet, second ends 1605, 1617 are placed at the winding ends, i.e. at the outer most circumference of the wound element. The wound element is thus formed.

As shown in FIG. 17C and FIG. 17D, in the foregoing wound element, the widths of collector 1703 of electrode unit 1702 and collector 1706 of electrode unit 1705 taper in regions 1716 and 1723 from the core section toward the outer circumference of the wound element. The widths stay at the minimum values in regions 1717 and 1724, on the other hand, they flare in regions 1718 and 1725 toward the outer circumference of the wound element. This fourth embodiment differs from the third embodiment in a greater length of regions 1717 and 1724. In FIG. 17D, the length of regions 1717 and 1724 is greater than one and half turns of the wound element.

As shown in FIGS. 18C and 18D, collectors 1802 and 1803 of the electrode units of wound element 1801 bend themselves such that their end faces are directed in different directions in response to the respective regions. To be more specific, collector 1813 and collector 1819 bend themselves such that their end faces are directed toward the outer circumference of wound element 1801. Collector 1813 belongs to first region 1805 in collector group 1802 of the electrode unit to be the first pole, and collector 1819 belongs to the first region 1808 in collector group 1803 of the electrode unit to be the second pole. On the other hand, collector 1815 and collector 1821 bend themselves such that their end faces are directed toward the core of the wound element. Collector 1815 belongs to third region 1807 in collector group 1802 of the electrode unit to be the first pole, and collector 1821 belongs to the second region 1810 in collector group 1803 of the electrode unit to be the second pole. Collector 1814 belonging to second region 1806 in collector group 1802 of the electrode unit to be the first pole is not bent, and collector 1820 belonging to second region 1809 in collector group 1803 of the electrode unit to be the second pole is also not bent.

The capacitor, in accordance with the fourth embodiment, having the wound element, in which the collectors of the electrode units are bent, has the following advantages: As shown in FIG. 15, collectors 1505 of the first electrode unit to be the first pole and collectors 1506 of the second electrode unit to be the second pole are bent in regions 1519 and 1526 toward the outer circumference from the core of wound element 1501. On the other hand, in regions 1521 and 1528, they are bent toward the core from the outer circumference of wound element 1501, and the collectors in border sections 1520 and 1527 are not bent. Collectors 1505 and 1506 in the foregoing status are welded with lid 1503 and housing 1502 respectively at their end faces 1515 and 1522. This structure allows preventing collectors 1505 and 1506 from being damaged by projection 1513 prepared at the center of lid 1503 or projection 1514 prepared at the center of cylindrical housing 1502. Wound element 1501 thus can be fixed to the center of lid 1503 or housing 1502 free from a contact between collector 1505 and housing 1502. As a result, the first pole is positively insulated from the second pole of the capacitor, and the wound element is positively fixed to the housing, so that the reliability in vibrating circumferences can be assured.

Figure 19A:
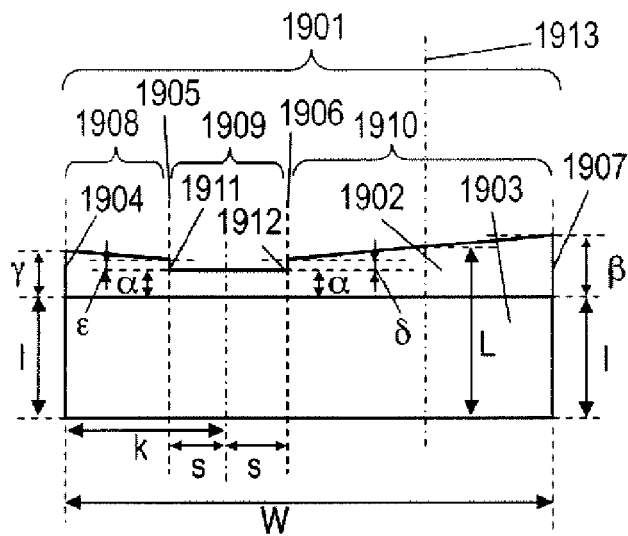
FIG. 19A shows a plan view of an electrode unit of the capacitor in accordance with the fourth embodiment of the present invention.

On top of that, as shown in FIG. 19A, electrode unit 1901 of the capacitor in accordance with the fourth embodiment of the present invention measures "W" on the long side, and polarization electrode region 1903 constantly measures its width "l" on any point on the long side. The width of collector 1902 varies depending on a point on the long side. To be more specific, the width of collector 1902 measures "l+γ" on first end 1904 and tapers from first end 1904 to border section 1905 in region 1908, specifically the width measures "l+α+ε" on border section 1905 which is placed away from first end 1904 by distance "k−s". At the same time, the width decreases by "ε" at step 1911 and becomes the minimum value of "l+α". In region 1909 between border section 1905 and border section 1906 which is away from first end 1904 by distance "k+s", the width stays at "l+α". Then the width increases by "δ" on border section 1906, i.e. at step 1912, so that the width becomes "l+α+δ". In region 1910, the width flares from border section 1906 toward second end 1907, and measures "l+β" on second end 1907. Dimensions "k", "s", "W" are in the relations of 0<s<k<W, and s<W−k. The width of collector 1902 satisfies the relation of α<γ<β. The relations discussed in the first and the second embodiments about dimensions α1, β1, γ1 and α2, β2, γ2 can be also applied to dimensions α, β, γ. On top of that, the relations of α+ε<γ, and α+δ<β are established.

Figure 19B:
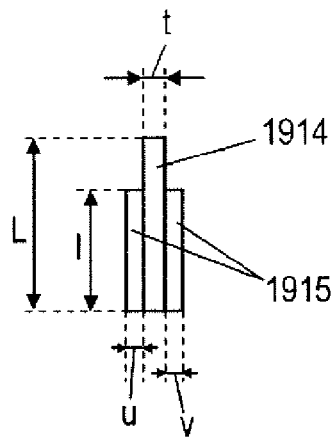
FIG. 19B shows a sectional view of an essential part of the electrode unit of the capacitor in accordance with the fourth embodiment of the present invention.
Figure 19C:
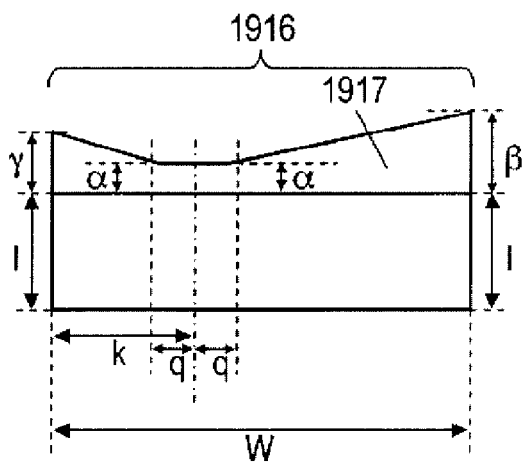
FIG. 19C shows the plan view of the essential part of the electrode unit of the capacitor in accordance with the third embodiment of the present invention.
Figure 19D:
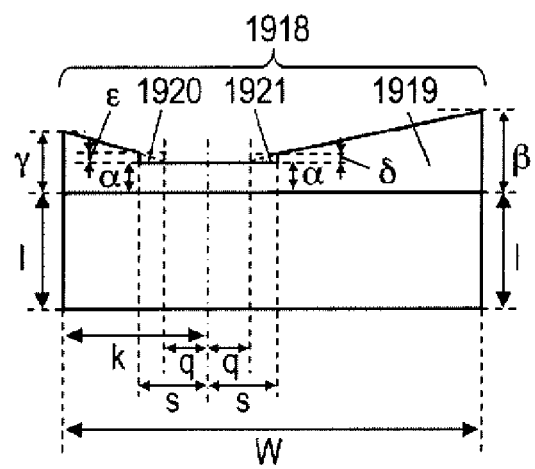
FIG. 19D schematically shows a difference in area between the electrode unit in accordance with the third embodiment and the electrode unit in accordance with the fourth embodiment.
Figure 20D:
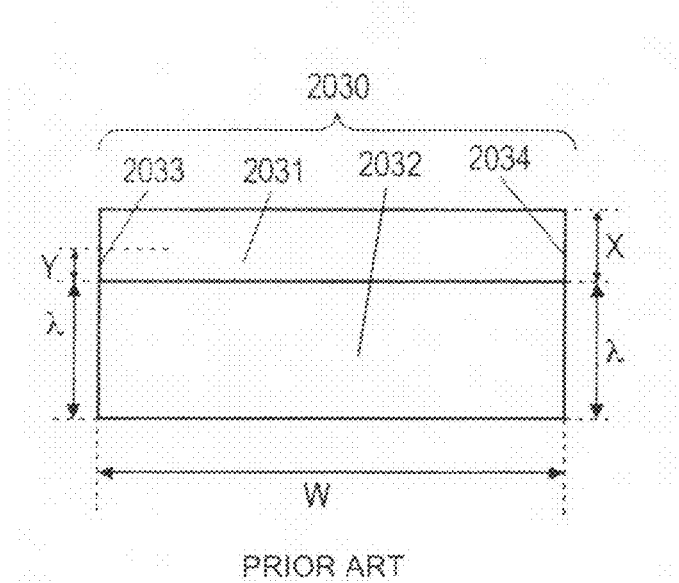
FIG. 20D shows a fellow to the electrodes of a belt-like electrode unit of the conventional cylindrical capacitor.
Figure 20E:
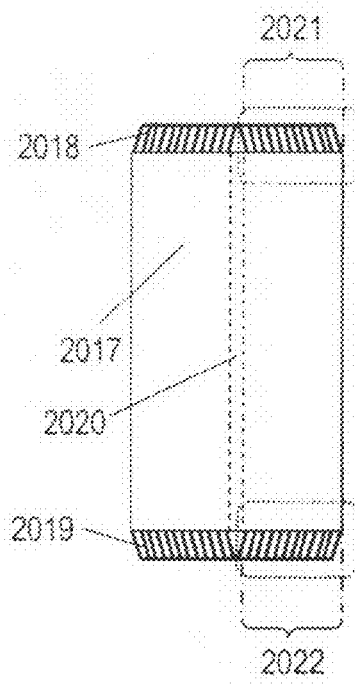
FIG. 20E shows a sectional view of a wound element of the conventional cylindrical capacitor.
Figure 20F:
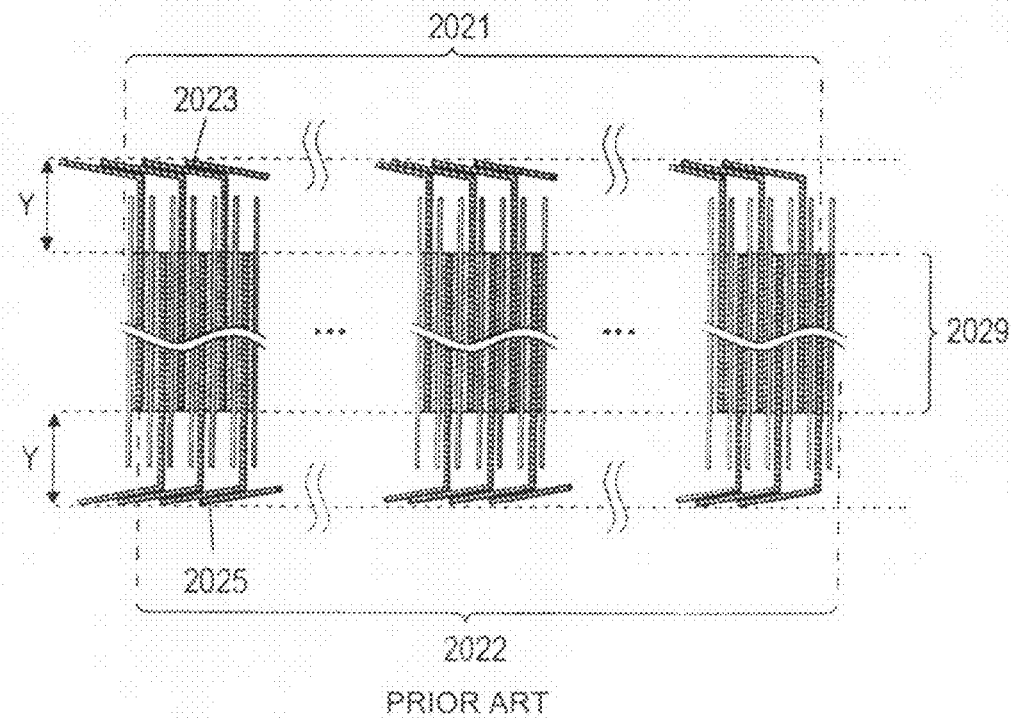
FIG. 20F shows a sectional view of an essential part of the wound element of the conventional cylindrical capacitor.
Figure 21A:
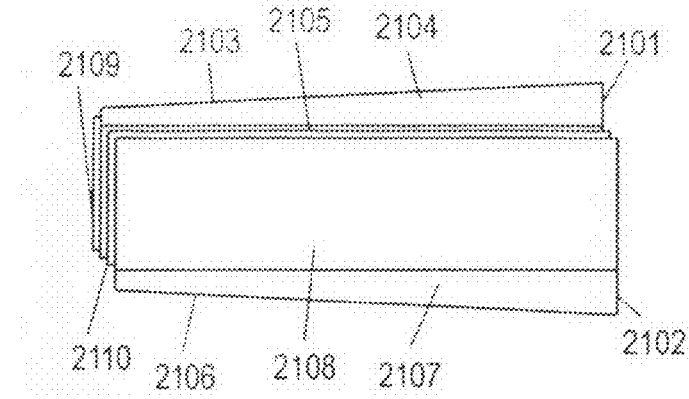
FIG. 21A shows a perspective view of an electrode unit of another conventional capacitor.
Figure 21B:
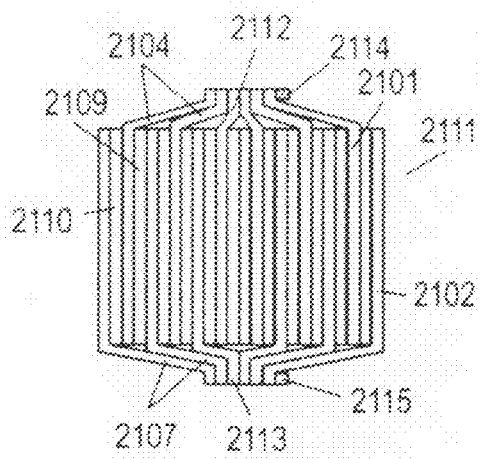
FIG. 21B shows a sectional view of collectors welded together on both the ends of a wound element of the conventional capacitor.
Figure 21C:
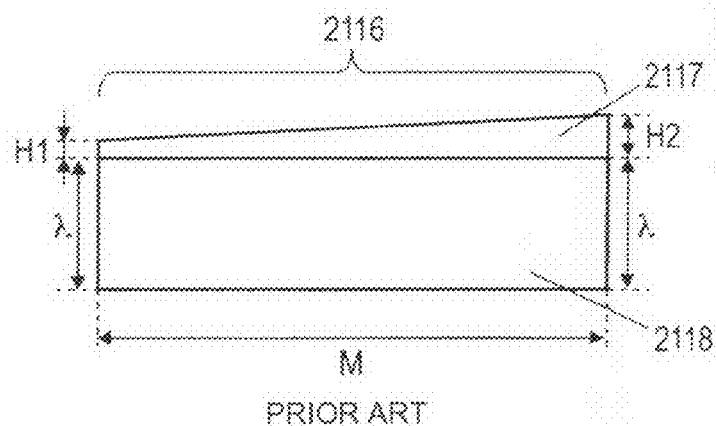
FIG. 21C shows a plan view of the electrode unit of the conventional capacitor.
Figure 21D:
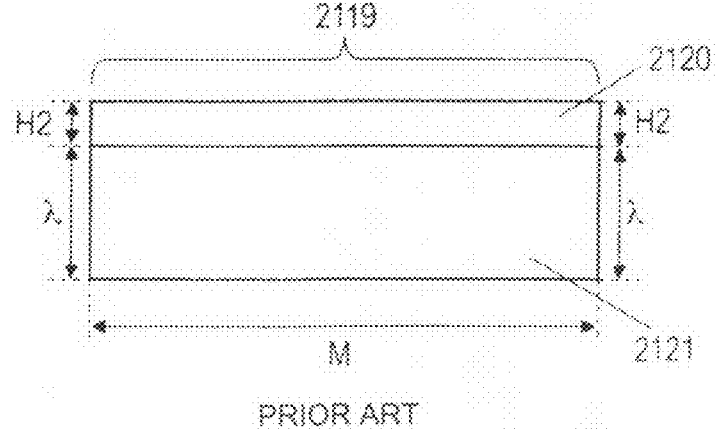
FIG. 21D shows a plan view of an electrode unit of a conventional capacitor.

FIG. 19B shows a sectional view of electrode unit 1901 shown in FIG. 19A cut vertically (along the thickness direction) at any point 1913. Electrode unit 1901 is formed of collector 1914 having thickness "t", polarization electrode 1915 formed on both sides of collector 1914 with thickness "u" and "v" respectively, and has width "L". FIG. 19C shows the electrode unit in accordance with the third embodiment, and FIG. 19D shows the electrode unit in accordance with the fourth embodiment. The advantage of the foregoing electrode unit 1901 is described hereinafter through comparing the capacitors in accordance with the first, second, and third embodiments with the electrode unit of this fourth embodiment.

As shown in FIG. 5C, plane area Sb of collector 510 of electrode unit 509 of the capacitor in accordance with the first embodiment is expressed with equation (17):

$$Sb = \frac{1}{2}W(\alpha + \beta + 2l) - \frac{1}{2}k(\beta - \gamma) \tag{17}$$

As shown in FIG. 9A, plane area Sc of collector 902 of electrode unit 901 is expressed with equation (18):

$$Sc = \frac{1}{2}W(\alpha + \beta + 2l) - \frac{1}{2}k(\beta - \gamma) - \frac{1}{2}p(\beta - \gamma - 2\alpha) \tag{18}$$

Plane area Sd of collector 1402 of electrode unit 1401 in accordance with the third embodiment and shown in FIG. 4 is described with equation (19):

$$Sd = \frac{1}{2}W(\alpha + \beta + 2l) - \frac{1}{2}k(\beta - \gamma) - \frac{1}{2}q(\beta + \gamma - 2\alpha) \tag{19}$$

The plane areas Sb, Sc, and Sd satisfy the relation of Sb>Sc>Sd, so that the plane area Sd of the third embodiment results in the smallest one. As shown in FIGS. 19C and 19D, collector 1919 of electrode unit 1918 of the capacitor in accordance with the fourth embodiment differs from collector 1917 of electrode unit 1916 in accordance with the third embodiment in the plane area by regions 1920 and 1921. The plane area of region 1920 is expressed with equation (20):

$$\text{Plane area of region } 1920 = \frac{1}{2}\varepsilon(s - q) \tag{20}$$

and the plane area of region 1921 is expressed with equation (21):

$$\text{Plane area of region } 1921 = \frac{1}{2}\delta(s - q) \tag{21}$$

Again the plane area of collector 1917 of the third embodiment is expressed with equation (22):

$$Sd = \frac{1}{2}W(\alpha + \beta + 2l) - \frac{1}{2}k(\beta - \gamma) - \frac{1}{2}q(\beta + \gamma - 2\alpha) \tag{22}$$

The plane area Se of collector 1919 of electrode unit 1918 of the fourth embodiment is expressed with equation (23):

$$Se = \frac{1}{2}W(\alpha + \beta + 2l) - \frac{1}{2}k(\beta - \gamma) - \frac{1}{2}q(\beta + \gamma - 2\alpha) - \frac{1}{2}\varepsilon(s - q) - \frac{1}{2}\delta(s - q) \tag{23}$$

The difference between Sd and Se is expressed with equation (24):

$$Sd - Se = \frac{1}{2}\varepsilon(s - q) + \frac{1}{2}\delta(s - q) \tag{24}$$

The foregoing dimensions satisfy the following relations Since s>q>0, ϵ>0, and δ>0 are established as discussed previously, Sd−Se>0, i.e. Sd>Se is established.

The structure of the electrode unit employed in the capacitor in accordance with the fourth embodiment allows reducing the plane area of the collector from that of the capacitor in accordance with embodiments 1-3, so that the collector has a further lower resistance as shown in FIG. 6. As a result, the capacitor can lower its internal resistance.

In FIGS. 16A and 16B, the lengths of electrode unit 1601 corresponding to the first pole and electrode unit 1613 corresponding to the second pole are marked with "W1" and "W2" respectively for expressing the dimensions of the identical parts to each other of units 1601 and 1613. These dimensions can be set in response to the target performance of the capacitor, e.g. W1 can be equal to or different from W2. This instance can be applied to "l1" and "l2", "k1" and "k2", "s1" and "s2", "α1" and "α2", "β1" and "β2", "γ1" and "γ2", "ϵ1 and ϵ2", and "δ1 and δ2". When electrode units 1601 and 1613 are wound, first ends 1604 and 1616 can agree with each other at the winding head, or they do not necessarily agree with each other. Second ends 1605 and 1617 can agree with each other at the winding end, or they do not necessarily agree with each other. These items can be set in response to the target performance of the capacitor.

In FIG. 18B, collector 1814 protrudes from first separator 1825 and second separator 1826 by length Λ1, and collector 1820 protrudes from first separator 1825 and second separator 1826 by length Λ2. The lengths Λ1 and Λ2 preferably fall within the range of 0.6-1.0 mm. These preferable lengths allow preventing separators 1825 and 1826 from being burned when wound element 1801 is welded to housing 1502 or lid 1503 shown in FIG. 15. It also allows maximizing the dimensions of polarization electrodes 1818 and 1824 with respect to housing 1502 which has a predetermined depth, so that a capacitor having a large capacity is obtainable.

In FIG. 19B, polarization electrode 1915 has thickness "u" and "v" respectively on either side of collector 1914; however, "u" and "v" can be equal to or different from each other due to the same reason discussed previously.

The major members used in the embodiments discussed previously preferably use the following materials:

Collectors 105, 106, 202, 210, 303, 306, 402, 403, 409, 410, 507, 518, 702, 712, 803, 806, 902, 912, 1005, 1006, 1102, 1112, 1203, 1206, 1302, 1303, 1311, 1312, 1402, 1412, 1505, 1506, 1602, 1614, 1703, 1706, 1802, 1803, 1811, 1812, 1902, 1914, 1917, and 1919: e.g. aluminum, aluminum alloy, cast iron, stainless steel, copper, nickel, titan, monel, tantalum, hastelloy.

There is no limit about the thickness of the collector; however, it typically falls within the range of 10-100 μm. Its length and width can be set appropriately in response to the shape or performance of the capacitor. A roughened surface of the collector is preferable because it improves adhesiveness between the collector and the polarization electrode.

Polarization electrode 203, 211, 304, 307, 414, 418, 511, 519, 703, 713, 804, 807, 1103, 1113, 1204, 1207, 1318, 1324, 1403, 1413, 1603, 1615, 1704, 1707, 1818, 1824, 1903, and 1915: carbon material having a greater specific surface area, e.g. activated carbon powder, polyacen as a major ingredient, carbon black, or carbon whisker as a conductive material, polytetrafluoro-ethylene, polyvinylidene fluoride, or carboxymethyl cellulose as a binder, and alcohol as liquid lubricant. The forgoing materials are mixed, and shaped into a sheet by rolling, and then the sheet is dried. This resultant product then undergoes thermo-compression bonding onto a single side or both sides of the collector, or bonded onto the collector with conductive adhesive. The thickness of the polarization electrode typically falls within the range of 10-100 μm; however, it can be set appropriately in response to the shape or performance of the capacitor.

Separator 308, 309, 419, 420, 808, 809, 1208, 1209, 1325, 1326, 1708, 1709, 1825, and 1826: ion-permeable porous separator, e.g. micro-porous polyethylene film, micro-porous polypropylene film, non-woven polyethylene fabric, non-woven polypropylene fabric, non-woven glass-fiber filled fabric, glass mat filter, cellulose-based non woven fabric, or rayon-based non woven fabric. The thickness of separator typically falls within the range of 10-100 μm; however, it can be set appropriately in response to the shape or performance of the capacitor.

Cylindrical housing 102, 1002, 1502, and lid 103, 1003, 1503: The same material that used for the collector is preferably used.

Electrolyte: either one of water solvable-based electrolyte or organic solvent-based electrolyte, the water solvable-based electrolyte preferably includes sulfuric water solution, sulfuric sulfate water solution, aqueous sodium hydroxide, potassium hydroxide water solution, ammonium hydroxide water solution, potassium chlorine water solution, potassium carbonate water solution. Organic solvent-based electrolyte preferably includes $R^1R^2R^3R^4N^+$, $R^1R^2R^3R^4P^+$, expressed in general formula, where $R^1R^2R^3R^4$ are equal to or different from each other and show alkyl group of which carbon number ranges 1-6. Those signs indicate quaternary ammonium ion or quaternary phosphonium ion, such as $BF_4$ salt, $ClO_4$ salt, $PF_6$ salt, or $LiBF_4$, $LiClO_4$, $NaPF_6$, or $LiPF_3$. One kind or more than one kind of organic solvents including propylene carbonate, ethylene carbonate, γ-butyrolactone, acetonitrile, dimethylformamide, sulforlane, 1,2-dimethoxyethane, nitromethane, dimethyl carbonate, diethymethyl carbonate, and dimethylethyl carbonate.

Winding shaft 104, 311, 404, 811, 1004, 1211, 1304, 1504, 1711, and 1804: When the members are rolled on the winding shaft, a metal jig is inserted into the shaft in order to apply a greater rotary driving force to the shaft; however, the jig is preferably pulled out from the shaft so that the shaft becomes hollow for insulating both the poles from each other.

Annular insulating packing 108, 1008, and 1508: Resin material such as polyphenylene sulfide is preferably used because the packing holds lid 103, 1003, 1503, and is insulated from housing 102, 1002, 1502, and has heat resistance. On top of that, the packing has resistance against the forgoing electrolyte.

Annular square ring 109, 1009, and 1509: Annular curl section formed of an open end of housing 102, 1002, 1502 bites the square ring so that the open end of the housing is sealed. A sealing member such as butyl rubber is preferably used because this material maintains sealing force in high or low temperature environment, and insulates the housing from the lid. On top of that, it has a low gas permeability.

INDUSTRIAL APPLICABILITY

A capacitor of the present invention comprises the following elements:
   a lid working as a first pole of the capacitor;
   a cylindrical housing with a bottom plate, which housing works as a second pole of the capacitor; and
   a wound element formed of electrode units and separators. A border section is prepared between the inner most circumference and the outer most circumference of the wound element. A collector of the electrode unit placed between the inner most circumference and the border section of the wound element is bent toward the outer most circumference. On the other hand, a collector placed between the border section and the outer most circumference is bent toward the inner most circumference of the wound element. Then these collectors are coupled to the lid and the housing. The foregoing structure allows preparing a projection at the center of the lid and the housing so that a winding shaft of the wound element can be fixed to the lid and the housing. On top of that, this structure allows holding the wound element free from a contact between the electrode unit working as the first pole and the housing working as the second pole, so that both of the poles can be positively insulated from each other. As a result, the reliability in vibrating circumstances is positively obtainable.

The capacitor of the present invention prepares a border section between a first end and a second end along the long side of the electrode unit of the wound element. The electrode unit includes a region where no polarization electrode exists, and the width of this region takes a minimum value on this border section, and the width takes a maximum value on at least one of the first end or the second end. This structure allows minimizing a plane area of the collector of the electrode unit, thereby lowering a resistance of the electrode unit. As a result, an internal resistance of the capacitor can be reduced.

The capacitor of the present invention is thus useful as a capacitor, which needs a large capacity and a great output, to be used in a power supply for driving an automobile. The capacitor can be also used in various applications.

The invention claimed is:

1. A capacitor comprising:
   a wound element including:
      a first electrode unit having a first collector and a first polarization electrode on both sides of the first collector;
      a second electrode unit having a second collector and a second polarization electrode on both sides of the second collector; and
      a first separator and a second separator between the first electrode unit and the second electrode unit,
   a cylindrical housing with a bottom plate;
   a lid of the housing, which lid has a hole therein;
   a winding shaft;
   a first annular insulating member;
   a second annular insulating member;
   a stopper to cover the hole; and
   an electrolyte within the housing,
   wherein the first electrode unit in the wound element is in contact with the lid at a first end face of the first collector, thereby comprising a first pole, and the second electrode unit in the wound element is in contact with the cylindrical housing at a second end face of the second collector, thereby comprising a second pole,
   wherein the first collector has a border section between an inner most circumference and an outer most circumference of the wound element, and includes a first region between the inner most circumference and the border section, and a second region between the border section and the outer most circumference,
   wherein the second collector also has a border section between the inner most circumference and the outer most circumference of the wound element, and includes a first region between the inner most circumference and the border section, and a second region between the border section and the outer most circumference,
   wherein parts of each of the first and the second collectors, in which there is no first or second polarization electrode, in the first regions at the first and the second end faces, are bent toward the outer circumference of the wound element, and
   wherein parts of each of the first and the second collectors, in which there is no first or second polarization electrode, in the second regions at the first and the second end faces, are bent toward a core of the wound element.

2. The capacitor of claim 1, wherein one of the first and the second collector includes a region wherein the first polarization electrode and the second polarization electrode are opposite each other on both sides of the collector in a rectangular form, and another region wherein neither of the first or the second polarization electrode exists,
   wherein a width of the first or the second collector has a minimum value on the border section and a maximum value on at least one of the inner most circumference or the outer most circumference of the first or the second collector.

3. The capacitor of claim 1, wherein one of the first electrode unit and the second electrode unit includes, along its long side, a first end, a second end, a first border section, and a second border section in an intermediate region between the first end and the second end,
   wherein one of the first and the second collector includes a region wherein the first polarization electrode or the second polarization electrode are opposite each other on both sides of the collector in a rectangular form in a predetermined region between the first end and the second end, and another region wherein neither of the first or the second polarization electrode exists,
   wherein, in a section between the first end and the second end, a width of the first or the second collector has a minimum value in a section between the first border section and the second border section, and a maximum value on at least one of the first end and the second end.

4. The capacitor of claim 1, wherein one of the first electrode unit and the second electrode unit includes, along its long side, a first end, second end, a first border section, and a second border section in an intermediate region between the first end and the second end,
   wherein one of the first and the second collector includes a region where the first polarization electrode or the second polarization electrode are opposite each other on both sides of the collector in a rectangular form in a predetermined region between the first end and the second end, and another region wherein neither of the first or the second polarization electrode exists,
   wherein, in a section between the first end and the second end, a width of the another region wherein no polarization electrode exists has a minimum value in a section between the first border section and the second border section,
   wherein a width of one of the first and the second collectors exceeds by a given amount around the first border section and the second border section with respect to a width of a section between the first border section and the second border section, and the width has a maximum value on at least one of the first end and the second end.

5. The capacitor of claim 1, wherein the lid has a projection at a center of its face for coupling to the wound element so that the projection is in a center of the wound element such that the winding shaft is fixed to the lid.

6. The capacitor of claim 1, wherein the housing has a projection at a center of its bottom plate, which projection protrudes toward the inside of the housing so that the projection is in a center of the wound element such that the winding shaft is fixed to the housing.

7. The capacitor of claim 1, wherein sections having a minimum width of the first and the second electrode units protrude outside by 0.6-1.0 mm from an end of the first and the second separators.

8. The capacitor of claim 1, wherein the first end face comprises a bent part of the first collector so that the first end face makes a plane contact with the lid, and the second end face comprises a bent part of the second collector so that the second end face makes a plane contact with the bottom plate of the housing.

9. A capacitor comprising:
a wound element including:
a first electrode unit having a first collector and a first polarization electrode on both sides of the first collector;
a second electrode unit having a second collector and a second polarization electrode on both sides of the second collector; and
a first separator and a second separator between the first electrode unit and the second electrode unit,
a cylindrical housing with a bottom plate;
a lid of the housing, which lid has a hole therein;
a winding shaft;
a first annular insulating member;
a second annular insulating member;
a stopper to cover the hole; and
an electrolyte in the housing,
wherein the first electrode unit in the wound element is in contact with the lid at a first end face of the first collector, thereby comprising a first pole, and the second electrode unit in the wound element is in contact with the cylindrical housing at a second end face of the second collector, thereby comprising a second pole,
wherein the first collector has a first border section and a second border section between an inner most circumference and an outer most circumference of the wound element, and includes a first region between the inner most circumference and the first border section, a second region between the first border section and the second border section, and a third region between the second border section and the outer most circumference,
wherein the second collector also has a first border section and a second border section between the inner most circumference and the outer most circumference of the wound element, and includes a first region between the inner most circumference and the first border section, a second region between the first border section and the second border section, and a third region between the second border section and the outer most circumference,
wherein parts of each of the first and the second collector collectors, in which no first or second polarization electrode exists, in the first regions at the first and the second end faces, are slanted toward the outer circumference of the wound element and welded, and
wherein parts of each of the first and the second collectors, in which no first or second polarization electrode exists, in the second regions at the first and the second end faces, are slanted toward a core of the wound element and welded.

10. The capacitor of claim 9, wherein one of the first and the second collectors includes a region wherein the first polarization electrode and the second polarization electrode are opposite each other on both sides of the collector in a rectangular form, and another region wherein neither of the first or the second polarization electrode exists,
wherein a width of the another region wherein no polarization electrode exists has a minimum value in the second region and a maximum value on at least one of the inner most circumference or the outer most circumference of the first or the second collector.

11. The capacitor of claim 9, wherein one of the first and the second collectors includes a region wherein the first polarization electrode and the second polarization electrode are opposite each other on both sides of the collector in a rectangular form, and another region wherein neither of the first or the second polarization electrode exists,
wherein a width of the another region wherein no polarization electrode exists has a minimum value in the second region,
wherein, the width of the another region wherein no polarization electrode exists exceeds by a given amount around at least one of the first border section and the second border section with respect to a width of the second region, and the width has maximum value on at least one of the inner most circumference and the outer most circumference of one of the first and the second collectors.

12. The capacitor of claim 9, wherein the lid has a projection at a center of its face for coupling to the wound element so that the projection is in a center of the wound element such that the winding shaft is fixed to the lid.

13. The capacitor of claim 9, wherein the housing has a projection at a center of its bottom plate, which projection protrudes toward the inside of the housing so that the projection is in a center of the wound element.

14. The capacitor of claim 9, wherein sections having a minimum width of the first and the second electrode units protrude outside by 0.6-1.0 mm from an end of the first and the second separators.

15. The capacitor of claim 9, wherein the first end face comprises a bent part of the first collector so that the first end face makes a plane contact with the lid, and the second end face comprises a bent part of the second collector so that the second end face makes a plane contact with the bottom plate of the housing.

* * * * *